Figure 1:
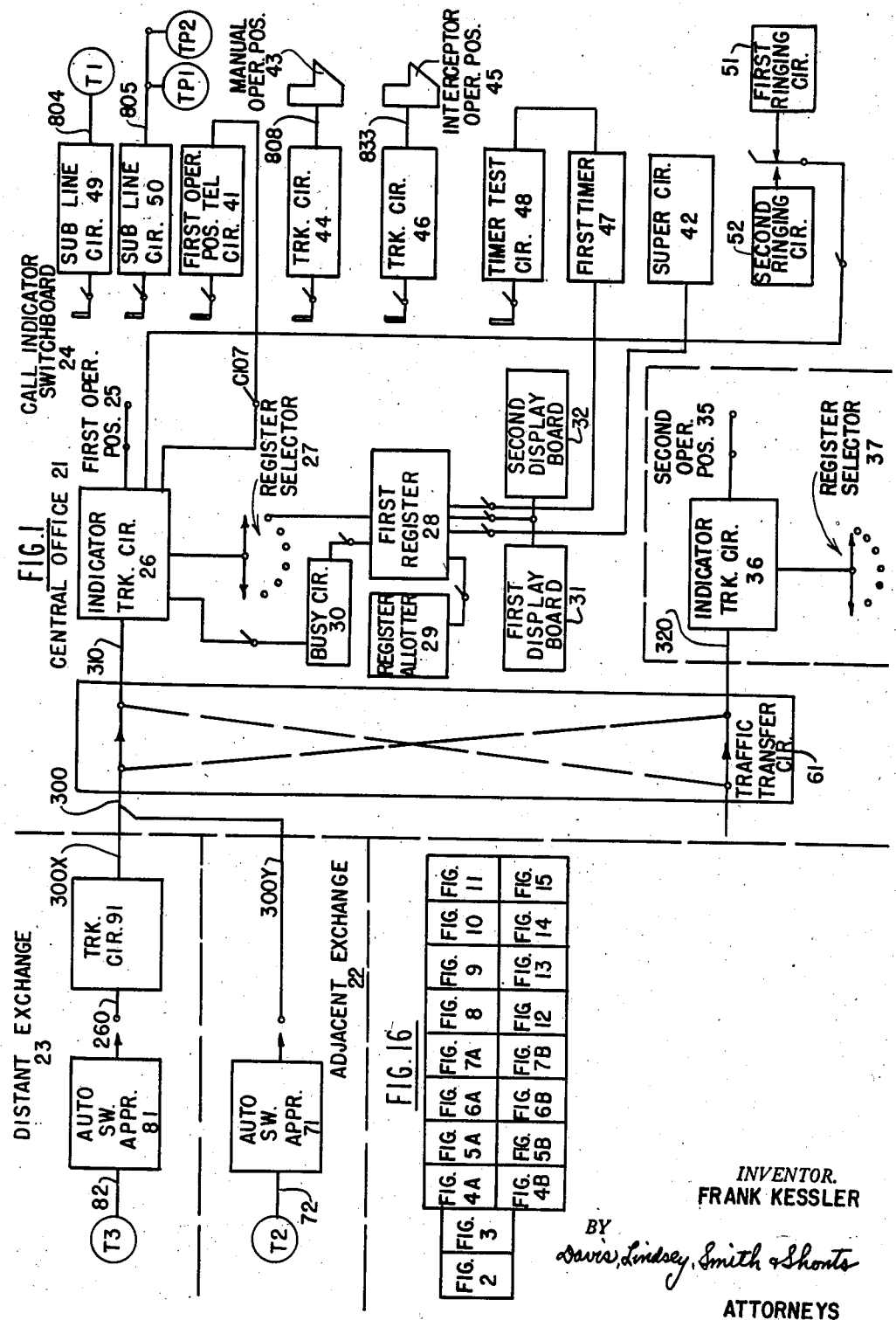

March 30, 1943.   F. KESSLER   2,314,990
TELEPHONE SYSTEM
Filed Oct. 24, 1941   19 Sheets-Sheet 1

INVENTOR.
FRANK KESSLER
BY
Davis, Lindsey, Smith & Shonts
ATTORNEYS

TRAFFIC TRANSFER CIR. 61

INVENTOR.
FRANK KESSLER

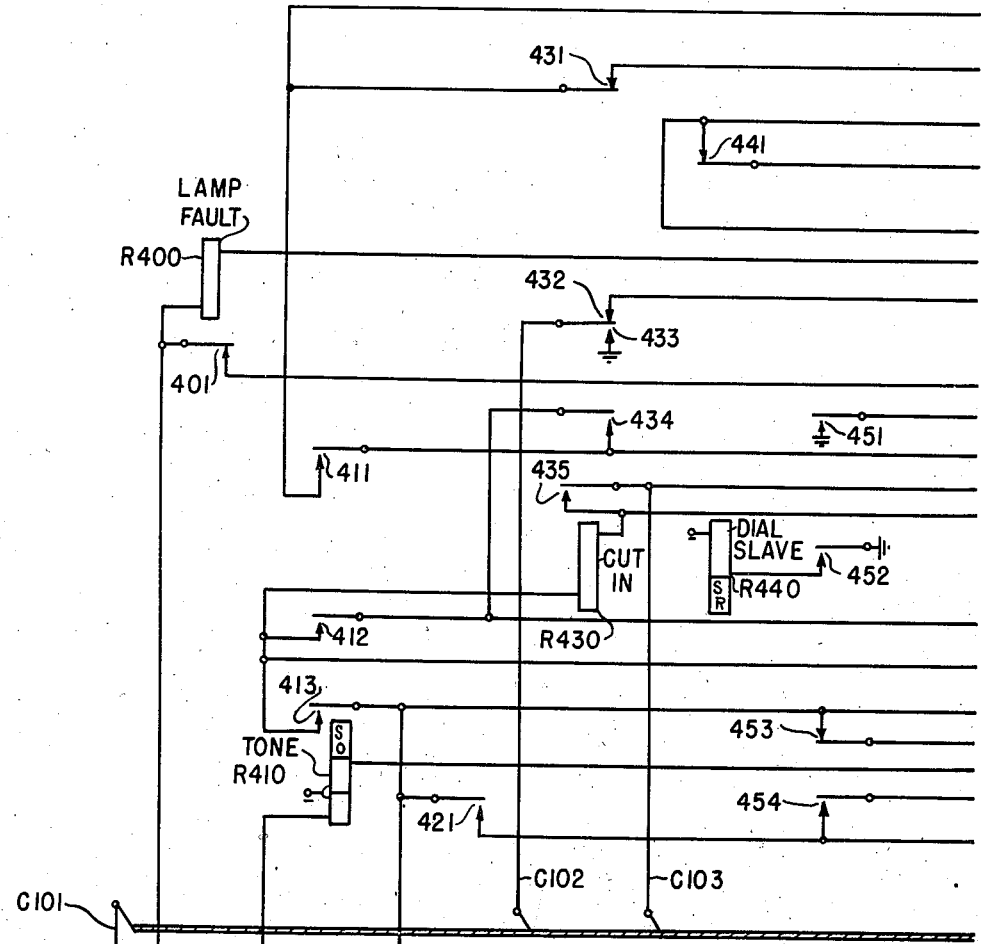

March 30, 1943.  F. KESSLER  2,314,990
TELEPHONE SYSTEM
Filed Oct. 24, 1941  19 Sheets-Sheet 5
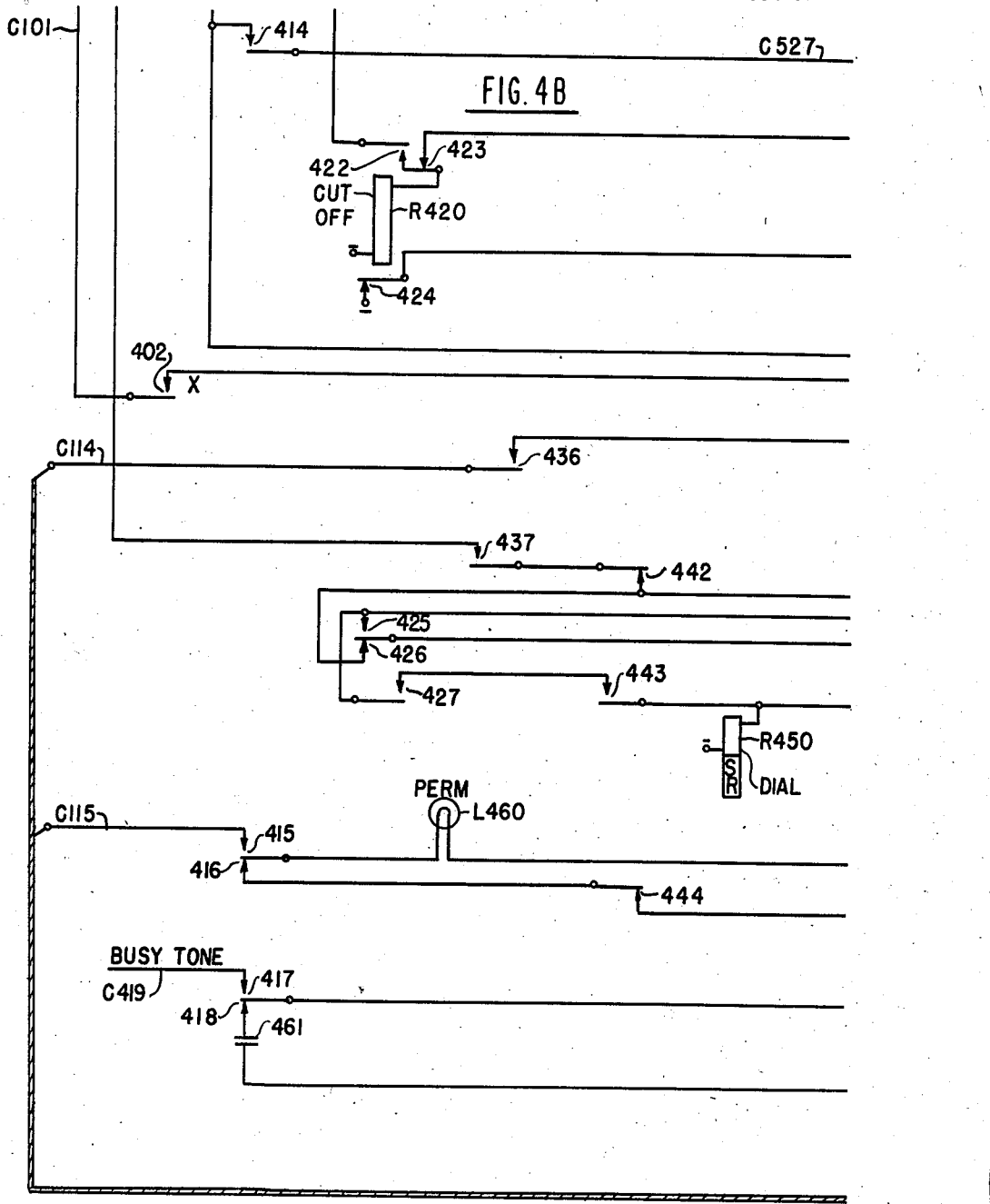
INVENTOR.
FRANK KESSLER
BY
Davis, Lindsey, Smith & Shonts
ATTORNEYS

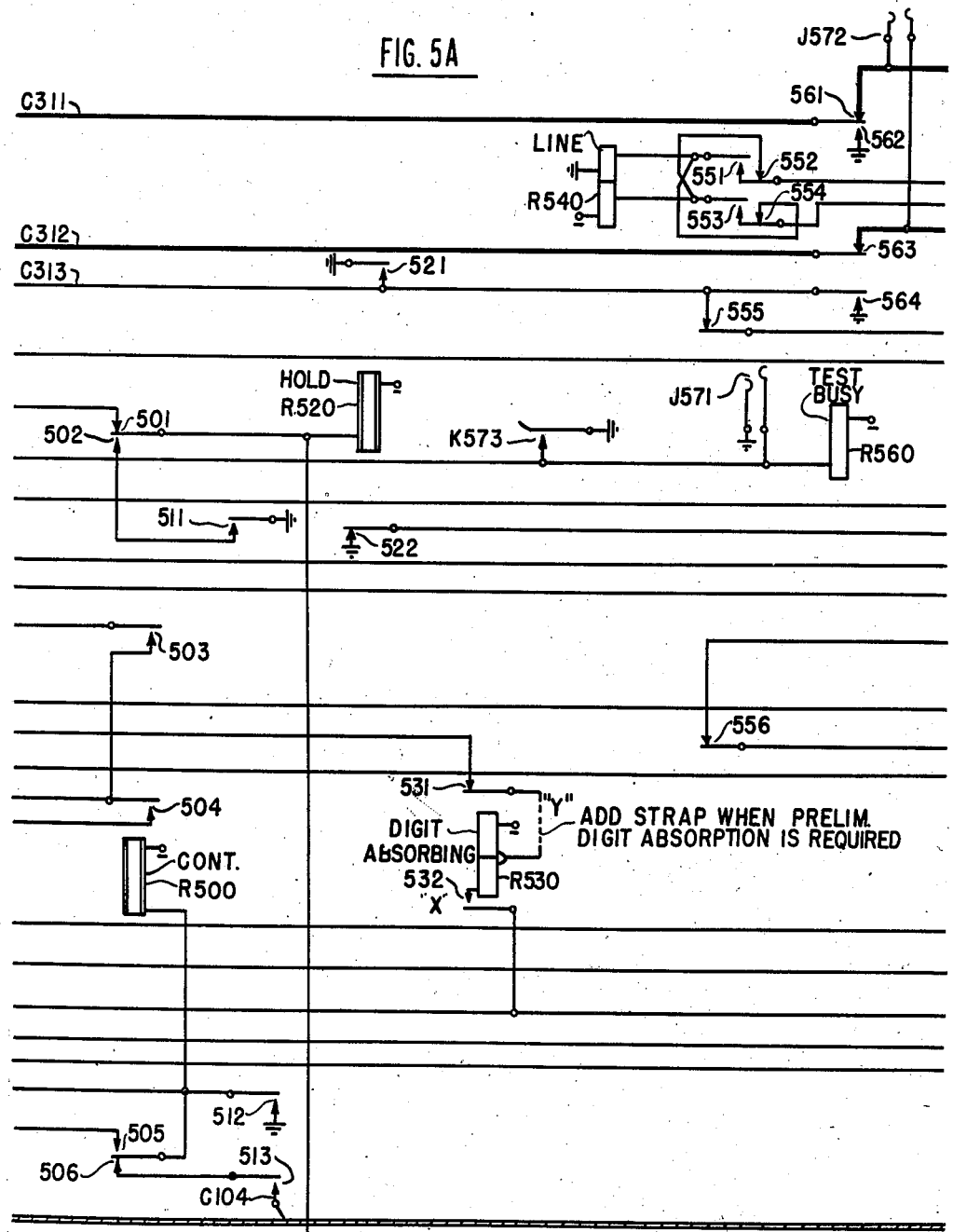

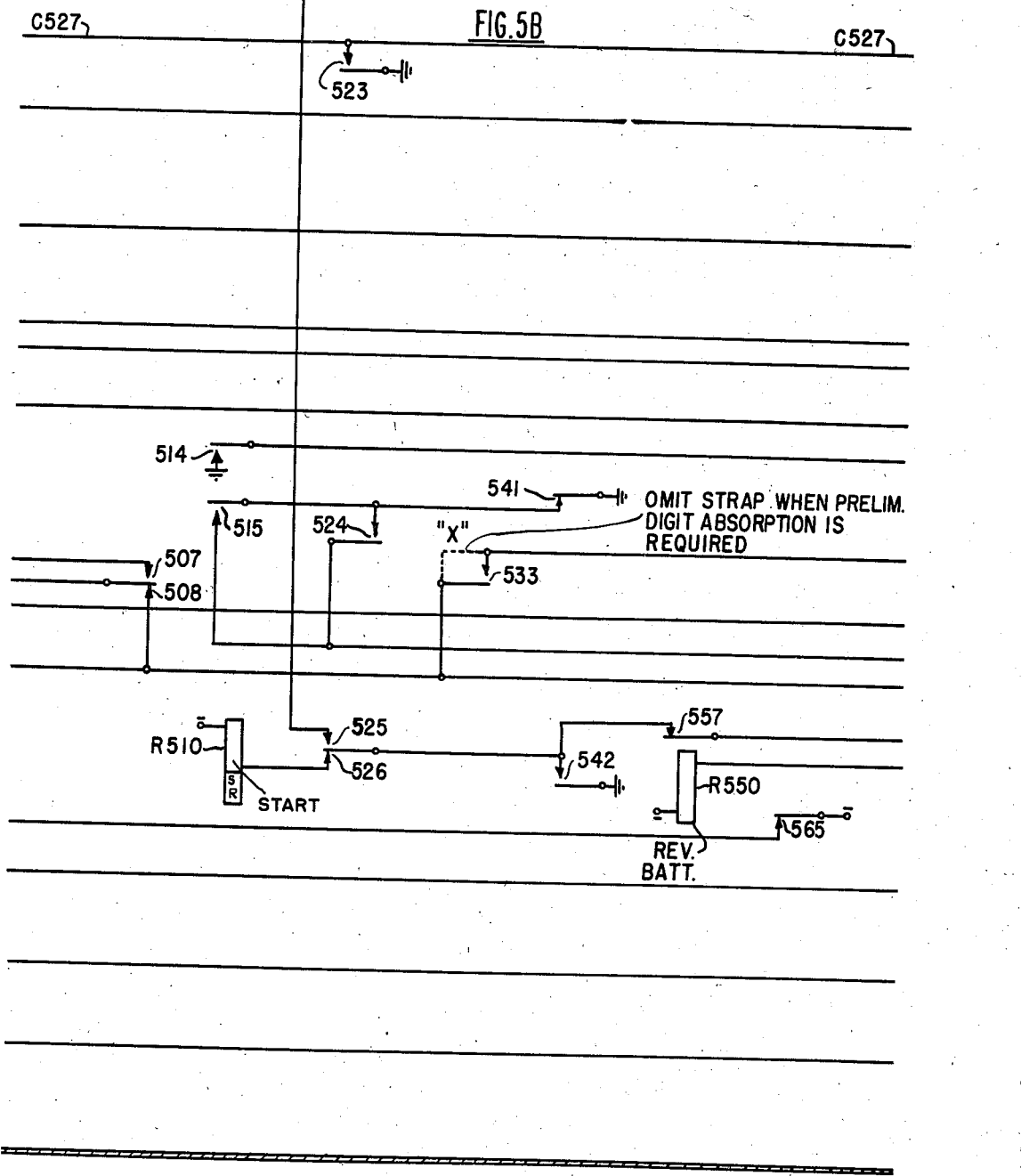

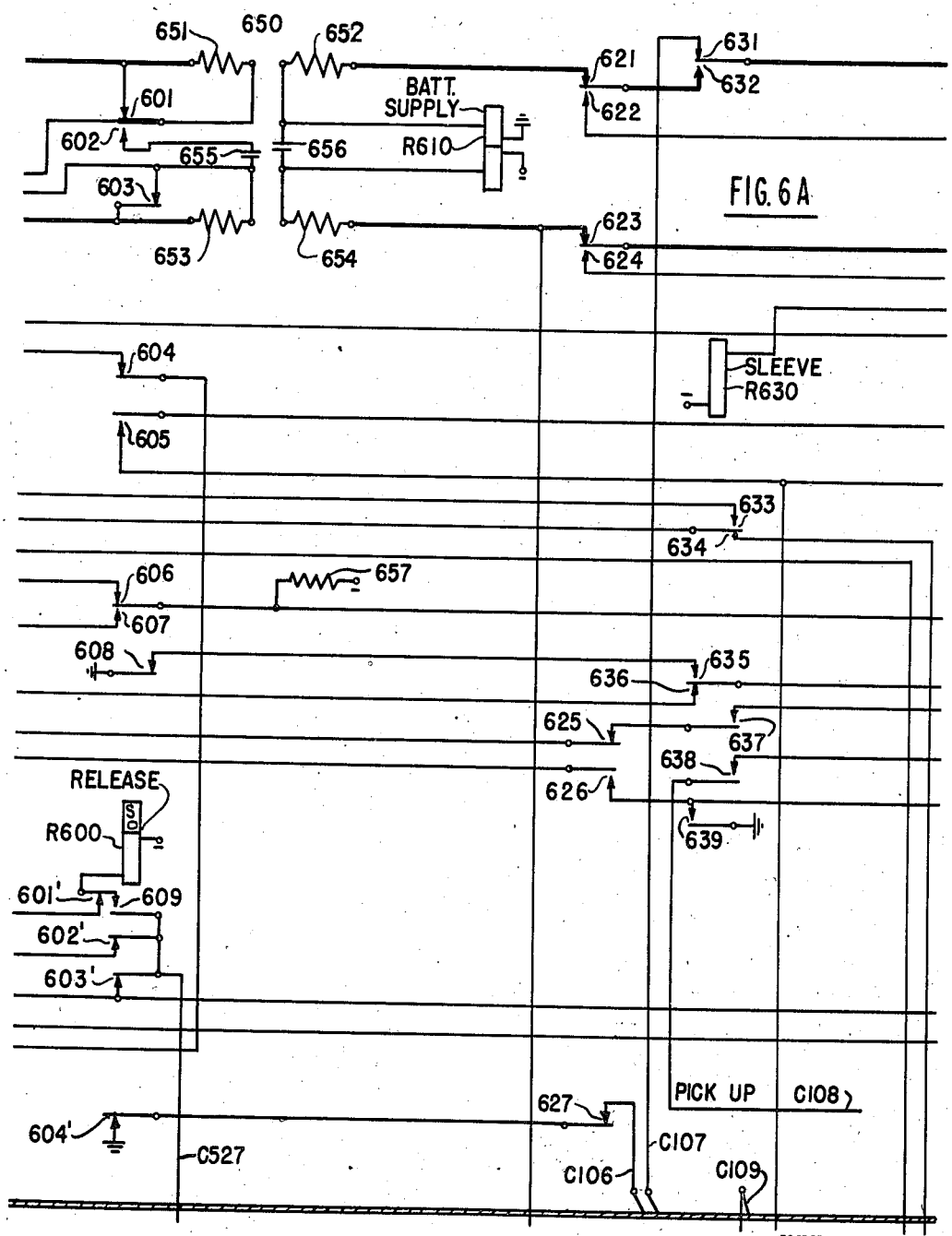

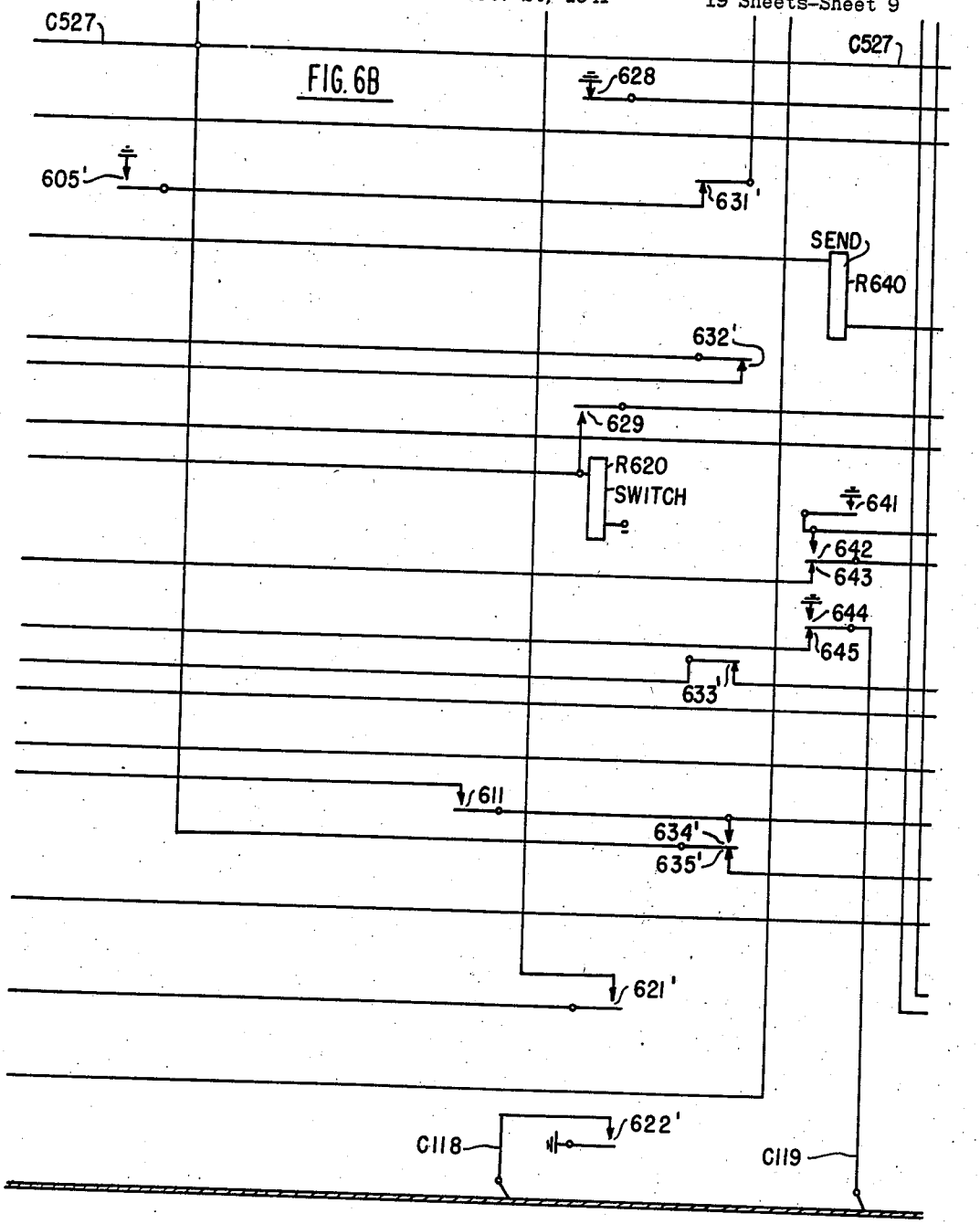

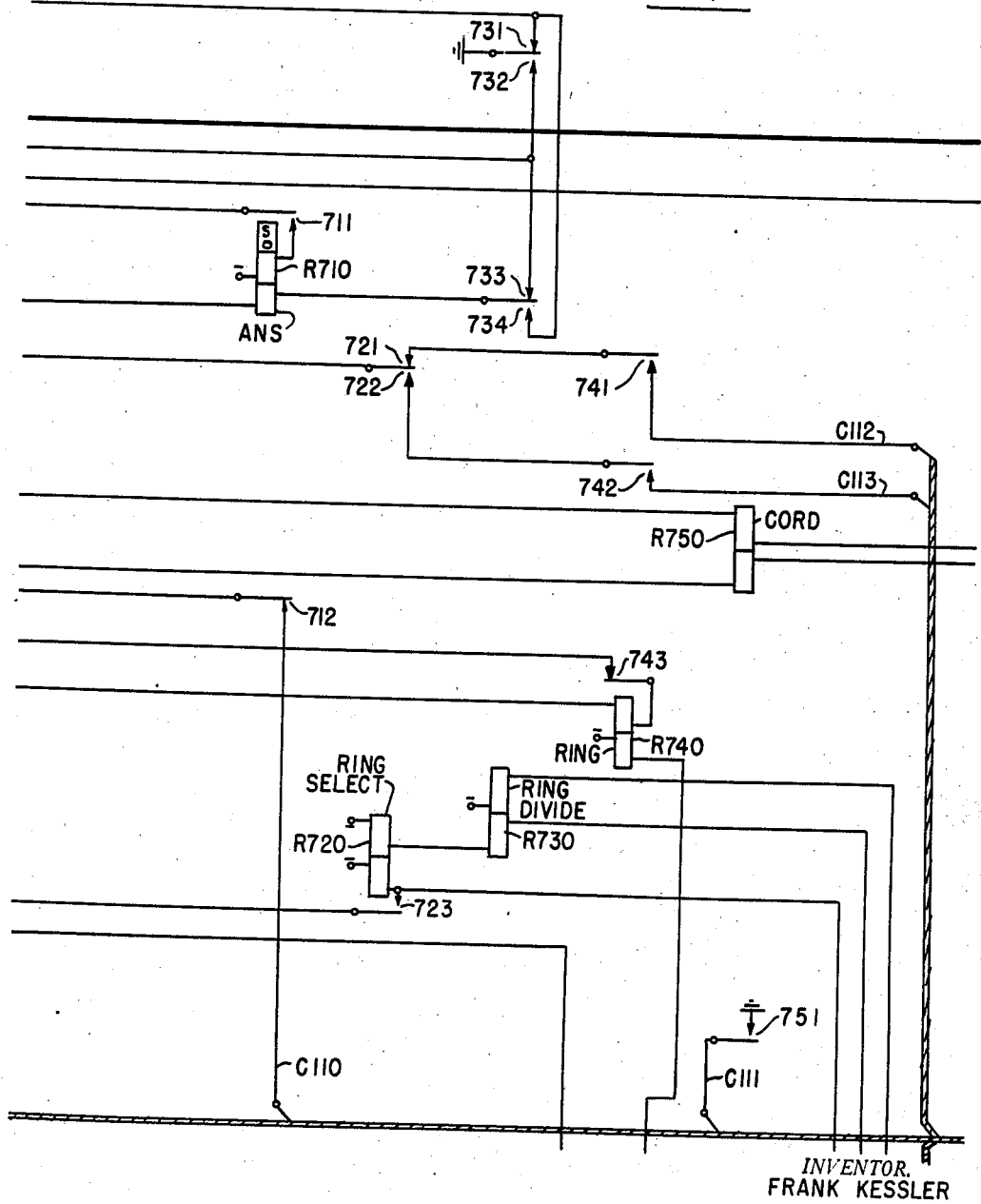

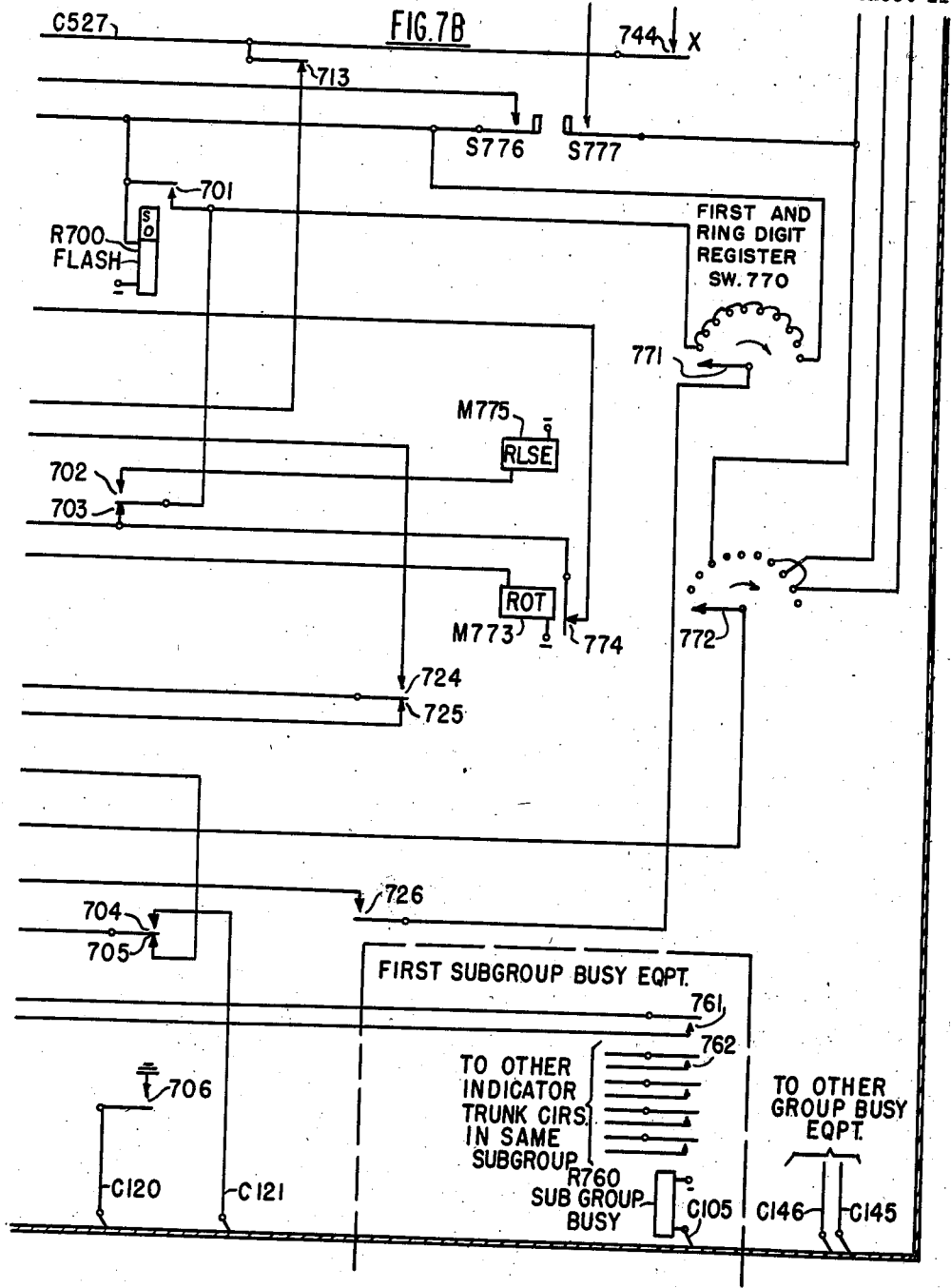

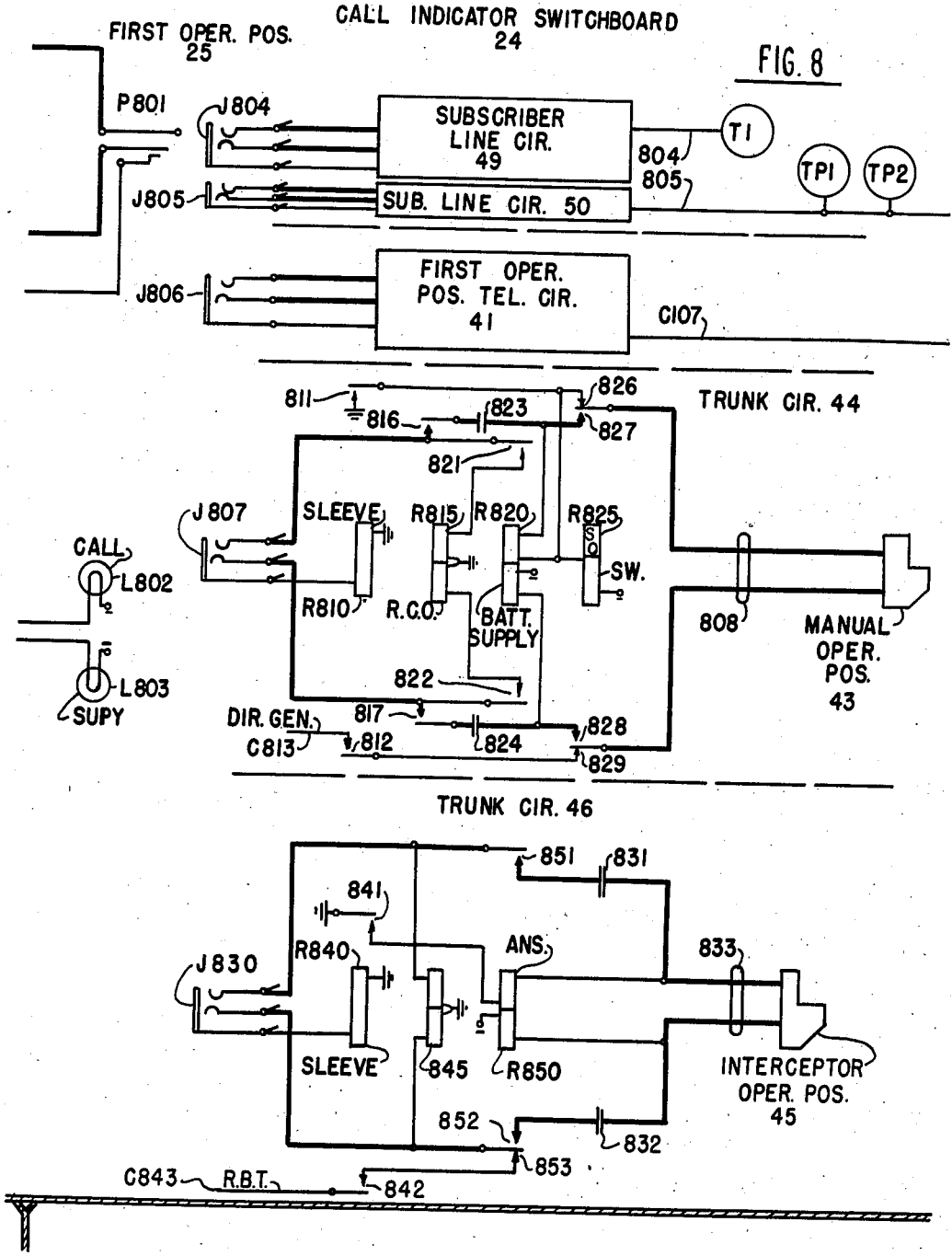

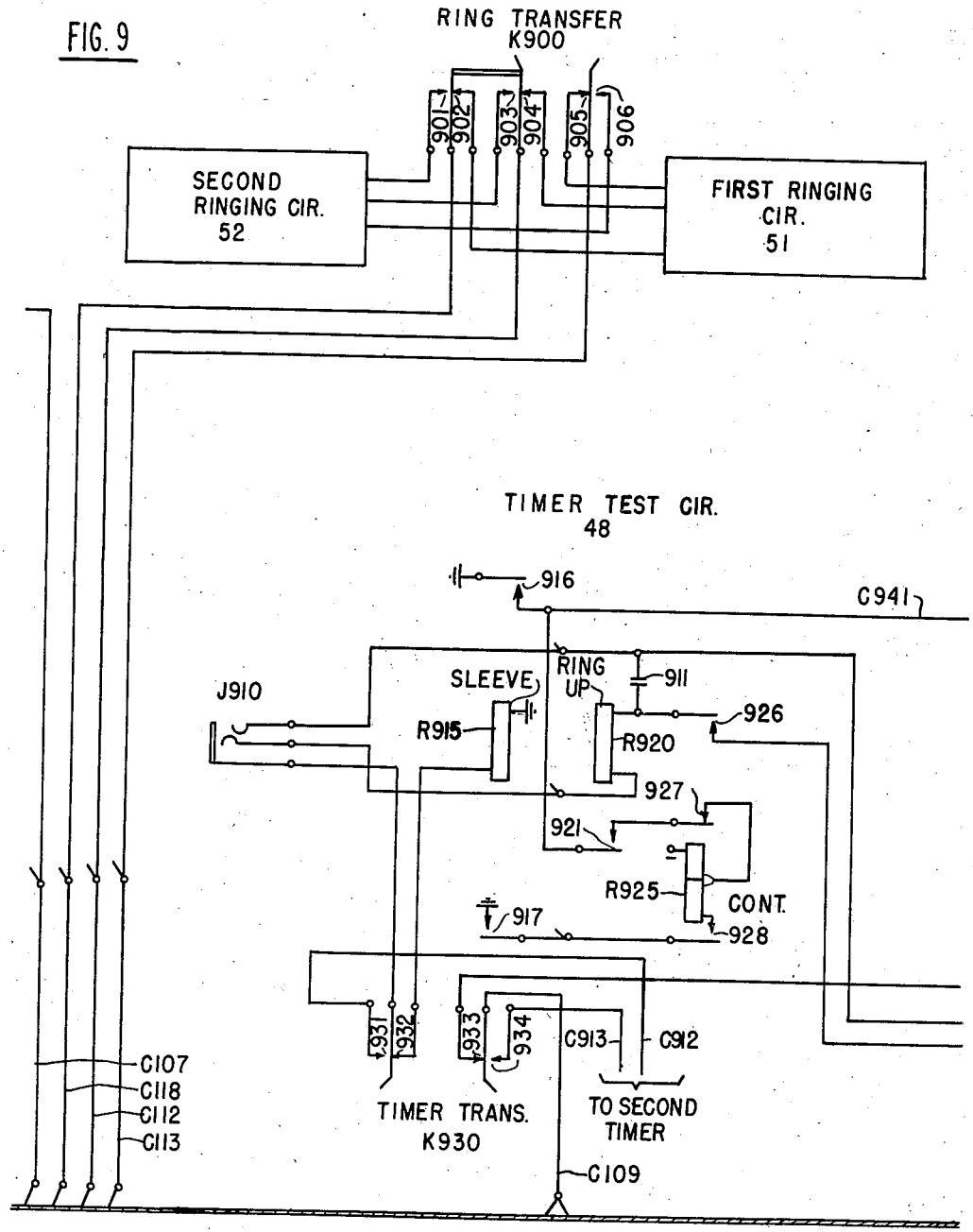

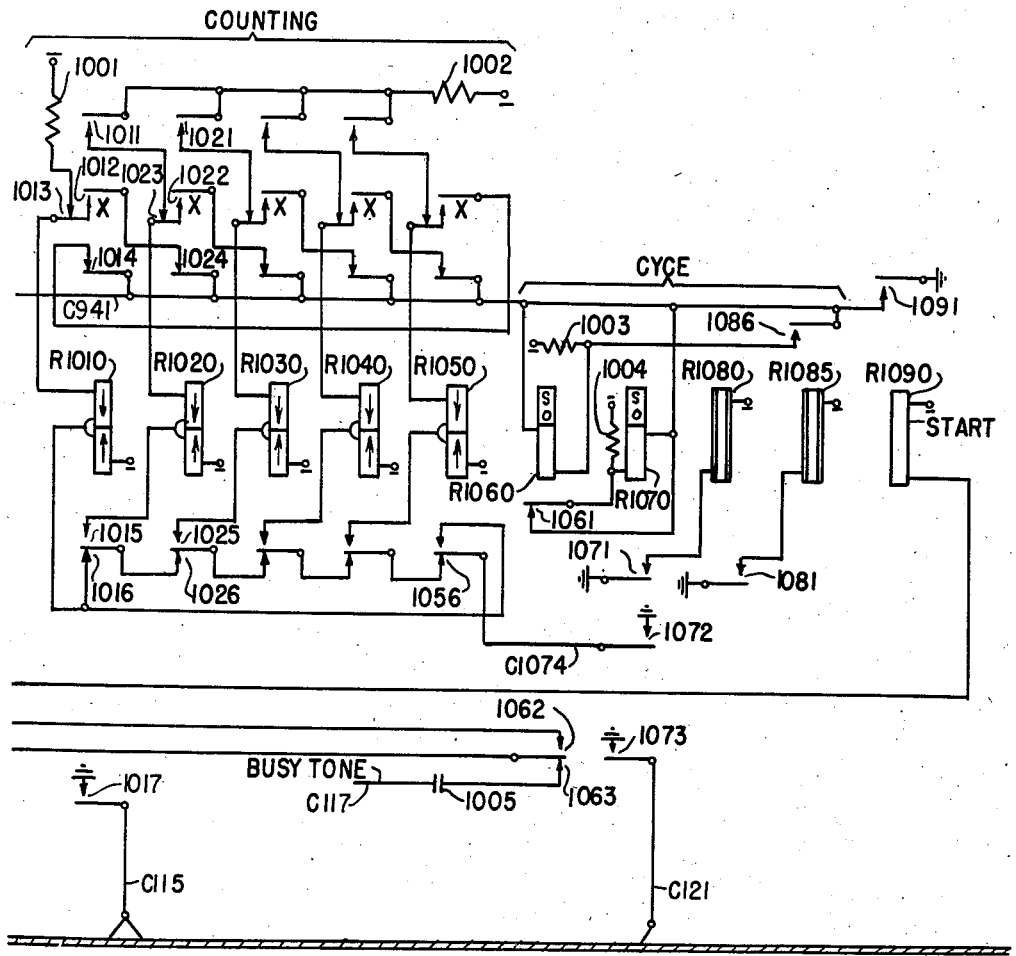

SUPERVISORY CIR. 42

March 30, 1943.   F. KESSLER   2,314,990
TELEPHONE SYSTEM
Filed Oct. 24, 1941   19 Sheets-Sheet 17

INVENTOR.
FRANK KESSLER
BY
Davis, Lindsey, Smith & Shonts
ATTORNEYS

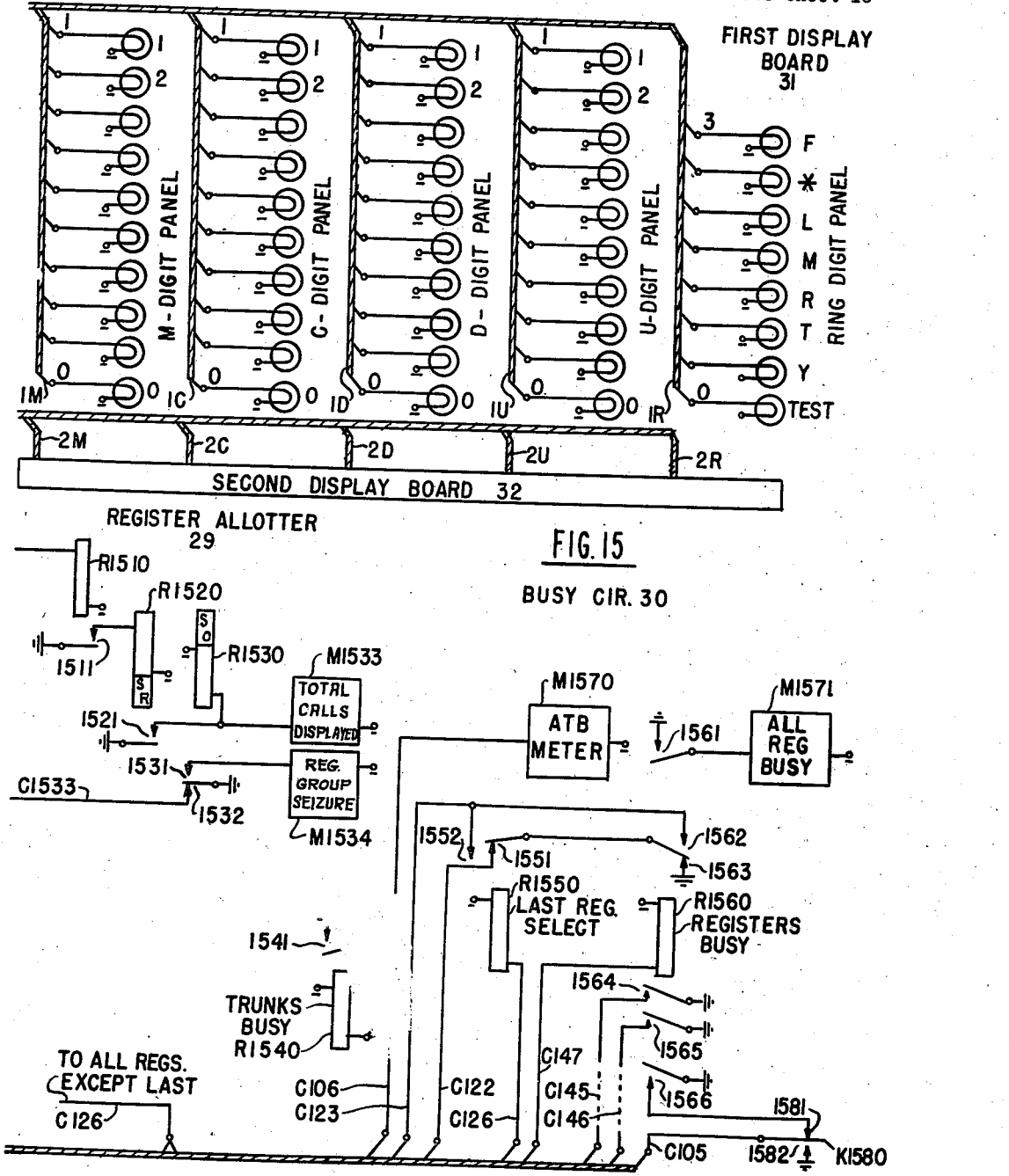

Patented Mar. 30, 1943

2,314,990

BEST AVAILABLE COPY

UNITED STATES PATENT OFFICE 2,314,990

TELEPHONE SYSTEM

Frank Kessler, Villa Park, Ill., assignor to Associated Electric Laboratories, Inc., Chicago, Ill., a corporation of Delaware Application October 24, 1941, Serial No. 416,364

57 Claims. (Cl. 179—27)

The present invention relates to telephone systems and more particularly to improved apparatus for increasing the efficiency with which connections are set up between exchanges of different types in such systems.

In a telephone system comprising both automatic and manual exchanges, each manual exchange is provided with a switchboard which is equipped to handle incoming calls from both the automatic and the manual exchanges. The section of the switchboard which is equipped to handle calls incoming from the automatic exchanges usually comprises call register-announcer apparatus adapted first to register and then to announce or display the called telephone number before the selected operator position and to identify the calling cord circuit in the associated group. The operator at the selected operator position then sets up the call as announced by way of the plug terminating the calling cord circuit and the jack terminating the called line, after the usual tip busy test is made, performs the necessary key operations in order to cause the called line to be rung, supervises the established connection after the call is answered, and subsequently takes down the connection after the established connection is released.

While prior telephone systems of the type described are entirely satisfactory in service, more operations are required of the operators at the switchboard in order to set up the connections than is desirable.

Accordingly, it is the principal object of the present invention to provide in a telephone system of the type described, improved apparatus requiring a minimum number of extremely simple operations of the operators at the switchboard in order to set up the connections.

Another object of the invention is to provide in a telephone system of the type noted, an improved arrangement for allotting the individual register sets included in the register apparatus which have called telephone numbers registered therein to the associated call announcer.

Another object of the invention is to provide in a telephone system of the type noted, an arrangement for operating the call announcer to announce a fixed arbitrary character when no called telephone number is registered in the associated register set within a predetermined time interval after seizure thereof.

Another object of the invention is to provide in a telephone system of the type noted, a register set comprising an improved timing arrangement for controlling the connection thereof to the associated call announcer, whereby both complete and incomplete or mutilated calls are selectively announced.

Another object of the invention is to provide in a telephone system of the type noted, an arrangement for operating the call announcer to announce a fixed arbitrary character when an unassigned telephone number is registered in the associated register set.

A further object of the invention is to provide in a telephone system of the type noted, an arrangement for registering the line identity digits of a called telephone number in the register set for purposes of identifying the called line and for registering the signal digit of a called telephone number in the connected cord circuit for purposes of selecting the signaling to be performed over the called line.

A further object of the invention is to provide in a telephone system of the type noted, a cord circuit comprising an arrangement for absorbing at least one of the digits of a called telephone number received thereby.

Another object of the invention is to provide in a telephone system of the type noted, a cord circuit comprising an improved control arrangement whereby it may be selectively controlled over either a two-wire trunk or a three-wire trunk.

A further object of the invention is to provide in a telephone system of the type noted, an improved arrangement for transferring incoming trunks between two groups of cord circuits respectively associated with two operator positions at the switchboard.

A further object of the invention is to provide in a telephone system of the type noted, an arrangement for completely registering the first digit of the called telephone number in the cord circuit and then for transmitting the first digit registered to the associated register set to be registered therein, thereby to permit ample time for the association of the register set with the cord circuit.

A further object of the invention is to provide in a telephone system of the type noted, a cord circuit comprising facility for registering both the first line identity digit and the ring digit of a called telephone number.

A further object of the invention is to provide an improved arrangement for effectively transferring a registered number from a register set to a numerical line selecting switch wherein the complement of the registered number is actually transferred.

A still further object of the invention is to provide in a telephone system of the type noted, an improved arrangement comprising a single control conductor which is utilized both as an impulse transfer conductor between a cord circuit and the associated register set and as a signal control conductor for the signal individually associated with the cord circuit.

Further features of the invention pertain to the particular arrangement of the circuit elements thereof, whereby the above-outlined and additional operating features are attained.

The invention, both as to its organization and method of operation, together with further objects and advantages thereof, will best be understood by reference to the following specification taken in connection with the accompanying drawings, in which Figure 1 illustrates the general arrangement of a telephone system embodying the present invention; Figs. 2 to 15, inclusive, taken together, illustrate the details of the system having incorporated therein the features of the invention, as briefly outlined above; and Fig. 16 illustrates the mode of combining Figs. 2 to 15, inclusive, in order to form a unified system.

*Description of the apparatus incorporated in the telephone system*

Referring now more particularly to Fig. 1 of the drawings, the telephone system there illustrated comprises a central office 21 of the manual type serving a number of subscriber substations, including the subscriber substations T1, TP1, TP2, etc., an adjacent exchange 22 of the automatic type serving a number of subscriber substations, including the subscriber substation T2, and a distant exchange 23 of the automatic type serving a number of subscriber substations, including the subscriber substation T3. The central office 21 comprises a manual call indicator switchboard 24, including a first operator position 25 and a second operator position 35, and a manual operator position 43 and an interceptor operator position 45 associated therewith. Also, the central office 21 comprises a number of groups of indicator trunk circuits individually associated with the operator positions at the switchboard 24; a first of these groups including the call indicator trunk circuit 26 and being individually associated with the first operator position 25, and a second of these groups including the call indicator trunk circuit 36 and being individually associated with the second operator position 35; and a number of groups of registers individually associated with the groups of indicator trunk circuits; a first of these groups including the first register 28 and being individually associated with the first group of indicator trunk circuits, and a second of these groups being individually associated with the second group of indicator trunk circuits. More particularly, each of the indicator trunk circuits comprises a register selector individual thereto having access to the associated group of registers. For example, the indicator trunk circuit 26 has a register selector 27 individual thereto which has access to the first group of registers, including the first register 28; and the indicator trunk circuit 36 has a register selector 37 individual thereto which has access to the second group of registers, not shown. Also a number of pairs of call announcers or display boards are individually associated with the various operator positions at the switchboard 24 and with the associated group of registers. For example, the pair of display boards, including the first display board 31 and the second display board 32, is individually associated with the first operator positon 25 at the switchboard 24 and with the first group of registers, including the first register 28. Further, each group of registers is provided with a register allotter and a busy circuit individual thereto; the first group of registers, including the first register 28, being provided with the register allotter 29 and the busy circuit 30. The register allotter 29 allots the registers in the first group to the pair of display boards 31—32 in a predetermined order, as explained more fully hereinafter; while the busy circuit 30 is operated in response to an all-busy condition of the first group of indicator trunk circuits or the first group of registers, in a manner more fully explained hereinafter.

Each operator position at the switchboard 24 comprises position equipment which is utilized in conjunction with the associated group of indicator trunk circuits and the associated group of registers for completing, controlling and supervising the extension of calls therefrom. More particularly, the first operator position 25 at the switchboard 24 comprises position equipment, including a supervisory circuit 42, associated with the first group of registers, and first and second ringing circuits 51 and 52 associated with the first group of indicator trunk circuits. Further, the position equipment at the first operator position 25 at the switchboard 24 comprises plug and jack equipment terminating the various trunks and lines extending thereto, in a manner more fully explained hereinafter, as well as a position telephone circuit 41, a timer test circuit 48, a first timer 47 and a second timer, not shown.

The subscriber substations served by the central office 21 include both private subscriber substations T1, etc., and party subscriber substations TP1, TP2, etc. Each private subscriber substation has a subscriber line individually extending thereto which terminates in a subscriber line circuit accessible to the jack equipment disposed at the various operator positions at the switchboard 24; for example, the subscriber line 804 individually extends to the private subscriber substation T1 and terminates in the subscriber line circuit 49 accessible to the jack equipment mentioned. Similarly, each group of party subscriber substations has a subscriber line commonly extending thereto which terminates in a subscriber line circuit accessible to the jack equipment disposed at the various operator positions at the switchboard 24; for example, the subscriber line 805 commonly extends to the group of party subscriber substations TP1, TP2, etc., and terminates in the subscriber line circuit 50 accessible to the jack equipment mentioned. A number of trunks 808, etc., extend to the manual operator position 43 and are respectively terminated in a number of trunk circuits 44, etc., accessible to the jack equipment disposed at the various operator positions at the switchboard 24. Similarly, a number of trunks 833, etc., extend to the interceptor operator position 45 and are respectively terminated in a number of trunk circuits 46, etc., accessible to the jack equipment disposed at the various operator positions at the switchboard 24.

A subscriber line extends to each subscriber substation served by the adjacent exchange 22 and is accessible to automatic switching apparatus 71 disposed therein, the subscriber line 72 extending to the subscriber substation T2. Similarly, a subscriber line extends to each subscriber substation served by the distant exchange 23 and is accessible to automatic switching apparatus 81 disposed therein, the subscriber line 82 extending to the subscriber substation T3.

Further, the central office 21, the adjacent exchange 22 and the distant exchange 23 are interconnected by a number of trunk lines 300, etc., of the Y type. More particularly, the trunk line 300 comprises a first incoming branch 300Y extending to the adjacent exchange 22, a second incoming branch 300X extending to the distant exchange 23 and a stem terminating in a traffic transfer circuit 61 disposed in the central office 21. More particularly, the incoming branch 300Y of the trunk line 300 extending to the adjacent exchange 22 is accessible to the automatic switching apparatus 71 disposed therein; while the incoming branch 300X of the trunk line 300 extending to the distant exchange 23 terminates in a trunk circuit 91 therein, the trunk circuit 91 being provided with a trunk 260 accessible to the automatic switching apparatus 81 disposed therein. Finally, it is noted that the incoming branch 300Y of the trunk line 300 is of the three-wire type in view of the proximity of the adjacent exchange 22 to the central office 21; while the incoming branch 300X of the trunk line 300 is of the two-wire type in view of the remoteness of the distant exchange 23 with respect to the central office 21. At this point it is noted that, instead of utilizing a single group of trunk lines of the Y-type having branches respectively extending to the adjacent exchange 22 and to the distant exchange 23, two separate and independent groups of trunk lines may be provided in the system. In this case, a first group of trunk lines of the three-wire type, as illustrated, will extend between the central office 21 and the adjacent exchange 22 and a second group of trunk lines of the two-wire type, as illustrated, will extend between the central office 21 and the distant exchange 23.

The trunk lines 300, etc., incoming to the traffic transfer circuit 61 are arranged in groups which may be selectively connected to a number of groups of trunks respectively extending to the groups of indicator trunk circuits. For example, the traffic transfer circuit 61 is selectively controllable to connect the trunk line 300 to a trunk 310 included in a first group and extending to the indicator trunk circuit 26 included in the first group, or to a trunk 320 included in a second group and extending to the indicator trunk circuit 36 included in the second group, for a purpose more fully explained hereinafter.

Figure 2:
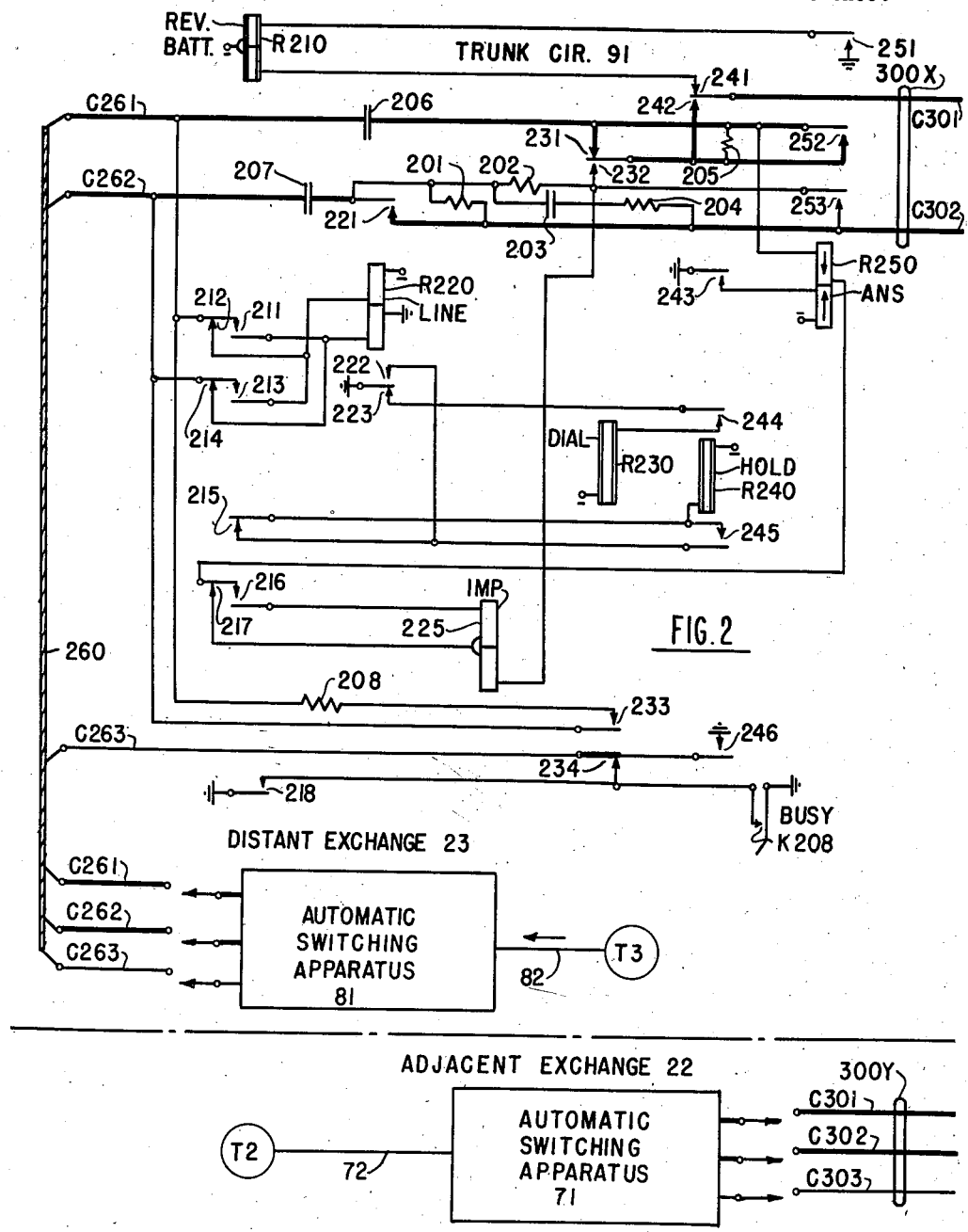

Preferably, each of the private subscriber substations T1, etc., as well as each of the party subscriber substations TP1, TP2, etc., served by the central office 21, shown in Fig. 8, comprise conventional substation equipment of the manual type, including a telephone instrument and a ringer; similarly, each of the subscriber substations T2, etc., served by the adjacent exchange 22, as well as each of the subscriber substations T3, etc., served by the distant exchange 23, shown in Fig. 2, comprise conventional substation equipment of the automatic type, including a telephone instrument, a calling device or dial and a ringer. Preferably, the automatic switching apparatus 71 disposed in the adjacent exchange 22, as well as the automatic switching apparatus 81 disposed in the distant exchange 23, shown in Fig. 2, are of the conventional Strowger type.

Preferably, each of the trunk circuits in the distant exchange 23 is identical to the trunk circuit 91, shown in Fig. 2, which comprises a relay group including a reverse battery relay R210, a line relay R220, a dial relay R230, a hold relay R240, and an answer relay R250, an impedance 225, a busy key K208, and a control network connected and arranged in a manner more fully described hereinafter.

Figure 3:
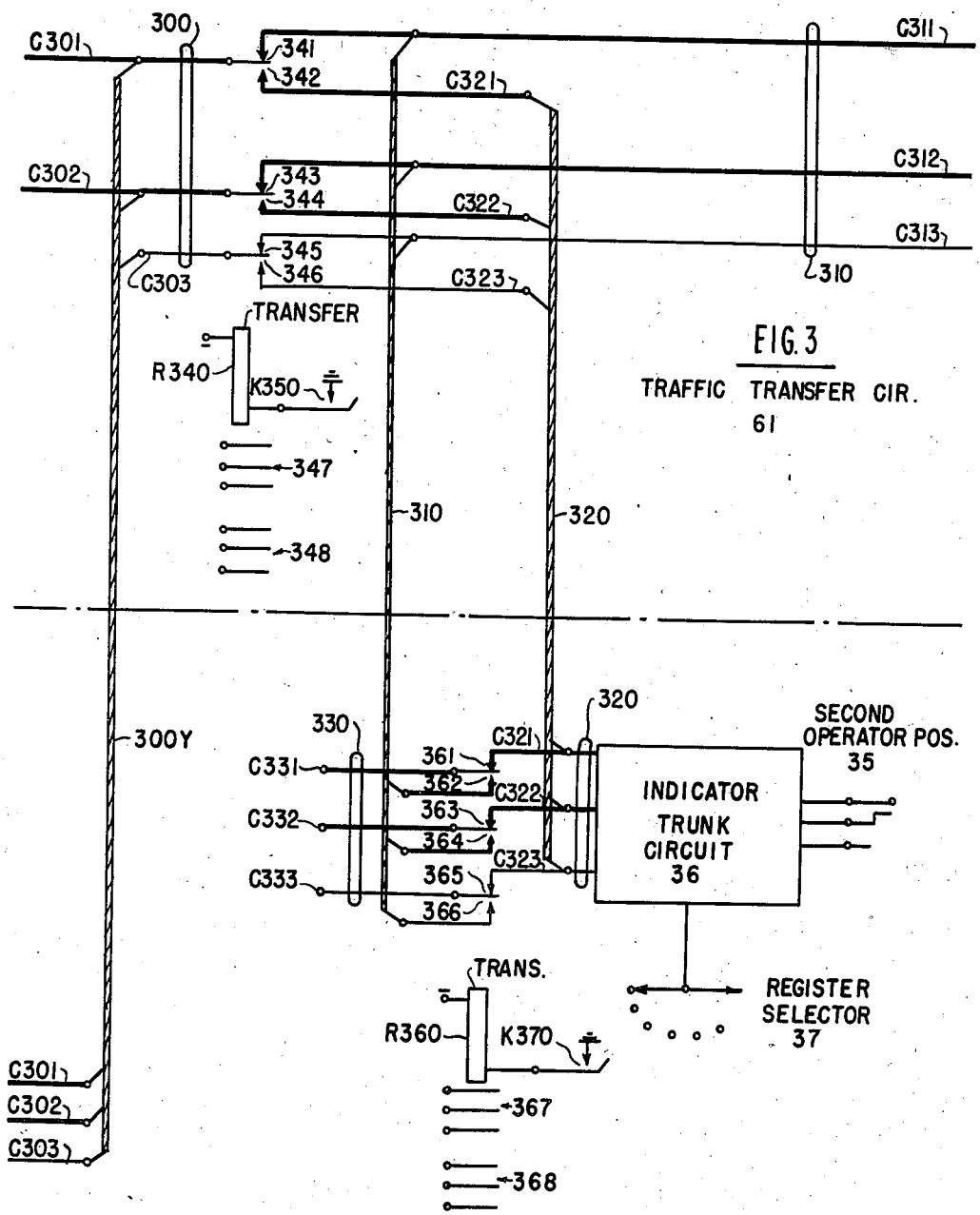

The traffic transfer circuit 61, shown in Fig. 3, comprises a number of transfer relays R340, R360, etc., provided with corresponding transfer keys K350, K370, etc. Each of the transfer relays corresponds to a subgroup of one of the groups of trunk lines incoming to the central office 21 and is operative to transfer the associated subgroup of trunk lines from a subgroup of one of the groups of indicator trunk circuits to another, in a manner more fully explained hereinafter.

Preferably, each of the indicator trunk circuits is identical to the indicator trunk circuit 26, shown in Figs. 4 to 8, inclusive, which comprises a plug P801 disposed at the first operator position 25 at the switchboard 24 and a repeater 650. Also the indicator trunk circuit 26 comprises a relay group, including a lamp fault relay R400, a tone relay R410, a cutoff relay R420, a cut-in relay R430, a dial slave relay R440, a dial relay R450, a control relay R500, a start relay R510, a hold relay R520, a digit absorbing relay R530, a line relay R540, a reverse battery relay R550, a test busy relay R560, a release relay R660, a battery supply relay R610, a switch relay R620, a sleeve relay R630, a send relay R640, a flash relay R700, an answer relay R710, a ring select relay R720, a ring divide relay R730, a ring relay R740, and a cord relay R750. Further the indicator trunk circuit 26 comprises a first and ring digit register switch 770, a permanent lamp L460, a call lamp L802, a supervisory lamp L803, two test jacks J571 and J572, and a control network connected and arranged in a manner more fully described hereinafter, the call lamp L802 and the supervisory lamp L803 being disposed at the first operator position 25 at the switchboard 24. The first and ring digit register switch 770 is of the minor type comprising two wipers 771 and 772 provided with individually associated contact banks, a rotary magnet M773 for driving the wipers noted, and a release magnet M775 for releasing the wipers and for causing them to be returned to their normal positions. Also associated with the switch 770 are two sets of switch springs S776 and S777 which are actuated when the wipers noted are moved away from their normal positions.

Figure 12:
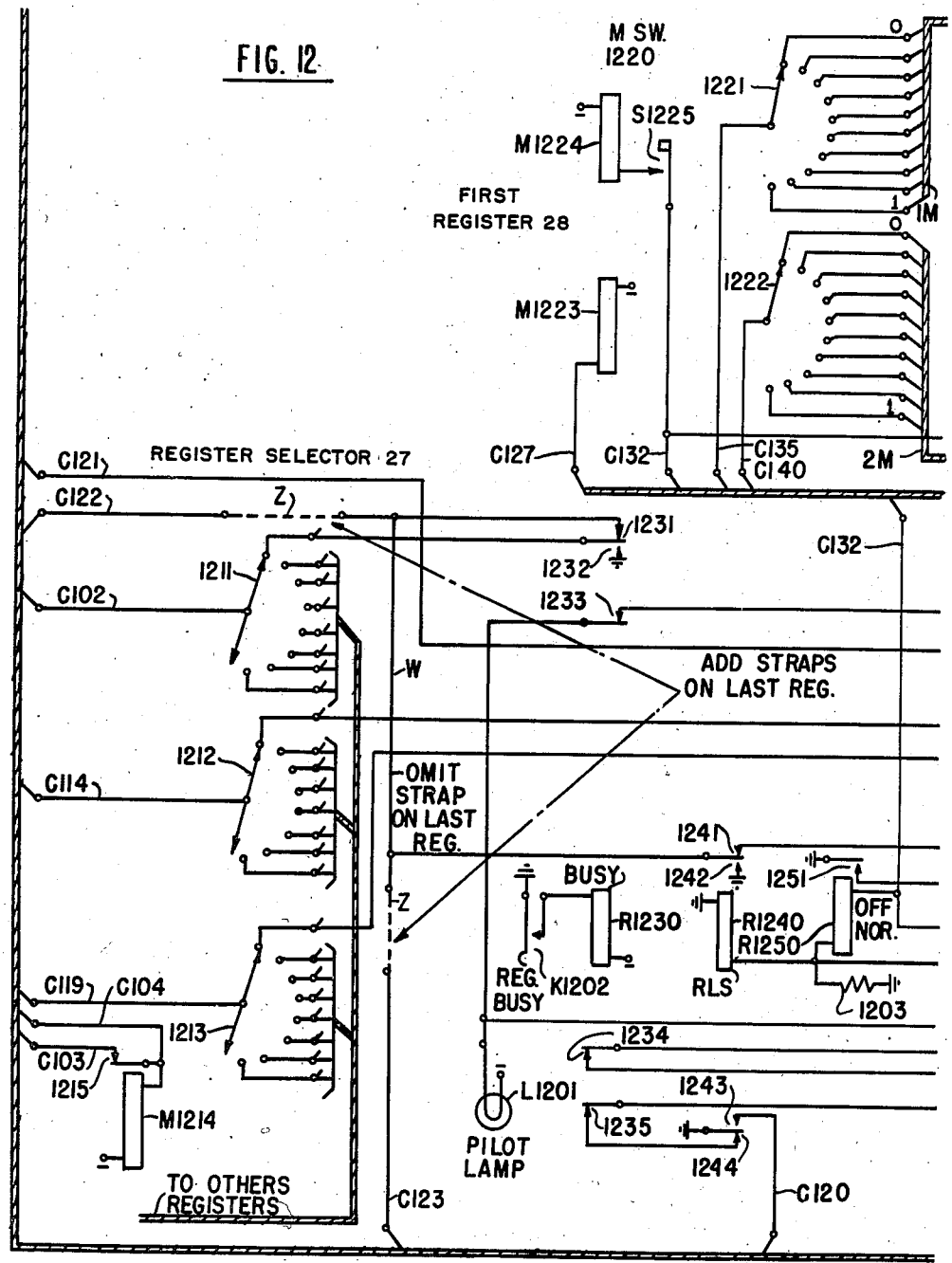

Preferably, each of the register selectors is identical to the register selector 27, shown in Fig. 12, and individually associated with the indicator trunk circuit 26. The register selector 27 is of the rotary type, comprising three wipers 1211, 1212 and 1213 provided with individually associated contact banks, a rotary magnet M1214 for driving the wipers noted, and a control network connected and arranged in a manner more fully described hereinafter.

Figure 13:
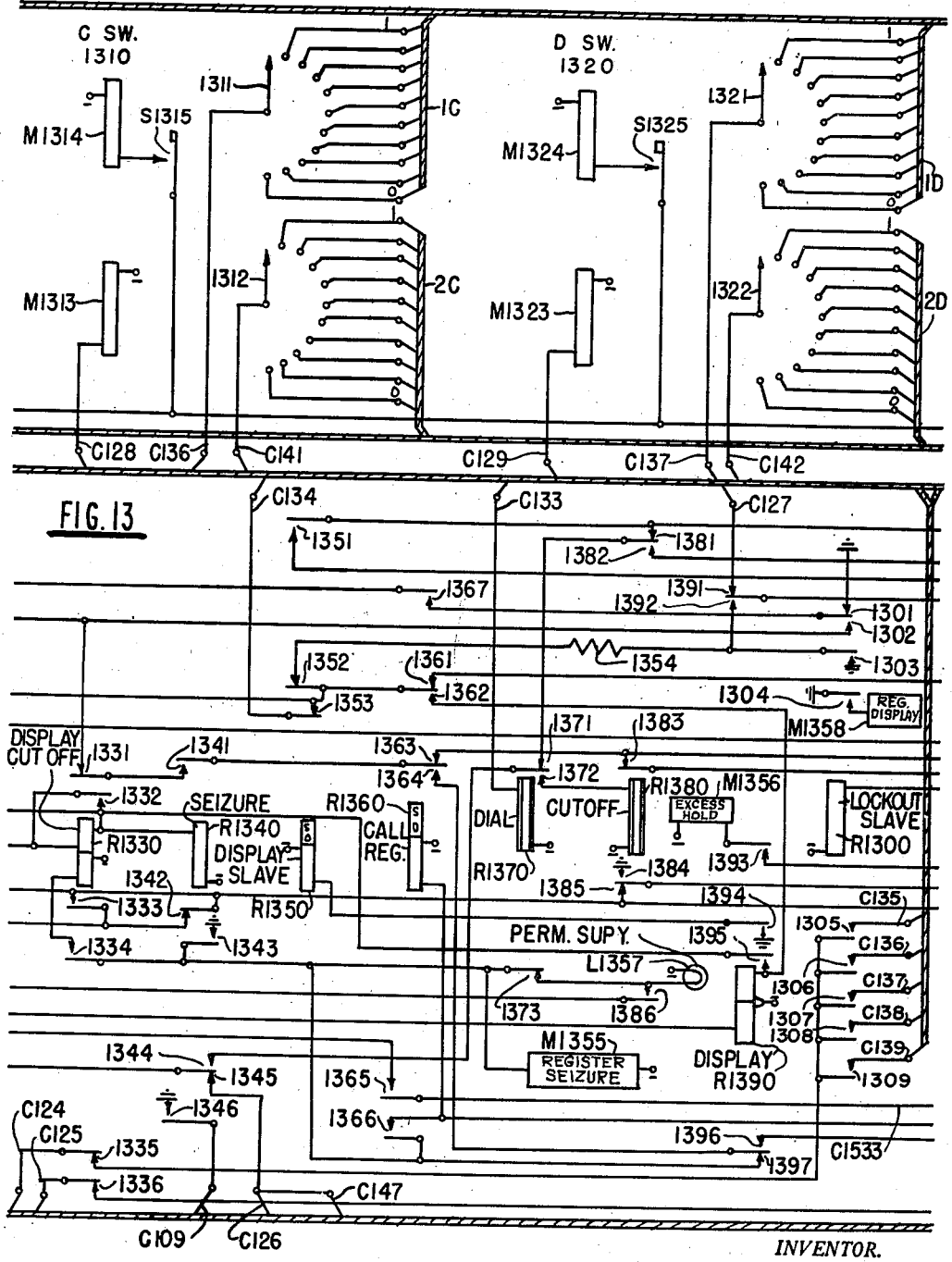
Figure 14:
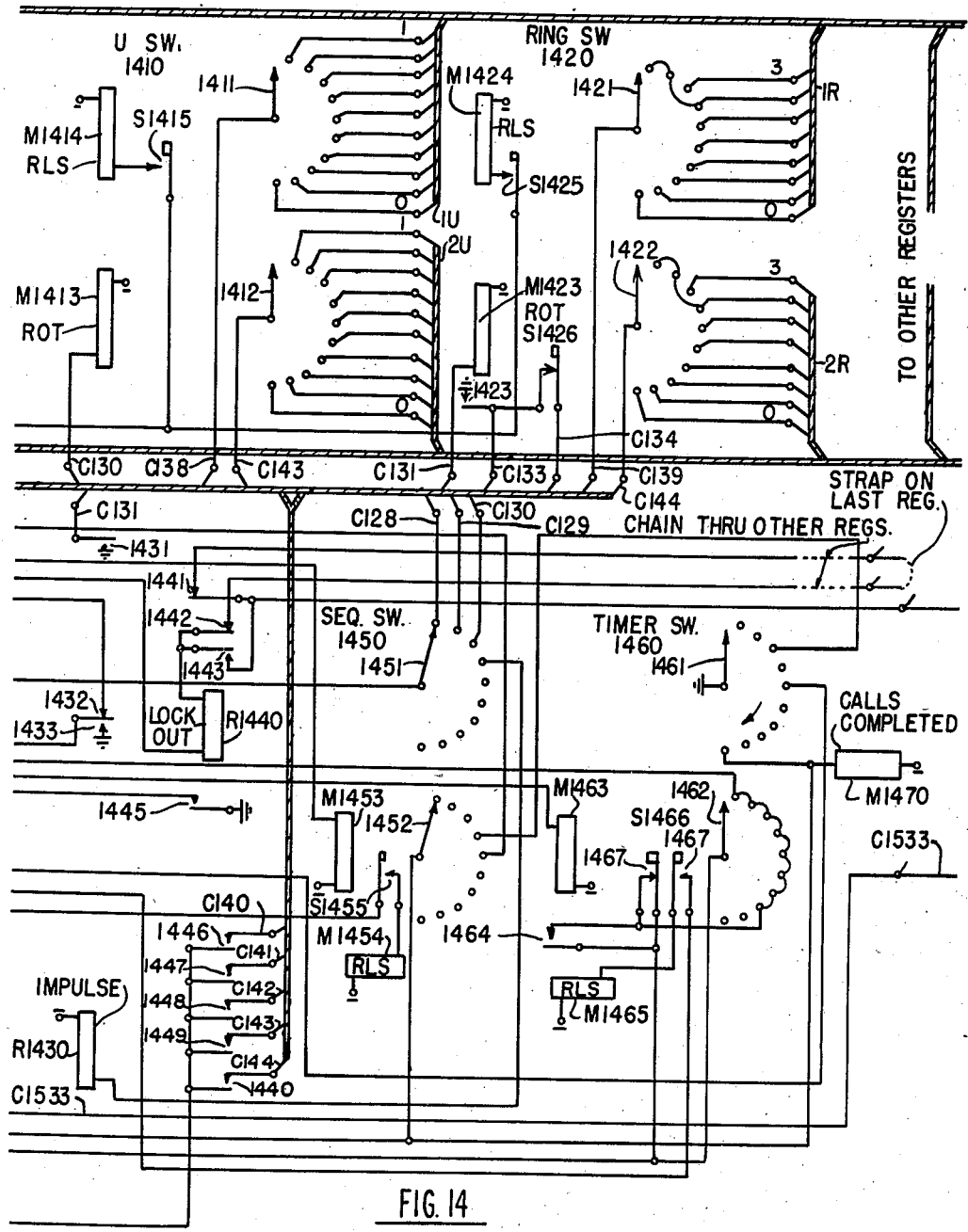

Preferably, each of the registers is identical to the first register 28, shown in Figs. 12 to 14, inclusive, which comprises an M switch 1220, a C switch 1310, a D switch 1320, a U switch 1410 and a ring switch 1420 adapted respectively to register the thousand digit, the hundred digit, the ten digit, the unit digit and the ring digit of a called directory number. Also the first register 28 comprises a sequence switch 1450 and a timer switch 1460. The M switch 1220 is of the minor type comprising two wipers 1221 and 1222 provided with individually associated contact banks, a rotary magnet M1223 for driving the wipers noted, a release magnet M1224 for releasing the wipers and for causing them to be returned to their normal positions, and a set of switch springs S1225 which is actuated when the wipers noted are moved away from their normal positions; the C switch 1310 is of the minor type comprising two wipers 1311 and 1312 provided with individually associated contact banks, a rotary magnet M1313 for driving the wipers noted, a release magnet M1314 for releasing the wipers and for causing them to be returned to their normal positions, and a set of switch springs S1315 which is actuated when the wipers noted are moved away from their normal positions; the D switch 1320 is of the minor type comprising two wipers 1321 and 1322 provided with individually associated contact banks, a rotary magnet M1323 for driving the wipers noted, a release magnet M1324 for releasing the wipers and for causing them to be returned to their normal positions, and a set of switch springs S1325 which is actuated when the wipers noted are moved away from their normal positions; the U switch 1410 is of the minor type comprising two wipers 1411 and 1412 provided with individually associated contact banks, a rotary magnet M1413 for driving the wipers noted, a release magnet M1414 for releasing the wipers and for causing them to be returned to their normal positions, and a set of switch springs S1415 which is actuated when the wipers noted are moved away from their normal positions; the ring switch 1420 is of the minor type comprising two wipers 1421 and 1422 provided with individually associated contact banks, a rotary magnet M1423 for driving the wipers noted, a release magnet M1424 for releasing the wipers and for causing them to be returned to their normal positions, and two sets of switch springs S1425 and S1426 which are actuated when the wipers noted are moved away from their normal positions; the sequence switch 1450 is of the minor type comprising two wipers 1451 and 1452 provided with individually associated contact banks, a rotary magnet M1453 for driving the wipers noted, a release magnet M1454 for releasing the wipers and for causing them to be returned to their normal positions, and a set of switch springs S1455 which is actuated when the wipers noted are moved away from their normal positions; and the timer switch 1460 is of the minor type comprising two wipers 1461 and 1462 provided with individually associated contact banks, a rotary magnet M1463 for driving the wipers noted, a release magnet M1465 for releasing the wipers and for causing them to be returned to their normal positions, and a set of switch springs S1466 which is actuated when the wipers noted are moved away from their normal positions.

Also the first register 28 comprises a relay group including a busy relay R1230, a release relay R1240, an off-normal relay R1250, a display cutoff relay R1330, a seizure relay R1340, a display slave relay R1350, a call registered relay R1360, a dial relay R1370, a cutoff relay R1380, a display relay R1390, a lockout slave relay R1300, an impulse relay R1430 and a lockout relay R1440. Further, the first register 28 comprises a register busy key K1202, a pilot lamp L1201, a permanent supervisory lamp L1357 and a number of meters including a register seizure meter M1355, an excess hold meter M1356, a regular display meter M1358 and a calls completed meter M1470, and a control network connected and arranged in a manner more fully described hereinafter.

Preferably, each of the register allotters is identical to the register allotter 29, shown in Fig. 15, which comprises a relay group including a start relay R1510, a start slave relay R1520 and a lockout relay R1530. Also the register allotter 29 comprises a total calls displayed meter M1533, a register group seizure meter M1534, and a control network connected and arranged in a manner more fully explained hereinafter.

Preferably, each of the busy circuits is identical to the busy circuit 30, shown in Figs. 7B and 15, which comprises a relay group including a trunks-busy relay R1540, a last register select relay R1550, a registers busy relay R1560 and a number of subgroup busy relays R760, etc., individually associated with the various subgroups of indicator trunk circuits in the first group, the subgroup busy relay R760 being individually associated with the subgroup of indicator trunk circuits, including the indicator trunk circuit 26, in the first group. Also, the busy circuit 30 comprises a number of subgroup busy keys K1580, etc., disposed at the first operator position 25 at the switchboard 24 and respectively corresponding to the various subgroup busy relays R760, etc. Finally, the busy circuit 30 comprises an all-trunks-busy meter M1570, an all-registers-busy meter M1571, and a control network connected and arranged in a manner more fully described hereinafter.

Preferably, each pair of the display boards is connected and arranged in a manner identical to the pair including the first display board 31 and the second display board 32, shown in Fig. 15, and individually associated with the first operator position 25 at the switchboard 24. More particularly, the first display board 31 is identical to the second display board 32, this pair of display boards being selectively controllable from the various registers in the first group, including the first register 28. More particularly, the first display board 31 comprises an M digit panel including ten lamps, a C digit panel including ten lamps, a D switch panel including ten lamps, a U digit panel including ten lamps, and a ring digit panel including eight lamps; the ten lamps in each of the four numerical digit panels corresponding to respective numerical digits, and the eight lamps in the ringer digit panel corresponding to the various ring and supervisory digits, explained more fully hereinafter.

Figure 11:
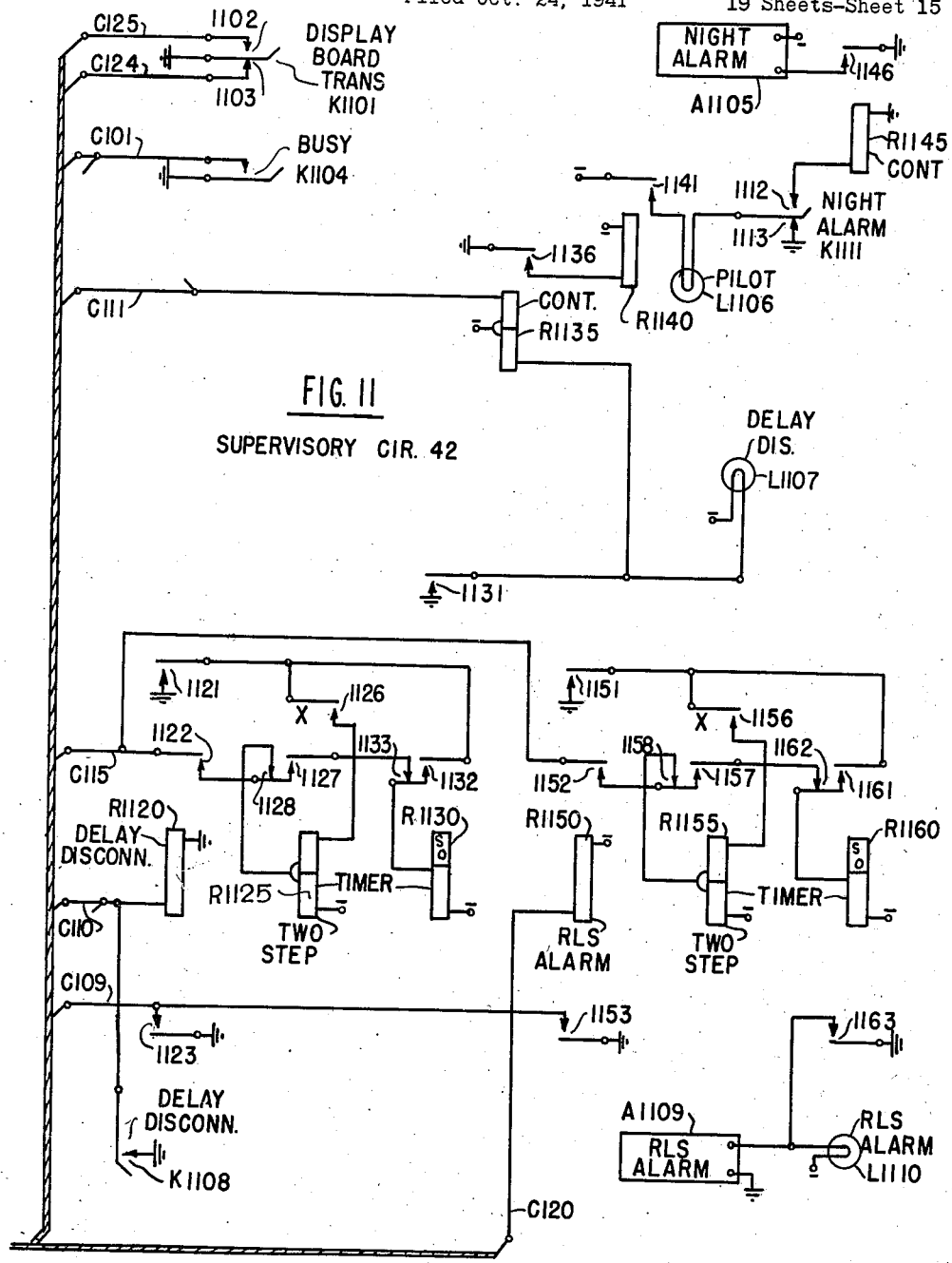

Preferably, the position equipment disposed at each operator position at the switchboard 24 is substantially identical to that provided at the first operator position 25, which comprises, as best shown in Figs. 8, 9 and 11, plug equipment, including a number of plugs P801, etc., respectively terminating the various indicator trunk circuits 26, etc., and suitable jack equipment. The jack equipment disposed at the first operator position 25 comprises a number of jacks J804, J805, etc., terminating the various subscriber line circuits 49, 50, etc., and multipled to the other operator positions at the switchboard 24, a number of jacks J807, J830, etc., terminating the trunk circuits 44, 46, etc., and multipled to the other operator positions at the switchboard 24, a jack J806 terminating the position telephone circuit 41 and a jack J910 terminating the timer test circuit 48.

Also, the position equipment disposed at the first operator position 25 comprises a number of control keys, including a ring transfer key K900, a timer transfer key K930, a display board transfer key K1101, a busy key K1104, a delay disconnect key K1108 and a night alarm key K1111. Further, this position equipment comprises a number of call lamps L802, etc., and a number of supervisory lamps L803, etc., respectively associated with the various indicator trunk circuits 26, etc., and the supervisory circuit 42. The supervisory circuit 42 comprises, as shown in Fig. 11, a relay group, including a delay disconnect relay R1120, a first pair of timer relays R1125 and R1130, a release alarm relay R1150, a second pair of timer relays R1155 and R1160, and a number of control relays R1135, R1140 and R1145. Further, the supervisory circuit 42 comprises a pilot lamp L1106, a delay disconnect lamp L1107, a release alarm lamp L1110, a night alarm A1105, a release alarm A1109 and a control network connected and arranged in a manner more fully described hereinafter.

Preferably, the first and second ringing circuits 51 and 52, shown in Fig. 9, are identical and of conventional connection and arrangement; while the timers are identical to the first timer 47, shown in Fig. 10. The first timer 47 comprises a relay group including a start relay R1090, four cycle relays R1060, R1070, R1080 and R1085, and five counting relays R1010, R1020, R1030, R1040 and R1050, and a control network connected and arranged in a manner more fully described hereinafter.

The timer test circuit 48, shown in Fig. 9, comprises a relay group including a sleeve relay R915, a ring relay R920 and a control relay R925, and a control network connected and arranged in a manner more fully described hereinafter.

Preferably, each of the trunk circuits terminating the trunks extending to the manual operator position 43 is identical to the trunk circuit 44, shown in Fig. 8, which comprises a relay group including a sleeve relay R810, a ring cutoff relay R815, a battery supply relay R820 and a switching relay R825, and a control network connected and arranged in a manner more fully described hereinafter. Further, the manual operator position 43 comprises conventional position equipment operative to answer, extend and supervise calls in a conventional manner.

Preferably, each of the trunk circuits terminating the trunks extending to the interceptor operator position 45 is identical to the trunk circuit 46, shown in Fig. 8, which comprises a relay group including a sleeve relay R840 and an answer relay R850, an impedance 845 and a control network, connected and arranged in a manner more fully described hereinafter. Further, the interceptor operator position 45 comprises conventional position equipment operative to answer, extend and supervise calls, in a conventional manner.

A better understanding of the connection and arrangement of the telephone system will be facilitated from a consideration of the detailed operation of the various pieces of apparatus incorporated therein incident to the extension of calls from the adjacent exchange 22 and the distant exchange 23 to the central office 21 and the further extension of the calls from the first operator position 25 at the switchboard 24 to the various subscriber substations in the central office 21 as will appear hereinafter.

Extension of a call from a subscriber substation in the adjacent exchange 22 to a private subscriber substation in the central office 21

Considering now the extension of a call from a subscriber substation, such, for example, as the subscriber substation T2 in the adjacent exchange 22 to a called private subscriber substation, such, for example, as the private subscriber substation T1 in the central office 21, the subscriber at the calling subscriber substation T2 first initiates the call, in the usual manner, whereby the automatic switching apparatus 71 is operatively associated with the subscriber line 72 extending to the calling subscriber substation T2. The subscriber at the calling subscriber substation T2 then dials the code portion of the directory number of the called subscriber substation T1 over the subscriber line 72 into the automatic switching apparatus 71, thereby to cause the automatic switching apparatus 71 to operate and seize the branch of an idle one of the trunk lines accessible thereto and extending from the adjacent exchange 22 to the central office 21, such, for example, as the branch 300Y of the trunk line 300, the branch 300Y of the trunk line 300 being marked as idle to the automatic switching apparatus 71 by the absence of ground potential upon the control conductor 303 thereof.

When the automatic switching apparatus 71 thus operates to seize the branch 300Y of the trunk line 300 a loop circuit is completed for energizing the winding of the line relay in the indicator trunk circuit connected to the trunk line 300 which, in turn, depends upon the operated or restored position of the transfer relay R340 in the traffic transfer circuit 61. More particularly, the trunk line 300 is normally connected to the trunk 310 extending to the indicator trunk circuit 26 associated with the first operator position 25 at the switchboard 24 when the transfer relay R340 in the traffic transfer circuit 61 occupies its normal or restored position. Assuming that the trunk line 300 is connected to the trunk 310, a loop circuit is completed for energizing in series the upper and lower windings of the line relay R540 in the indicator trunk circuit 26. This loop circuit extends from ground by way of the upper winding of R540 and the contacts 554, 603 and 563 to the line conductor C312 of the trunk line 310; and from battery by way of the lower winding of R540 and the contacts 552, 601 and 561 to the line conductor C311 of the trunk 310, the line conductors C311 and C312 of the trunk 310 being respectively connected by way of the contacts 341 and 343 to the line conductors C301 and C302 of the trunk line 300, the line conductors C301 and C302 in the branch 300Y of the trunk line 300 being seized by the automatic switching apparatus 71 in the adjacent exchange 22 at this time. Finally the calling subscriber substation T2 is operatively connected by way of the subscriber line 72 to the automatic switching apparatus 71, thereby to complete an operative connection between the calling subscriber substation T2 in the adjacent exchange 22 and the indicator trunk circuit 26 in the central office 21, the indicator trunk circuit 26 being associated with the first operator position 25 at the call indicator switchboard 24, as previously noted. When the above-traced loop circuit is completed for energizing in series the upper and lower windings of the line relay R540 the latter relay operates to complete, at the contacts 542, an obvious circuit including the contacts 526 for energizing the winding of the start relay R510, thereby to cause the latter relay to operate. Also, when the above-traced loop circuit for energizing in series the upper and lower windings of the line relay R540 is completed a multiple circuit is completed for energizing in series the upper winding of the line relay R540 and the lower winding of the reverse battery relay R210 in the trunk circuit 91 in the distant exchange 23. This circuit extends from ground by way of the upper winding of R540, the contacts 554, 603 and 553, the line conductor C312 of the trunk 310, the contacts 343, the line conductor C302 of the trunk line 300, the connection between the line conductors C302 and C301 of the branch 300Y of the trunk line 300, including the automatic switching apparatus 71 in the adjacent exchange 22, the subscriber line 72 and the calling subscriber substation T2, the line conductor C301 of the branch 300X of the trunk line 300, the contacts 241 and the lower winding of R210 to battery. When thus energized the reverse battery relay R210 operates to complete, at the contacts 218, an obvious path, including the contacts 234, for applying ground potential to the control conductor C263 of the trunk 260, thereby to mark the trunk 260 and consequently the trunk circuit 91 as busy to the automatic switching apparatus 81 in the distant exchange 23. Hence, at this time the branch 300X of the trunk line 300 terminated by the trunk circuit 91 is marked as busy to the automatic switching apparatus 81 in the distant exchange 23.

Upon operating, the start relay R510 completes, at the contacts 514, an obvious circuit for energizing the winding of the switch relay R620, thereby to cause the latter relay to operate; and completes, at the contacts 512, an obvious circuit for energizing the winding of the control relay R500, thereby to cause the latter relay to operate. Upon operating, the control relay R500 completes, at the contacts 502, an obvious circuit, including the contacts 511, for energizing the winding of the hold relay R520, thereby to cause the latter relay to operate. Upon operating, the hold relay R520 completes, at the contacts 523, an obvious path for applying ground potential to the hold conductor C527, thereby to complete a holding circuit, including the contacts 713 and 629, for energizing the winding of the switch relay R620. Upon operating, the switch relay R620 interrupts, at the contacts 621 and 623, a further point in a connection, traced hereinafter, between the repeater 650 and the plug P801 of the indicator trunk circuit 26; and interrupts, at the contacts 627, a multiple point in an obvious circuit including the contacts 604' and the trunks-busy conductor C106 for energizing the winding of the trunks-busy relay R1540 in the busy circuit 30, thereby to cause the latter relay to restore in the event all of the indicator trunk circuits in the group associated with the first operator position 25 are busy at this time. Assuming that there are idle indicator trunk circuits in the group associated with the first operator position 25 at this time, an obvious multiple circuit, including the grounded trunks-busy conductor C106, is completed for energizing the winding of the trunks-busy relay R1540, thereby to retain the latter relay in its operated position at this time.

Also, upon operating, the start relay R510 completes, at the contacts 512 and 513, a circuit including the contacts 506 and the conductor C104 for energizing the magnet M1214 of the register selector 27; thereby to cause the latter magnet to operate in order to condition the wipers noted thereof to be driven one step in the clockwise direction, the register selector 27 being individually associated with the indicator trunk circuit 26, as previously noted. Also, when the control relay R500 operates it interrupts, at the contacts 506, the above-traced circuit for energizing the magnet M1214 of the register selector 27, thereby to cause the latter magnet to restore and drive the wipers noted thereof one step in the clockwise direction. Accordingly, when the indicator trunk circuit 26 is seized the wipers noted of the register selector 27 individually associated therewith are advanced one step in order preliminarily to select the next one of the registers in the group associated with the first operator position 25. Also, upon operating, the hold relay R520 completes, at the contacts 525, an obvious holding circuit, including the contacts 542, for energizing the winding thereof; and interrupts, at the contacts 526, the previously traced circuit for energizing the winding of the start relay R510, thereby to cause the latter relay to restore shortly thereafter, the start relay R510 being of the slow-to-release type. Further, the hold relay R520 completes, at the contacts 521, an obvious path for applying ground potential to the control conductor C313 of the trunk 310, thereby to complete an obvious path, including the contacts 345, for applying ground potential to the control conductor C303 of the branch 300Y of the trunk line 300. This application of ground potential to the control conductor C303 of the branch 300Y of the trunk line 300 holds the automatic switching apparatus 71 in its operated position and marks the branch 300Y of the trunk line 300 as busy to the remainder of the automatic switching apparatus in the adjacent exchange 22, in a well-known manner.

Also, when the control relay R500 operates it completes a connection between the test conductor C102 and the winding of the cut-in relay R430. This test connection extends from the grounded hold conductor C527 by way of the contacts 602', the winding of R430, and the contacts 504, 503 and 432 to the test conductor C102. In the event the test wiper 1211 of the register selector 27 terminating the test conductor C102 engages a contact set terminating a busy register in the associated group, ground potential is applied thereto, thereby to complete an obvious path substantially identical to that traced above for short-circuiting the winding of the cut-in relay R430. Also, the application of ground potential to the test conductor C102 completes a circuit, including the contacts 432 and 503, the control conductor C103 and the contacts 1215, for energizing the magnet M1214 of the register selector 27. When thus energized the magnet M1214 operates to interrupt, at the contacts 1215, the previously traced circuit for energizing the magnet M1214, whereby the latter magnet restores. Upon restoring, the magnet M1214 reprepares, at the contacts 1215, the above-traced energizing circuit therefor. When the magnet M1214 thus operates and then restores, the wipers noted of the register selector 27 are driven an additional step in the clockwise direction, whereby the next register in the associated group is tested, in the manner explained above. The magnet M1214 continues to operate intermittently in order successively to test the registers in the associated group until an idle register therein is selected by the register selector 27, assuming that there is an idle register in the associated group at this time. Assuming that the first register 28 is the first idle register in the associated group, when the wipers noted of the register selector 27 engage the contact set in the associated contact bank terminating the first register 28, ground potential is removed from the test conductor C102. Accordingly, at this time, a series circuit is completed for energizing the winding of the cut-in relay R430 and the magnet M1214 of the register selector 27, this circuit extending from the grounded hold conductor C527 by way of the contacts 602', the winding of R430, the contacts 504, C103, the contacts 1215 and the magnet M1214 to battery. When this series circuit is completed the cut-in relay R430 operates; however, the magnet M1214 does not operate due to the high series resistance of the cut-in relay R430. Upon operating, the cut-in relay R430 interrupts, at the contacts 431, a point in a circuit traced hereinafter for energizing the upper winding of the tone relay R410. At this point it is noted that a complete searching operation of the register selector 27 proceeds prior to the restoration of the control relay R500, the latter relay being of the slow-to-release type. Also, the cut-in relay R430 completes, at the contacts 435, a holding circuit substantially identical to that previously traced for energizing the winding thereof in series with the magnet M1214 of the register selector 27. Also, the cut-in relay R430 completes, at the contacts 433, an obvious path for applying ground potential to the test conductor C102, thereby to complete a circuit, including the test wiper 1211 of the register selector 27 and the engaged contact in the associated contact bank, the contacts 1231, the "W" strap and the contacts 1241, for energizing the winding of the seizure relay R1340 in the first register 28.

When thus energized the seizure relay R1340 operates to complete, at the contacts 1346, an obvious path for applying ground potential to the timer start conductor C109, thereby to complete a circuit, including the contacts 933 of the timer transfer key K930, for energizing the winding of the start relay R1090 in the first timer 47. When thus energized the start relay R1090 operates in order to initiate operation of the first timer 47, in a manner more fully explained hereinatfer, to cause fast interrupted ground potential to be applied to the fast interrupted ground conductor C121 and slow interrupted ground potential to be applied to the slow interrupted ground conductor C115. Further, the seizure relay R1340 completes, at the contacts 1341, a circuit for energizing the rotary magnet M1463 of the timer switch 1460, this circuit extending from the fast interrupted ground conductor C121 by way of the contacts 1331, 1341, 1363, 1383 and the magnet M1463 to battery. Accordingly, the rotary magnet M1463 operates and restores intermittently in accordance with the intermittent application of ground potential to the fast interrupted ground conductor C121, for a purpose more fully explained hereinafter. Further, the seizure relay R1340 completes, at the contacts 1343, an obvious multiple circuit for illuminating the permanent supervisory lamp L1357 and for operating the register seizure meter M1355. Also, the seizure relay R1340 interrupts, at the contacts 1345, a point in an obvious path, including the contacts 1244 and 1235, for applying ground potential to the conductors C126 and C147, thereby to interrupt a multiple point in the normally completed circuits for energizing the last register select relay R1550 and the registers busy relay R1560 in the busy circuit 30, for a purpose more fully explained hereinafter.

Reconsidering the operation of the register selector 27 to select an idle register in the associated group, it is again noted that the register selector 27 must select an idle register in the associated group within a predetermined time interval determined by the slow-to-release characteristic of the control relay R500 in the indicator trunk circuit 26. In the event the register selector 27 does not select an idle register in the associated group within the time interval mentioned, the control relay R500 restores prior to the operation of the cut-in relay R430 in the indicator trunk circuit 26. When the control relay R500 restores, while the cut-in relay R430 occupies its restored position, the previously mentioned circuit for energizing the upper winding of the tone relay R410 is completed at the contacts 501. The circuit for energizing the upper winding of the tone relay R410 extends from ground by way of the contacts 542, 525, 501, 431 and 604, and the upper winding of R410 to battery. When thus energized the tone relay R410 operates to complete, at the contacts 414, an obvious holding circuit, including the grounded hold conductor C527, for energizing the lower winding thereof. Also, the tone relay R410 interrupts, at the contacts 416, a normally completed circuit for illuminating the permanent lamp L460; the last-mentioned circuit extending, when completed, from ground by way of the contacts 542, 557, 705, 444 and 416, the permanent lamp L460 and the contacts 565 to battery. Also, the tone relay R410 completes, at the contacts 417, a circuit, including the busy tone conductor C419, the contacts 621' and the lower winding of the battery supply relay R610, for energizing the winding 654 of the repeater 650. Further, the tone relay R410 completes, at the contacts 415, an obvious circuit, including the contacts 565 and the slow interrupted ground conductor C115, for flashing the permanent lamp L460 from the slow interrupted ground conductor C115, thereby to indicate the busy condition mentioned. Finally, the tone relay R410 completes, at the contacts 412, a circuit, including the grounded hold conductor C527, the contacts 602' and 601', for energizing the winding of the release relay R610, thereby to cause the latter relay to operate. Upon operating, the release relay R600 completes, at the contacts 609, an obvious holding circuit for energizing the winding thereof; and completes, at the contacts 605', an obvious path, including the contacts 631', for applying ground potential to the timer start conductor C109, thereby positively to insure operation of the first timer 47 at this time. Further, the release relay R600 interrupts, at the contacts 601 and 603, obvious paths for respectively short-circuiting the windings 651 and 653 of the repeater 650; whereby the busy tone current traversing the winding 654 of the repeater 650 induces busy tone voltage into the winding 653 of the repeater 650, in an obvious manner. Also, the release relay R600 completes, at the contacts 602, an obvious series connection including the windings 651 and 653 of the repeater 650 and the condenser C655; whereby the busy tone voltage induced in the winding 653 causes busy tone current to be returned over the previously traced loop circuit to the calling subscriber substation T2 in the adjacent exchange 22, thereby to indicate to the subscriber thereat the busy condition mentioned.

The subscriber at the calling subscriber substation T2 in the adjacent exchange 22, upon receiving busy tone, releases the equipment by replacing the receiver of the telephone instrument thereat upon its associated switchhook, thereby to effect the release of the automatic switching apparatus 71 in the adjacent exchange 22, in a well-known manner. When the automatic switching apparatus 71 is thus released the previously traced loop circuit for energizing in series the upper and lower windings of the line relay R540 in the indicator trunk circuit 26 is interrupted, thereby to cause the latter relay to restore; also the previously traced series circuit for energizing the upper winding of the line relay R540 in the indicator trunk circuit 26 and the lower winding of the reverse battery relay R210 in the trunk circuit 91 is interrupted; thereby to cause the latter relay to restore shortly thereafter, the reverse battery relay R210 being of the slow-to-release type. Upon restoring, the reverse battery relay R210 interrupts, at the contacts 218, the previously mentioned path for applying ground potential to the control conductor C263 of the trunk 260, thereby to mark the latter trunk as idle to the automatic switching apparatus 81 in the distant exchange 23. Upon restoring, the line relay R540 interrupts, at the contacts 542, the previously traced holding circuit for energizing the winding of the hold relay R520, thereby to cause the latter relay to restore shortly thereafter, the hold relay R520 being of the slow-to-release type. Upon restoring, the hold relay R520 interrupts, at the contacts 521, the previously traced path for applying ground potential to the control conductor C313 of the trunk 310 and consequently to the control conductor C303 of the branch 300Y of the trunk line 300, thereby to mark the branch 300Y of the trunk line 300 as idle to the automatic switching apparatus 71 in the adjacent exchange 22.

Also the hold relay R520 interrupts, at the contacts 523, the previously mentioned path for applying ground potential to the hold conductor C527, thereby to interrupt the previously traced holding circuit for energizing the lower winding of the tone relay R410 and the previously traced holding circuit for energizing the winding of the release relay R600, thereby to cause the latter relays to restore. Upon restoring, the tone relay R410 interrupts, at the contacts 415, the previously traced circuit for flashing the permanent lamp L460, thereby to cause the latter lamp to become extinguished in order to indicate that the indicator trunk circuit 26 is idle at this time.

Continuing now with the operation of the indicator trunk circuit 26, again assume that the previously traced connection between the calling subscriber substation T2 in the adjacent exchange 22 and the indicator trunk circuit 26 is completed and that the register selector 27 associated with the indicator trunk circuit 26 has operated to seize the first register 28, in the manner explained above. At this time, the subscriber at the calling subscriber substation T2 proceeds to dial the thousand digit of the directory number of the called subscriber substation T1. At this point it is noted that a prior preliminary digit comprising the last digit of the code portion of the directory number of the called subscriber substation T1 is dialed into the indicator trunk circuit 26, in the event it is not absorbed in the automatic switching apparatus 71 in the adjacent exchange 22. First assume that the preliminary digit is dialed into the indicator trunk circuit 26, the Y strap is added and the X strap is omitted in the indicator trunk circuit. The line relay R540 in the indicator trunk circuit 26 follows the impulses of the preliminary digit transmitted from the calling subscriber substation T2 in the adjacent exchange 22; however, the reverse battery relay R210 in the trunk circuit 91 in the distant exchange 23 does not follow the impulses of the preliminary digit mentioned in view of the fact that the latter relay R210 is of the slow-to-release type. Accordingly, each time the previously traced loop circuit is interrupted and then recompleted at the calling subscriber substation T2 in the adjacent exchange 22 the line relay R540 restores and then reoperates. Each time the line relay R540 restores it interrupts, at the contacts 542, the previously traced circuit for energizing the winding of the hold relay R520; however, the latter relay does not restore during impulsing as it is of the slow-to-release type. The first time the line relay R540 restores it completes, at the contacts 541, a circuit, including the contacts 524, 633' and 725, for energizing the winding of the dial relay R450, thereby to cause the later relay to operate. Each time the line relay R540 operates it interrupts, at the contacts 541, the above-traced circuit for energizing the windnig of the dial relay R450. However, the dial relay R450 does not retsore during impulsing as it is of the slow-to-release type. Upon operating, the dial relay R450 completes, at the contacts 452, an obvious circuit for energizing the winding of the dial slave relay R440, thereby to cause the latter relay to operate. Also, the dial relay R450 completes, at the contacts 451, a circuit, including the contacts 531 and the Y strap, for energizing the upper winding of the digit absorbing relay R530, thereby to cause the latter relay to operate partially in order to complete, at the contacts 532, a path including the contacts 451 and 531, the Y strap, the contacts 532 and 603', and the grounded hold conductor C527 for short-circuiting the lower winding thereof. Upon operating, the digit slave relay R440 interrupts, at the contacts 444, the previously traced circuit for illuminating the permanent lamp L460.

At the conclusion of the preliminary digit the line relay R540 reoperates and shortly thereafter the dial relay R450 restores, the dial relay R450 being of the slow-to-release type. Upon restoring, the dial relay R450 interrupts, at the contacts 451, the previously traced path for short-circuiting the lower winding of the digit absorbing relay R530, whereby an obvious series circuit is completed for energizing the upper and lower windings of the latter relay in order to cause the digit absorbing relay R530 to operate completely. Also the dial relay R450 interrupts, at the contacts 452, the previously mentioned circuit for energizing the winding of the dial slave relay R440, thereby to cause the latter relay to restore shortly thereafter, the dial slave relay R440 being of the slow-to-release type. Upon restoring, the dial slave relay R440 recompletes, at the contacts 444, the previously traced circuit for illuminating the permanent lamp L460.

When the digit absorbing relay R530 operates fully it interrupts, at the contacts 531, a further point in the previously traced path for short-circuiting the lower winding thereof; and prepares, at the contacts 533, a circuit traced hereinafter for energizing the rotary magnet M773 of the first and ring digit register switch 770. At this time the indicator trunk circuit 26 is in readiness to receive the thousand digit of the directory number of the called subscriber substation T1.

Now assume that the preliminary digit is not dialed into the indicator trunk circuit 26, the X strap is added, the Y strap is omitted and the digit absorbing relay R530 is not utilized in the indicator trunk circuit 26. In this case, the first digit dialed into the indicator trunk circuit 26 is the thousand digit of the directory number of the called subscriber substation T1.

Considering now the operation of the indicator trunk circuit 26 in response to the dialing of the thousand digit at the calling subscriber substation T2 in the adjacent exchange 22, the line relay R540 in the indicator trunk circuit 26 follows the digit mentioned, in the manner previously explained. The first time the line relay R540 restores it effects operation of the dial relay R450 in order to cause operation of the dial slave relay R440, in the manner previously explained. Also, each time the line relay R540 restores and then reoperates it completes and then interrupts, at the contacts 541, the previously mentioned circuit for energizing the rotary magnet M773 of the first ring and digit register switch 770, this circuit extending, when completed, from ground by way of the contacts 541, 524, 633' and 725 (the contacts 533 or the X strap), the contacts 643 and the rotary magnet M773 to battery. Accordingly, the rotary magnet M773 of the switch 770 follows the line relay R540, whereby the wipers noted of the switch 770 are moved step by step in the clockwise direction away from their normal positions a number of steps corresponding to the thousand digit of the directory number of the called subscriber substation T1.

At the conclusion of the thousand digit of the directory number of the called subscriber substation T1, the line relay R540 reoperates, thereby to effect subsequent restoration of the dial relay R450 and the dial slave relay R440, in the manner previously explained. Upon restoring, the dial relay R450 completes, at the contacts 453, a circuit for energizing the lower winding of the ring select relay R720, the sets of switch springs S776 and S777 being operated when the wipers noted of the switch 770 are moved away from their normal positions. The circuit for energizing the lower winding of the ring select relay R720 extends from the grounded hold conductor C527 by way of the contacts 603' and 453, the set of switch springs S777 and the lower winding of R720 to battery. When thus energized the ring select relay R720 operates to complete, at the contacts 723, an obvious holding circuit, including the contacts 603' and the grounded hold conductor C527, for energizing the lower winding thereof. Upon restoring, the dial slave relay R440 recompletes, at the contacts 444, the previously traced circuit for illuminating the permanent lamp L460.

Also, upon operating, the ring select relay R720 interrupts, at the contacts 725, the previously traced circuit for energizing the winding of the dial relay R450, thereby to prevent operation of the latter relay in response to the subsequent digits dialed into the indicator trunk circuit 26. Also, the ring select relay R720 prepares, at the contacts 724, a circuit traced hereinafter for setting the C switch 1310, the D switch 1320, the U switch 1410 and the ring switch 1420 in the first register 28, in a manner more fully explained hereinafter. Further, the ring select relay R720 completes, at the contacts 726, a circuit for energizing the winding of the send relay R640, this circuit extending from the grounded hold conductor C527 by way of the contacts 635' and 726, the wiper 771 of the switch 770 and the engaged contact in the associated contact bank, the contacts 703 and 774, the winding of R640 and the contacts 424 to battery. When the send relay R640 is thus energized it operates to complete, at the contacts 641 and 642, an obvious circuit for energizing the rotary magnet M773 of the switch 770, thereby to cause the latter magnet to operate. Upon operating, the rotary magnet M773 interrupts, at the contacts 774, the previously traced circuit for energizing the winding of the send relay R640, thereby to cause the latter relay to restore and interrupt, at the contacts 641 and 642, the previously traced circuit for energizing the rotary magnet M773, thereby to cause the latter magnet to restore and recomplete, at the contacts 774, the previously traced circuit for energizing the windings of the send relay R640. The send relay R640 and the rotary magnet M773 continue to operate, in the manner described above, until the wipers noted of the switch 770 are driven into engagement with the tenth contacts in the associated contact bank. When the wiper 771 of the switch 770 disengages the ninth contact in the associated contact bank the previously traced circuit for energizing the winding of the send relay R640 is interrupted, thereby to arrest further operation of the latter relay in conjunction with the rotary magnet M773 of the switch 770, in the manner explained above. In view of the foregoing explanation of the mode of operation of the send relay R640 and the rotary magnet M773, it will be understood that the wipers noted of the switch 770 are driven automatically to engage the tenth contacts in the associated contact banks from the position thereof corresponding to the thousand digit of the directory number of the called subscriber substation T1. Accordingly, it will be understood that the wipers noted of the switch 770 are automatically driven a number of steps to engage the tenth contacts in the associated contact bank, which number is the complement of the thousand digit of the directory number of the called subscriber substation T1 to equal the digit 10. In other words, if the thousand digit of the directory number of the called subscriber substation T1 is 7, the wipers noted of the switch 770 are automatically driven three steps due to the interaction between the send relay R640 and the rotary magnet M773, in the manner explained above. When the wiper 771 of the switch 770 engages the tenth contact in the associated contact bank a circuit is completed for energizing in multiple the winding of the flash relay R700 and the winding of the cutoff relay R420. The circuit mentioned extends from the grounded hold conductor C527 by way of the contacts 635' and 726, the wiper 771 of the switch 770 to the engaged tenth contact in the associated contact bank, from the engaged tenth contact mentioned by way of the winding of R700 to battery, and from the engaged tenth contact mentioned by way of the contacts 423 and the winding of R420 to battery. When the cutoff relay R420 is thus energized it operates to complete, at the contacts 422, an obvious holding circuit, including the contacts 603' and the grounded hold conductor C527, for energizing the winding thereof; and when the flash relay R700 is thus energized it operates shortly thereafter, the flash relay R700 being of the slow-to-operate type. Also, upon operating, the cutoff relay R420 interrupts, at the contacts 424, a further point in the previously traced circuit for energizing the winding of the send relay R640, thereby positively to prevent further operation of the latter relay at this time.

Upon operating, the flash relay R700 completes, at the contacts 701 and 702, a circuit for energizing the release magnet M775 of the switch 770, this circuit extending from the grounded hold conductor C527 by way of the contacts 635' and 726, the wiper 771 of the switch 770 and the engaged tenth contact in the associated contact bank, the contacts 701 and 702 and the release magnet M775 to battery. When thus energized the release magnet M775 operates, thereby to release the wipers noted of the switch 770 and to cause them to be returned to their normal positions. Further the flash relay R700 completes, at the contacts 706, an obvious path for applying ground potential to the release alarm conductor C120 in order to complete an obvious circuit for energizing the winding of the release alarm relay R1150 in the supervisory circuit 42. When thus energized the release alarm relay R1150 operates in order to initiate operation of the supervisory circuit 42, in a manner more fully described hereinafter. Further, the flash relay R700 interrupts, at the contacts 705, the previously traced ground circuit for illuminating the permanent lamp L460; and completes, at the contacts 704, an obvious circuit, including the contacts 565, 416 and 444 and the fast interrupted ground conductor C121, for flashing the permanent lamp L460.

When the wipers noted of the switch 770 are thus released and returned to their normal positions the previously traced circuit for energizing the winding of the flash relay R700 is interrupted, thereby to cause the latter relay to restore. At this point it is noted that, while the wiper 771 of the switch 770 is being returned to its normal position, a holding circuit, including the grounded hold conductor C527, the contacts 635', 726 and 701, the wiper 771 and any engaged one of the first nine contacts in the associated contact bank, is completed for energizing the winding of the flash relay R700. Accordingly, the holding circuit for energizing the winding of the flash relay R700 is not interrupted in order to cause the latter relay to restore unless the switch 770 is completely released, as explained above. Upon restoring, the flash relay R700 interrupts, at the contacts 706, the previously mentioned path for applying ground potential to the release alarm conductor C120, thereby to arrest further operation of the supervisory circuit 42. Further the flash relay R700 interrupts, at the contacts 704, the previously traced circuit including the fast interrupted grounded conductor C121 for flashing the permanent lamp L460; and recompletes, at the contacts 705, the previously traced ground circuit for illuminating the permanent lamp L460.

Again considering the operation of the send relay R640, it is noted that each time the latter relay operates it completes, at the contacts 644, an obvious path for applying ground potential to the lamp and impulse conductor C119. Accordingly, a number of impulses corresponding to the complement of the thousand digit of the directory number of the called subscriber substation T1 is transmitted over the lamp and impulse conductor C119 incident to the operation of the send relay R640, as explained above. Each time a ground impulse is transmitted over the lamp and impulse conductor C119 a circuit for energizing the rotary magnet M1223 of the M switch 1220 in the first register 28 is completed and then interrupted, the last-mentioned circuit extending, when completed, from the lamp and impulse conductor C119 by way of the wiper 1213 of the register selector 27 and the engaged contact in the associated contact bank, the contacts 1432 and 1391, C127 and the rotary magnet M1223 to battery. Accordingly, the rotary magnet M1223 of the M switch 1220 operates and restores in order to drive the wipers noted thereof a number of steps in the clockwise direction corresponding to the complement of the thousand digit of the directory number of the called subscriber substation T1. At this point it is noted that the wipers 1221 and 1222 of the M switch 1220 normally respectively engage the 0 conductors in the cables 1M and 2M respectively extending to the first display board 31 and to the second display board 32; and that the contact banks respectively associated with the wipers 1221 and 1222 of the M switch 1220 are wired in reverse order. Accordingly, it will be understood that, in the event the thousand digit of the directory number of the called subscriber substation T1 is 7, this digit will be registered in the first and ring digit register switch 770 in the indicator trunk circuit 26 and then the send relay R640 will operate automatically in order to drive the wipers noted of the switch 770 to engage the tenth contacts in the associated contact banks, whereby three impulses are transmitted over the lamp and impulse conductor C119. The three impulses transmitted over the lamp and impulse conductor C119 will cause the wipers noted of the M switch 1220 in the first register 28 to be driven three steps in the clockwise direction, whereby the wipers 1221 and 1222 of the M switch 1220 engage the third contacts in the associated contact banks. The engaged third contacts in the contact banks respectively associated with the wipers 1221 and 1222 of the M switch 1220 respectively terminate the seventh conductors in the cables 1M and 2M respectively extending to the first display board 31 and to the second display board 32. Accordingly, the M switch 1220 responds to the complement 3 of the thousand digit 7 of the directory number of the called subscriber substation T1 to select the seventh conductors in the cables 1M and 2M respectively extending to the first display board 31 and to the second display board 32. More particularly, the conductors in the cables 1M and 2M accessible to the wipers 1221 and 1222 of the M switch 1220 respectively terminate in the M digit panels in the first display board 31 and in the second display board 32.

Continuing now with the operation of the indicator trunk circuit 26, it is pointed out that the thousand digit of the directory number of the called subscriber substation T1 is first completely registered in the first and ring digit register switch 770 and the complement of which is then sent by the send relay R640 to the first register 28 and registered in the M switch 1220 therein. This arrangement permits the calling subscriber at the subscriber substation T2 in the adjacent exchange 22 to dial the thousand digit of the directory number of the called subscriber substation T1 immediately the indicator trunk circuit 26 is seized, which time may be slightly prior to the complete operation of the register selector 27 associated with the indicator trunk circuit 26 to find an idle first register in the associated group. In other words, even though the register selector 27 finds the idle first register 28 in the associated group, in the manner explained above, a slight time interval subsequent to the beginning of the dialing of the thousand digit of the directory number of the called subscriber substation T1 at the calling subscriber substation T2 in the adjacent exchange 22, no mutilation of the thousand digit of the directory number mentioned occurs in view of the fact that this thousand digit is completely registered in the first and ring digit register switch 770 in the indicator trunk circuit 26 before the complement thereof is transmitted to the register selected by the register selector 27 in the associated group, in the manner explained above.

Continuing now with the operation of the indicator trunk circuit 26, the subscriber at the calling subscriber substation T2 in the adjacent exchange 22 proceeds to dial the hundred digit of the directory number of the called subscriber substation T1, thereby to cause the line relay R540 in the indicator trunk circuit 26 to follow the digit mentioned, in the manner previously explained. Each time the line relay R540 restores and then reoperates it completes and then interrupts, at the contacts 541, a circuit for energizing the rotary magnet M1313 of the C switch 1310 in the first register 28; the last-mentioned circuit extending, when completed, from ground by way of the contacts 541, 524, 633′, 724 and 436, the impulse conductor C114, the wiper 1212 of the register selector 27 and the engaged contact in the associated contact bank, the contacts 1361, the wiper 1451 of the sequence switch 1450 and the engaged normal contact in the associated contact bank, C128, and the rotary magnet M1313 to battery. Also, the impulses of the hundred digit of the directory number of the called subscriber substation T1 transmitted over the impulse conductor C114 are transmitted to the dial relay R1370. More particularly, the application of ground potential to the impulse conductor C114 completes a circuit for energizing the winding of the dial relay R1370 which includes the contacts 1353, C134, the set of switch springs S1426 associated with the ring switch 1420, C133 and the winding of R1370 to battery. When thus energized the dial relay R1370 operates to complete, at the contacts 1372, a circuit, including the contacts 1244, 1235 and 1344, for energizing the winding of the cutoff relay R1380, thereby to cause the latter relay to operate. Accordingly, the rotary magnet M1313 of the C switch 1310 is operated in accordance with the hundred digit of the called subscriber substation T1, whereby the wipers 1311 and 1312 thereof are operated to select corresponding contacts in the individually associated contact banks terminating the conductors in the cables 1C and 2C, respectively extending to the first display board 31 and to the second display board 32. Also, the dial relay R1370 remains operated during impulsing as the latter relay is of the slow-to-release type.

At the conclusion of the hundred digit of the directory number of the called subscriber substation T1, the line relay R540 reoperates, thereby to interrupt, at the contacts 541, the previously traced path for applying ground potential to the impulse conductor C114. When ground potential is thus removed from the impulse conductor C114 the previously traced circuit for energizing the winding of the dial relay R1370 is interrupted, thereby to cause the latter relay to restore shortly thereafter, the dial relay R1370 being of the slow-to-release type. Upon restoring, the dial relay R1370 interrupts, at the contacts 1372, the previously traced circuit for energizing the winding of the cutoff relay R1380; however, the latter relay does not restore immediately as it is of the slow-to-release type. Further, the dial relay R1370 completes, at the contacts 1371, a circuit for energizing the rotary magnet M1453 of the sequence switch 1450, this circuit extending, when completed, from ground by way of the contacts 1244, 1235, 1344, 1371 and 1382, and the rotary magnet M1453 to battery. Subsequently, when the cutoff relay R1380 restores it interrupts, at the contacts 1382, the above-traced circuit for energizing the rotary magnet M1453 of the sequence switch 1450. Accordingly, the rotary magnet M1453 of the sequence switch 1450 operates and restores at the conclusion of the hundred digit of the directory number of the called subscriber substation T1, whereby the wipers noted of the sequence switch 1450 are driven one step in the clockwise direction away from their normal positions. When the wiper 1451 of the sequence switch 1450 disengages the normal contact in the associated contact bank a further point in the previously traced circuit for energizing the rotary magnet M1313 of the C switch 1310 is interrupted. Also, when the wiper 1451 of the sequence switch 1450 engages the first contact in the associated contact bank an obvious circuit, including the conductor C129, the contacts 1361, the wiper 1212 of the register selector 27 and the engaged contact in the associated contact bank, and the impulse conductor C114, is prepared for energizing the rotary magnet M1323 of the D switch 1320 in the first register 28.

Reconsidering now the operation of the first register 28 incident to the receipt of the hundred digit of the directory number of the called subscriber substation T1, it is noted that, upon operating, the dial relay R1370 interrupts, at the contacts 1373, the previously traced circuit for illuminating the permanent supervisory lamp L1357; and, upon operating, the cutoff relay R1380 interrupts, at the contacts 1383, the previously traced circuit, including the fast interrupted ground conductor C121, for energizing the rotary magnet M1463 of the timer switch 1460, thereby positively to arrest further operation of the timer switch 1460 at this time. Also the cutoff relay R1380 completes, at the contacts 1384, a circuit, including the contacts 1467 of the set of switch springs S1466, for energizing the release magnet M1465 of the timer switch 1460, thereby to cause the latter magnet to operate and release the wipers noted of the timer switch 1460, whereby the wipers noted are returned to their normal positions. Subsequently, at the conclusion of the hundred digit of the directory number of the called subscriber substation T1, the dial relay R1370 restores, as previously explained; thereby to recomplete, at the contacts 1373, the previously traced circuit for illuminating the permanent supervisory lamp L1357. Also the dial relay R1370 completes, at the contacts 1373, a circuit including the contacts 1343 and 1386 for illuminating the pilot lamp L1201. Subsequently, when the cutoff relay R1380 restores it interrupts, at the contacts 1384, a further point in the previously traced circuit for energizing the release magnet M1465 of the timer switch 1460, thereby to insure that the latter magnet restores;

and interrupts, at the contacts 1386, the previously traced circuit for illuminating the pilot lamp L1201. Further the cutoff relay R1380 recompletes, at the contacts 1383, the previously traced circuit, including the fast interrupted ground conductor C121, for energizing the rotary magnet M1463 of the timer switch 1460, thereby to cause another timing operation by the timer switch 1460, in the manner previously explained.

In view of the foregoing explanation of the mode of operation of the indicator trunk circuit 26 and the first register 28, it will be readily understood that the hundred digit received by the indicator trunk circuit 26 was repeated by the line relay R540 to the C switch 1310 in the first register 28, and that operation of the timer switch 1460 was arrested incident to the receipt by the first register 28 of the hundred digit of the directory number of the called subscriber substation T1; operation of the timer switch 1460 being initiated incident to seizure of the first register 28 by the register selector 27. Finally, at the conclusion of the hundred digit of the directory number of the called subscriber substation T1, operation of the timer switch 1460 was again initiated and the wipers noted of the sequence switch 1450 were driven one step in the clockwise direction away from their normal positions, thereby to condition the D switch 1320 to register the ten digit of the directory number of the called subscriber substation T1.

In view of the foregoing explanation of the mode of operation of the first register 28 to register the hundred digit of the directory number of the called subscriber substation T1 in the C switch 1310, it will be understood that the ten digit and the unit digit of the directory number of the called subscriber substation T1 and dialed at the calling subscriber substation T2 in the adjacent exchange 22 are registered, in a substantially identical manner, in the D switch 1320 and in the U switch 1410, respectively. Also, it will be understood that the timing operation of the timer switch 1460 will be arrested at the beginning of each of the digits mentioned and will be again initiated at the conclusion of each of the digits mentioned.

At the conclusion of the unit digit of the directory number of the called subscribed substation T1 the wipers noted of the sequence switch 1450 engage the third contacts in the associated contact banks and a new timing operation of the timer switch 1460 is initiated, in the manner previously explained. After a predetermined time interval the wiper 1461 of the timer switch 1460 engages the contact in the associated contact bank which is connected to the third contact in the contact bank associated with the wiper 1452 of the sequence switch 1450, thereby to complete, at the conclusion of the time interval mentioned, a circuit for energizing the winding of the call registered relay R1360. The last-mentioned circuit extends from ground by way of the wiper 1461 of the timer switch 1460 and the engaged contact in the associated contact bank, the wiper 1452 of the sequence switch 1450 and the engaged third contact in the associated contact bank, and the winding of R1360 to battery. Shortly after the call registered relay R1360 is thus energized it operates, the latter relay being of the slow-to-operate type. Upon operating, the call registered relay R1360 completes at the contacts 1366, an obvious holding circuit, including the contacts 1343, for energizing the winding thereof; and interrupts, at the contacts 1363, the previously traced circuit, including the fast interrupted ground conductor C121, for energizing the rotary magnet M1463 of the timer switch 1460, thereby positively to arrest further timing operation of the timer switch 1460 at this time. Also, the call registered relay R1360 completes, at the contacts 1367, an obvious alternative circuit, including the contacts 1301 and 1233, for illuminating the pilot lamp L1201; and prepares, at the contacts 1365, a circuit for energizing the lower winding of the display relay R1390. At this time the above-mentioned circuit for energizing the lower winding of the display relay R1390 is completed in the event the lockout relay R1530 in the register allotter 29 occupies its restored position. Assuming that the lockout relay R1530 in the register allotter 29 occupies its restored position at this time, the above-mentioned circuit for energizing the lower winding of the display relay R1390 extends from ground by way of the contacts 1532, C1533, the contacts 1365 and 1234, and the lower winding of R1390 to battery. When thus energized the display relay R1390 operates to complete, at the contacts 1395, a holding circuit for energizing the upper winding thereof, the last-mentioned circuit extending from the grounded test conductor C102 by way of the wiper 1211 of the register selector 27 and the engaged contact in the associated contact bank, the contacts 1231, the "W" strap, the contacts 1241, 1395 and the upper winding of R1390 to battery. Also the display relay R1390 completes, at the contacts 1395, a connection between the grounded test conductor C102 and the impulse conductor C114; and completes, at the contacts 1392, a connection between the grounded test conductor C102 and the lamp and impulse conductor C119. The connection between the grounded test conductor C102 and the impulse conductor C114 includes the contacts 1231, the "W" strap, the contacts 1241, 1395 and 1362, and the wipers 1211 and 1212 of the register selector 27 and the engaged contacts in the associated contact banks; while the connection between the grounded test conductor C102 and the lamp and impulse conductor C119 includes the contacts 1231, the "W" strap, the contacts 1241, 1395, 1362 and 1352, the resistor 1354, the contacts 1392 and 1432 and the wipers 1211 and 1213 of the register selector 27 and the engaged contacts in the associated contact banks. Also, the display relay R1390 completes, at the contacts 1396, an alternative circuit for energizing the rotary magnet M1463 of the timer switch 1460, this circuit extending from the fast interrupted ground conductor C121 by way of the contacts 1331, 1341, 1364 and 1396, the wiper 1462 of the timer switch 1460 and the engaged contact in the associated contact bank, the contacts 1383 and the rotary magnet M1463 to battery. When the rotary magnet M1463 is thus energized intermittently the wipers noted of the timer switch 1460 are driven step by step in the clockwise direction.

Further the display relay R1390 completes, at the contacts 1394, an obvious circuit for energizing the winding of the display slave relay R1350, thereby to cause the latter relay to operate shortly thereafter, the display slave relay R1350 being of the slow-to-operate type. Upon operating, the display slave relay R1350 interrupts, at the contacts 1352, the previously traced connection between the grounded test conductor C102 and the lamp and impulse conductor C119; and prepares, at the contacts 1351, a point in a chain circuit for energizing the winding of the lockout relay R1440. At this time the circuit for energizing the winding of the lockout relay R1440 in the first register 28 is completed in the event the corresponding lockout relay in none of the other registers in the associated group occupies its operated position at this time. The circuit for energizing the winding of the lockout relay R1440 includes the winding of the start relay R1510 in the register allotter 29 and extends, when completed, from ground by way of the contacts 1244, 1235, 1344, 1371, 1381 and 1351, the winding of R1440, the contacts 1442, the chain circuit through the contacts of the lockout relays in the other registers in the associated group, the contacts 1441 and the winding of R1510 to battery. When this series circuit is completed both the lockout relay R1440 in the first register 28 and the start relay R1510 in the register allotter 29 operate. Upon operating, the lockout relay R1440 completes, at the contacts 1443, an obvious holding circuit substantially identical to that traced above for energizing the winding thereof in series with the winding of the start relay R1510; interrupts, at the contacts 1442, a point in the previously traced original circuit for energizing the winding thereof in series with the winding of the start relay R1510; and interrupts, at the contacts 1441, a common point in the circuits for energizing the windings of the lockout relays in the other registers in the associated group, thereby positively to prevent operation of the lockout relay in any of the registers in the associated group other than the lockout relay R1440 in the first register 28.

Upon operating, the start relay R1510 in the register allotter 29 completes, at the contacts 1511, an obvious circuit for energizing the winding of the start slave relay R1520, thereby to cause the latter relay to operate. Upon operating, the start slave relay R1520 completes, at the contacts 1521, an obvious multiple circuit for energizing the winding of the lockout relay R1530 and for operating the total calls displayed meter M1533. Shortly after the lockout relay R1530 is thus energized it operates, the latter relay being of the slow-to-operate type. Upon operating, the lockout relay R1530 completes, at the contacts 1531, an obvious circuit for operating the register group seizure meter M1534; and interrupts, at the contacts 1532, the application of ground potential to the display conductor C1533. The removal of ground potential from the display conductor C1533 positively prevents operation of any of the display relays in the various registers in the associated group corresponding to the display relay R1390 in the first register 28 at this time.

Further the lockout relay R1440 completes, at the contacts 1445, an obvious circuit for energizing the winding of the lockout slave relay R1300, thereby to cause the latter relay to operate. Also the lockout relay R1440 prepares, at the contacts 1446 to 1440, inclusive, multiple circuits, including the common display conductor C125 and the respective wipers 1222, 1312, 1322, 1412 and 1422 of the M switch 1220, the C switch 1310, the D switch 1320, the U switch 1410 and the ring switch 1420, for illuminating the respectively selected lamps in the corresponding digit panels of the second display board 32. Similarly, the lockout slave relay R1300 prepares, at the contacts 1305 to 1309, inclusive, multiple circuits, including the common display conductor C124 and the respective wipers 1221, 1311, 1321, 1411 and 1421 of the M switch 1220, the C switch 1310, the D switch 1320, the U switch 1410 and the ring switch 1420 for illuminating the respectively selected lamps in the corresponding digit panels of the first display board 31. The display board which is utilized depends upon the position of the display board transfer key K1101. In the present example, the display board transfer key K1101 occupies its normal position, thereby to complete, at the contacts 1103, an obvious path for applying ground potential to the common display conductor C124, whereby the previously mentioned multiple circuits for illuminating the selected lamps in the respective digit panels in the first display board 31 are completed. On the other hand, should the display board transfer key K1101 occupy its operated position, there would be completed, at the contacts 1102 thereof, an obvious path for applying ground potential to the common display conductor C125, whereby the previously mentioned multiple circuits for illuminating the selected lamps in the respective digit panels in the second display board 32 would be completed. In the present example, the selected lamps in the M digit panel, in the C digit panel, in the D digit panel and in the U digit panel in the first display board 31 are illuminated; thereby to indicate to the operator at the first operator position 25 the directory number of the called subscriber substation T1, in an obvious manner.

Further the lockout slave relay R1300 completes, at the contacts 1304, an obvious circuit for operating the regular display meter M1358. Also the lockout slave relay R1300 interrupts, at the contacts 1301, the previously traced ground circuit for illuminating the pilot lamp L1201; and completes, at the contacts 1302, an alternative circuit for flashing the pilot lamp L1201, the last-mentioned circuit including the fast interrupted ground conductor C121, the contacts 1302, 1367 and 1233. The flashing of the pilot lamp L1201 indicates that the first register 28 has seized one of the display boards for the purpose of displaying a directory number registered therein. Further the lockout slave relay R1300 completes, at the contacts 1303, a path, including the contacts 1392 and 1432 and the wiper 1213 of the register selector 27 and the engaged contact in the associated contact bank, for applying ground potential to the lamp and impulse conductor C119. The application of ground potential to the lamp and impulse conductor C119 completes a circuit for energizing in series the winding of the lamp fault relay R400 and the upper winding of the cord relay R750 in the indicator trunk circuit 26 in series with the call lamp L802 at the first operator position 25, this circuit extending from the grounded lamp and impulse conductor C119 by way of the contacts 645, 426, 442 and 437, the winding of R400, the contacts 606, the upper winding of R750 and the call lamp L802 to battery. When thus energized the lamp fault relay R400 and the cord relay R750 operate. Upon operating, the lamp fault relay R400 interrupts, at the contacts 401, a multiple circuit for energizing the lower winding of the cord relay R750 and for illuminating the supervisory lamp L803 at the first operator position 25. At this point it is noted that, in the event the call lamp L802 at the first operator position 25 is burned out, the lamp fault relay R400 is not energized and the previously mentioned multiple circuit for energizing the lower winding of the cord relay R750 in series with the supervisory lamp L803 is completed. The last-mentioned circuit extends from the grounded lamp and impulse conductor C119 by way of the contacts 645, 426, 442, 437, 401 and 636, the lower winding of R750 and the supervisory lamp L803 to battery. This arrangement positively insures that the supervisory lamp L803 will be illuminated in the event the call lamp L802 is burned out. Also, when the cord relay R750 is thus energized it operates to complete, at the contacts 751, an obvious circuit, including the conductor C111, for energizing the upper winding of the control relay R1135 in the supervisory circuit 42. When thus energized the control relay R1135 operates to complete, at the contacts 1136, an obvious circuit for energizing the winding of the control relay R1140, thereby to cause the latter relay to operate. Upon operating, the control relay R1140 completes, at the contacts 1141, an obvious circuit, including the contacts 1113 of the night alarm key K1111, for illuminating the pilot lamp L1106 at the first operator position 25, thereby further to indicate to the operator thereat that a displayed call is awaiting extension.

At this point it is noted that the timer switch 1460 in the first register 28 is operating, the rotary magnet M1463 being energized intermittently by way of the previously traced alternative circuit including the fast interrupted ground conductor C121. Accordingly, in the event the displayed call registered in the first register 28 is not extended within a predetermined time interval by the operator at the first operator position 25, the wiper 1461 of the timer switch 1460 engages the contact in the associated contact bank included in the obvious circuit, including the contacts 1393, for operating the excess hold meter M1356, thereby to indicate that the operator at the first operator position 25 held the displayed call registered in the first register 28 for an excessive time interval.

When the operator at the first operator position 25 observes the ilumination of the pilot lamp L1106 indicating that a call registered in one of the registers in the associated group has been displayed, the illuminated call lamp L802 individually associated with the indicator trunk circuit 26 identifying the particular indicator trunk circuit 26 as the calling trunk circuit and the illuminated lamps in the various digit panels in the first display board 31 identifying the directory number of the called subscriber substation T1, she seizes the plug P801 individually associated with the indicator trunk circuit 26 and touches the jack J804 terminating the subscriber line circuit 49 individually associated with the subscriber line 804 extending to the called subscriber substation T1, thereby to make the usual tip test in order to determine the idle or busy condition of the called subscriber substation T1 at this time. More particularly, when the tip of the plug P801 is touched to the sleeve of the jack J804, busy potential is applied thereto in the event the called subscriber substation T1 is busy at this time; whereby the busy potential is connected by way of the contacts 631 and the busy test conductor C107 to the first operator position telephone circuit 41, thereby to cause the receiver of the telephone instrument thereat to produce a distinct click indicating the busy condition of the called subscriber substation T1.

Assuming for the present that the called subscriber substation T1 is idle at this time, after the operator at the first operator position 25 makes the tip test with the plug P801 described above in order to ascertain the fact mentioned, she inserts the plug P801 into the jack J804. When the plug P801 is thus inserted into the jack J804 an obvious circuit is completed for energizing the winding of the sleeve relay R630 in the indicator trunk circuit 26. When thus energized the sleeve relay R630 operates to complete, at the contacts 639, a circuit for energizing the winding of the release relay R600, this circuit extending from ground by way of the contacts 639, 626, 434 and 601', and the winding of R600 to battery. When thus energized the release relay R600 operates to complete, at the contacts 609, the previously traced holding circuit, including the grounded hold conductor C527, for energizing the winding thereof. Also, the sleeve relay R630 prepares, at the contacts 639, a circuit, including the contacts 638 and 743 and the pickup conductor C108, for energizing the upper winding of the ring relay R740. At the beginning of a complete ringing cycle of the ringing machine commonly associated with the first ring circuit 51 and the second ring circuit 52, battery potential is applied to the pickup conductor C108, thereby to complete the previously prepared circuit for energizing the upper winding of the ring relay R740. When thus energized the ring relay R740 operates to complete, at the contacts 744, an obvious holding circuit, including the grounded hold conductor C527, for energizing the lower winding thereof; and to interrupt, at the contacts 743, the above traced operating circuit for energizing the upper winding thereof. Also the ring relay R740 prepares, at the contacts 741 and 742, circuits respectively including the one ring conductor C112 and the two ring conductor C113 for projecting ringing current over the subscriber line 804 to the called subscriber substation T1. In the present example, the circuit, including the one ring conductor C112, for projecting ringing current over the subscriber line 804 to the called subscriber substation T1 is completed, this circuit including the lower winding of the answer relay R710. The above-mentioned circuit extends from ground by way of the contacts 731, 622 and 632 to the tip of the plug P801 and from battery potential in the first ringing circuit 51 by way of the contacts 904 of the ring transfer key K900, the one ring conductor C112, the contacts 741, 721 and 605, the lower winding of R710 and the contacts 733 and 624 to the ring of the plug P801; further the circuit extends by way of the tip and ring of the jack J804, the subscriber line circuit 49 and the line conductors of the subscriber line 804 to the called subscriber substation T1, the ringer at the called subscriber substation T1 being bridged across the line conductors of the subscriber line 804. At this point it is noted that the first ringing circuit 51 is utilized in the event the ring transfer key K900 at the first operator position 25 occupies its normal position; whereas the second ring circuit 52 is utilized when the ring transfer key K900 occupies its operated position, in an obvious manner.

Continuing now with the operation of the indicator trunk circuit 26, it is noted that, upon operating, the sleeve relay R630 also interrupts, at the contacts 631, the previously traced busy test connection including the busy test conductor C107 between the plug P801 and the first operator position telephone circuit 41. Also when the release relay R600 operates it interrupts, at the contacts 601 and 603, the previously mentioned paths for short-circuiting the windings 651 and 653 of the repeater 650; and completes, at the contacts 602, an obvious series voice frequency current path, including the windings 651 and 653 of the repeater 650 and the condenser 655. Further the release relay R600 interrupts, at the contacts 606, the previously traced series circuit for energizing the winding of the lamp fault relay R400 and the upper winding of the cord relay R750, and for illuminating the call lamp L802 at the first operator position 25, thereby to cause the latter relays to restore and the call lamp L802 to be extinguished. Upon restoring, the cord relay R750 interrupts, at the contacts 751, the previously traced circuit for energizing the upper winding of the control relay R1135 in the supervisory circuit 42, thereby to cause the latter relay to restore. Upon restoring, the control relay R1135 interrupts, at the contacts 1136, the previously mentioned circuit for energizing the winding of the control relay R1140, thereby to cause the latter relay to restore. Upon restoring, the control relay R1140 interrupts, at the contacts 1141, the previously traced circuit for illuminating the pilot lamp L1106. Also the release relay R600 interrupts, at the contacts 604', a further point in the previously mentioned path for applying ground potential to the trunks busy conductor C106; and prepares, at the contacts 605', a point in the previously mentioned path for applying ground potential to the timer start conductor C109. Further the release relay R600 interrupts, at the contacts 602', the previously traced holding circuit for energizing the winding of the cut-in relay R430 in the indicator trunk circuit 26 in series with the magnet M1214 of the register selector 27, thereby to cause the cut-in relay R430 to restore. Also, the release relay R600 interrupts, at the contacts 603', the previously traced holding circuit for energizing the winding of the cutoff relay R420 and the previously traced circuit for energizing the lower winding of the digit absorbing relay R530, in the event the latter relay is utilized, thereby to cause the latter relays to restore. Further the release relay R600 interrupts, at the contacts 603', a further point in a holding circuit traced hereinafter for energizing the lower winding of the ring select relay R720.

Upon restoring, the cut-in relay R430 interrupts, at the contacts 433, the previously mentioned path for applying ground potential to the test conductor C102, thereby to interrupt a normally completed path, including the wiper 1211 of the register selector 27 and the engaged contact in the associated contact bank, the contacts 1231, the W strap, the contacts 1241 and 1251, for short-circuiting the upper winding of the display cutoff relay R1330 in the first register 28; whereby an obvious circuit, including the contacts 1251, is completed for energizing the upper winding of the display cutoff relay R1330 in series with the seizure relay R1340. When thus energized the display cutoff relay R1330 operates. At this point it is noted that the off-normal relay R1250 was operated in response to operation of the M switch 1220. More particularly, when the wipers noted of the M switch 1220 were moved away from their normal positions the set of switch springs S1225 was operated to complete an obvious circuit for energizing in series the winding of the release relay R1240, the winding of the off-normal relay R1250 and the release magnet M1224 of the M switch 1220. When this series circuit was completed the off-normal relay R1250 operates; however, the release relay R1240 and the release magnet M1224 of the M switch 1220 were not operated due to the high series resistance of the winding of the off-normal relay R1250. When the off-normal relay R1250 was thus operated it completed, at the contacts 1251, the above-traced path for short-circuiting the upper winding of the display cutoff relay R1330.

Upon operating, the display cutoff relay R1330 completes, at the contacts 1334, an obvious holding circuit, including the contacts 1343, for energizing the lower winding thereof. Further the display cutoff relay R1330 interrupts, at the contacts 1335 and 1336, the respective connections between the common display conductors C124 and C125 and the first display board 31 and the second display board 32, thereby to extinguish the selected lamps in the various digit panels of the first display board 31, the latter display board being utilized in the present example, as previously noted. Further the display cutoff relay R1330 completes, at the contacts 1332, an obvious path for short-circuiting the upper winding thereof; and completes, at the contacts 1333, an obvious path for short-circuiting the winding of the off-normal relay R1250. Finally, the display cutoff relay R1330 interrupts, at the contacts 1331, the previously traced circuit, including the fast interrupted ground conductor C121, for energizing the rotary magnet M1463 of the timer switch 1460.

When the winding of the off-normal relay R1250 is thus short-circuited a low resistance circuit is completed for energizing the winding of the release relay R1240 in series with the multiple connected release magnets M1224, M1314, etc., of the respective M switch 1220, C switch 1310, etc.; whereby the release relay R1240 operates and the various release magnets mentioned operate. More particularly, the release magnets of the M switch 1220, the C switch 1310, the D switch 1320, the U switch 1410, the ring switch 1420 (in the event the latter switch were operated), the sequence switch 1450 and the timer switch 1460 are operated, thereby to effect the release of the switches mentioned.

Upon operating, the release relay R1240 interrupts, at the contacts 1244, a further point in the previously traced paths for applying ground potential to the busy conductors C126 and C147; and completes, at the contacts 1243, an obvious circuit, including the release alarm conductor C120, for energizing the winding of the release alarm relay R1150 in the supervisory circuit 42. When thus energized the release alarm relay R1150 operates to complete, at the contacts 1153, an obvious path for applying ground potential to the timer start conductor C109, thereby to initiate operation of the first timer 47 in the event it is not operating at this time. Also the release alarm relay R1150 initiates operation of the supervisory circuit 42, in a manner more fully explained hereinafter. In the event each of the switches 1220, 1310, etc., in the first register 28 releases properly, the previously traced circuit for energizing the winding of the release relay R1240 in series with the multiple connected release magnets M1224, M1314, etc., is interrupted when the various sets of switch springs S1225, S1315, etc., are operated incident to the release and return of the wipers in the associated switch to their normal positions. Accordingly, each of the release magnets M1224, etc., and the release relay R1240 restore. Upon restoring, the release relay R1240 interrupts, at the contacts 1243, the previously traced circuit, including the release alarm conductor C120, for energizing the winding of the release alarm relay R1150 in the supervisory circuit 42, thereby to cause the latter relay to restore and arrest further operation of the supervisory circuit 42 at this time. Also the release relay R1240 prepares, at the contacts 1244, a point in the previously traced path for applying ground potential to the busy conductors C126 and C147; and interrupts, at the contacts 1242, the previously completed path, including the W strap, the contacts 1231 and the wiper 1211 of the register selector 27 and the engaged contact in the associated contact bank, for applying ground potential to the test conductor C102. Also, when the off-normal relay R1250 restores it interrupts, at the contacts 1251, the previously traced alternative holding circuit for energizing the winding of the seizure relay R1340, thereby to cause the latter relay to restore. Upon restoring, the seizure relay R1340 interrupts, at the contacts 1343, the previously traced holding circuit for energizing the lower winding of the display cut-off relay R1330 and the previously traced holding circuit for energizing the winding of the call registered relay R1360, thereby to cause the latter relays to restore. Also, upon restoring, the off-normal relay R1250 interrupts, at the contacts 1251, an obvious alternative holding circuit, including the contacts 1332 and 1395, for energizing the upper winding of the display relay R1390, thereby to cause the latter relay to restore. Upon restoring, the display relay R1390 interrupts, at the contacts 1394, the previously mentioned circuit for energizing the winding of the display slave relay R1350, thereby to cause the latter relay to restore. Upon restoring, the display slave relay R1350 interrupts, at the contacts 1351, the previously traced holding circuit for energizing the winding of the lockout relay R1440 in the first register 28 in series with the start relay R1510 in the register allotter 29, thereby to cause the latter relays to restore. Upon restoring, the lockout relay R1440 interrupts, at the contacts 1445, the previously mentioned circuit for energizing the winding of the lockout slave relay R1300, thereby to cause the latter relay to restore.

Upon restoring, the start relay R1510 in the register allotter 29 interrupts, at the contacts 1511, the previously mentioned circuit for energizing the winding of the start slave relay R1520, thereby to cause the latter relay to restore shortly thereafter, the start slave relay R1520 being of the slow-to-release type. Upon restoring, the start slave relay R1520 interrupts, at the contacts 1521, the previously mentioned circuit for energizing the winding of the lockout relay R1530, thereby to cause the latter relay to restore. Upon restoring, the lockout relay R1530 recompletes, at the contacts 1532, the previously mentioned path for applying ground potential to the common display conductor C1533; whereupon a circuit is completed for energizing the lower winding of the display relay in each register in the associated group, which has a call registered therein as indicated by the operated position of the associated call registered relay.

Accordingly, it will be understood that, in the event two or more of the registers in the associated group have calls registered therein at this time, the call registered relays therein will occupy their operated positions in order to prepare multiple circuits for energizing the lower windings of the display relays therein. At this time, the display relays in the registers mentioned operate in order to effect operation of the associated display slave relays. When the display slave relays in the registers mentioned operate, circuits are prepared for energizing the windings of the associated lockout relays in series with the winding of the start relay R1510 in the register allotter 29. However, at this time, the winding of the start relay R1510 in the register allotter 29 is energized in series with the winding of the lockout relay in only one of the registers mentioned; the lockout relay which is operated at this time depends upon the position thereof in the associated chain circuit. Hence, the start relay R1510 in the register allotter 29 and the lockout relay in one of the prepared registers are operated. Upon operating, the start relay R1510 effects operation of the start slave relay R1520 and the lockout relay R1530 in the register allotter 29. Upon operating, the lockout relay R1530 interrupts, at the contacts 1532, the previously mentioned path for applying ground potential to the display conductor C1533, thereby positively to prevent operation of the display relays in other than the prepared registers at this time. Subsequently, after the call is extended from the preferred register mentioned above, the latter register is released in the manner previously explained; whereby the lockout relay therein restores in order to effect operation of the lockout relay in the prepared one of the registers occupying the next favored position in the chain circuit previously traced. This operation of the allotter 29 continues until all of the prepared registers in the associated group have been allotted one by one in sequence to the display boards 31 and 32, at which time the previously traced circuit for energizing the winding of the start relay R1510 in the register allotter 29 is interrupted in order to cause the latter relay to restore. Upon restoring, the start relay R1510 effects restoration of the start slave relay R1520 and the lockout relay R1530; whereby ground potential is again applied by the lockout relay R1530, at the contacts 1532, to the display conductor C1533. When ground potential is again applied to the display conductor C1533 all of the registers in the associated group which have calls registered therein are again prepared for allotment to the display boards 31 and 32.

In view of the foregoing explanation of the mode of operation of the register allotter 29, it will be understood that this apparatus is operative through a given cycle of operation to allot one by one in a predetermined order to the display boards 31 and 32 calls registered in the registers in the associated group which were accumulated during a prior cycle of operation thereof; and to accumulate calls registered in other of the registers in the associated group during the given cycle of operation thereof to be allotted one by one in the predetermined order during the next succeeding cycle of operation thereof.

Continuing now with the operation of the indicator trunk circuit 26, when the subscriber at the called subscriber substation T1 answers the call by removing the receiver of the telephone instrument thereat from its associated switchhook, a low resistance circuit substantially identical to the circuit for projecting ringing current over the subscriber line 804 to the called subscriber substation T1 is completed for effectively energizing the lower winding of the answer relay R710. Shortly after the answer relay R710 is thus energized it operates, this relay being of the slow-to-operate type. Upon operating, the answer relay R710 completes, at the contacts 711, a holding circuit, including the contacts 555 and the grounded control conductor C313 of the trunk 310, for energizing the upper winding thereof. Also the answer relay R710 interrupts, at the contacts 713, the previously traced holding circuit for energizing the winding of the switch relay R620, thereby to cause the latter relay to restore. Upon restoring, the switch relay R620 interrupts, at the contacts 622 and 624, the previously traced circuit for projecting ringing current over the subscriber line 804 to the called subscriber substation T1; and interrupts, at the contacts 621', the previously completed circuit for energizing the winding 654 of the repeater 650 with ring-back tone current. The above-mentioned circuit extended, when completed, from the one ring conductor C112 by way of the contacts 741 and 721, the condenser 461, the contacts 418 and 621', the winding 654 of the repeater 650, and the lower winding of the battery supply relay R610 to battery. When the winding 654 of the repeater 650 was thus energized with ring-back tone current, ring-back tone voltage was induced into the winding 653 of the repeater 650 and ring-back tone current returned over the previously traced loop circuit to the calling subscriber substation T2 in the adjacent exchange 22.

Also, upon restoring, the switch relay R620 completes, at the contacts 621 and 623, a direct loop circuit extending to the called subscriber substation T1 for energizing in series the upper and lower windings of the battery supply relay R610. The last-mentioned loop circuit extends from ground by way of the upper winding of R610, the winding 652 of the repeater 650 and the contacts 621 and 632 to the tip of the plug P801, and from battery by way of the lower winding of R610, the winding 654 of the repeater 650 and the contacts 623 to the ring of the plug P801; further the circuit extends by way of the jack J804, the subscriber line circuit 49 and the subscriber line 804 to the called subscriber substation T1. At this point it is noted that, when the plug P801 is inserted into the jack J804, the subscriber line circuit 49 operates in order to mark the sleeve of the jack J804 as busy in the multipled jacks at the other operator positions at the switchboard 24.

When the battery supply relay R610 is thus energized it operates to complete, at the contacts 611, an obvious circuit, including the contacts 634' and the grounded hold conductor C527, for energizing the winding of the reverse battery relay R550, thereby to cause the latter relay to operate. Upon operating, the reverse battery relay R550 completes, at the contacts 551 and 553, an obvious connection for reversing battery over the previously traced loop circuit extending to the calling subscriber substation T2 in the adjacent exchange 22; and interrupts, at the contacts 552 and 554, the previously traced original connection for supplying battery over the above-mentioned loop circuit. The reversal of battery over the loop circuit extending to the calling subscriber substation T2 may be utilized in the automatic switching apparatus 71 in the adjacent exchange 22 for control purposes, in a well-known manner. Further, the reverse battery relay R550 interrupts, at the contacts 557, the previously traced ground circuit for illuminating the permanent lamp L460. Finally, the reverse battery relay R550 interrupts, at the contacts 555, the previously traced holding circuit for energizing the upper winding of the answer relay R710, thereby to cause the latter relay to restore.

At this time an operative connection is completed between the calling subscriber substation T2 in the adjacent exchange 22 and the called subscriber substation T1 in the central office 21, this connection including the two previously traced loop circuits extending to the repeater 650 in the indicator trunk circuit 26. More particularly, the loop circuit extending between the calling subscriber substation T2 in the adjacent exchange 22 and the repeater 650 includes the subscriber line 72, the automatic switching apparatus 71, the branch 300Y of the trunk line 300, the traffic transfer circuit 61, the trunk 310, the windings 651 and 653 of the repeater 650, and the windings of the line relay R540; while the loop circuit extending to the called subscriber substation T1 in the central office 21 includes the subscriber line 804, the subscriber line circuit 49, the jack J804, the plug P801, the windings 652 and 654 of the repeater 650, and the windings of the battery supply relay R610.

The subscriber at the called subscriber substation T1 in the central office 21 may initiate the release of the established connection by replacing the receiver of the telephone instrument thereat upon its associated switchhook, thereby to interrupt the previously traced loop circuit, including the windings of the battery supply relay R610 in order to cause the latter relay to restore. Upon restoring, the battery supply relay R610 interrupts, at the contacts 611, the previously traced circuit for energizing the winding of the reverse battery relay R550, thereby to cause the latter relay to restore. Upon restoring, the reverse battery relay R550 recompletes, at the contacts 557, the previously traced direct ground circuit for illuminating the permanent lamp L460; recompletes, at the contacts 552 and 554, the original connection for supplying battery by way of the windings of the line relay R540 over the previously traced loop circuit extending to the calling subscriber substation T2 in the adjacent exchange 22; and interrupts, at the contacts 551 and 553, the previously traced connection for supplying reverse battery by way of the windings of the line relay R540 over the loop circuit mentioned. Also, the reverse battery relay R550 completes, at the contacts 556, a circuit for energizing in series the winding of the delay disconnect relay R1120 in the supervisory circuit 42, the upper winding of the cord relay R750 and the call lamp L802 associated with the first operator position 25. This circuit extends from ground by way of the winding of R1120, C110, the contacts 712, 637, 625, 556 and 607, the upper winding of R750 and the call lamp L802 to battery. When this series circuit is completed the delay disconnect relay R1120 in the supervisory circuit 42 operates; also the cord relay R750 operates; however, the call lamp L802 is not illuminated due to the high series resistance of the winding of the delay disconnect relay R1120. Upon operating, the cord relay R750 completes, at the contacts 751, the previously traced circuit for energizing the upper winding of the control relay R1135 in the supervisory circuit 42, thereby to cause the latter relay to operate in order to effect operation of the control relay R1140 and the illumination of the pilot lamp L1106, in the manner previously explained.

Upon operating, the delay disconnect relay R1120 completes, at the contacts 1123, an obvious path for applying ground potential to the time start conductor C109, thereby to initiate operation of the first timer 47, in the manner previously explained. Further the delay disconnect relay R1120 initiates operation of the supervisory circuit 42; whereby the latter circuit operates, in a manner more fully explained hereinafter, in order to cause the delay disconnect lamp L1107 to be illuminated after the expiration of a predetermined time interval. The illumination of the delay disconnect lamp L1107 indicates to the operator at the first operator position 25 that the subscriber at a called subscriber substation in the central office 21 has initiated the release of an established connection, but that the calling subscriber in the adjacent exchange 22 or in the distant exchange 23 has not replaced the receiver of the telephone instrument thereat upon its associated switchhook.

The operator at the first operator position 25 then flashes the delay disconnect key K1108, thereby to cause ground potential to be applied intermittently to the control conductor C110 in order to complete a circuit substantially identical to that previously traced for energizing the upper winding of the cord relay R750 in series with the call lamp L802 at the first operator position 25. The consequent flashing of the call lamp L802 at the first operator position 25 identifies the plug P801 and the indicator trunk circuit 26 as the indicator trunk circuit utilized in the partially released established connection. The operator at the first operator position 25 then withdraws the plug P801 from the associated jack J804, thereby to interrupt the previously traced circuit for energizing the winding of the sleeve relay R630 in the indicator trunk circuit 26. Upon restoring, the sleeve relay R630 interrupts, at the contacts 637, the previously traced series circuit for energizing the winding of the delay disconnect relay R1120 in the supervisory circuit 42 and the upper winding of the cord relay R750 in the indicator trunk circuit 26, thereby to cause the latter relays to restore. Upon restoring, the delay disconnect relay R1120 effects the release of the supervisory circuit 42, in a manner more fully explained hereinafter. Also, upon restoring, the sleeve relay R630 interrupts, at the contacts 632, the previously completed connection between the plug P801 and the repeater 650.

At this time the operator at the first operator position 25 may insert the plug P801 into the jack J806 terminating the first operator position telephone circuit 41, thereby to complete an obvious circuit for energizing the winding of the sleeve relay R630. When thus energized the sleeve relay R630 operates to complete an obvious loop circuit between the battery supply relay R610 in the indicator trunk circuit 26 and the first operator position telephone circuit 41, whereby the operator at the first operator position 25 may converse with the subscriber at the calling subscriber substation T2 in the adjacent exchange 22. Furthermore, the operator at the first operator position 25 may insert the plug P801 into the jack J807 or the jack J830, thereby respectively to complete connections between the calling subscriber substation T2 in the adjacent exchange 22 and the manual operator position 43 or the interceptor operator position 45, in a manner more fully explained hereinafter.

On the other hand, the subscriber at the calling subscriber substation T2 in the adjacent exchange 22 may initiate the release of the established connection by replacing the receiver of the telephone instrument thereat upon its associated switchhook; whereupon the previously traced loop circuit for energizing the windings of the line relay R540 in the indicator trunk circuit 26 is interrupted in order to cause the latter relay to restore. Upon restoring, the line relay R540 interrupts, at the contacts 542, the previously traced holding circuit for energizing the winding of the hold relay R520, thereby to cause the latter relay to restore shortly thereafter, the hold relay R520 being of the slow-to-release type.

Upon restoring, the hold relay R520 interrupts, at the contacts 523, the previously mentioned path for applying ground potential to the hold conductor C527, thereby to interrupt the previously traced holding circuit for energizing the winding of the release relay R600 in order to cause the latter relay to restore. Also the hold relay R520 completes, at the contacts 522, a circuit, including the contacts 633 and 441, for energizing the winding of the test busy relay R560, thereby to cause the latter relay to operate. Upon restoring, the release relay R600 completes, at the contacts 601 and 603, the previously mentioned paths for short-circuiting the windings 651 and 653 of the repeater 650; and completes, at the contacts 608, a series circuit, including the contacts 635, for energizing the lower winding of the cord relay R750 and for illuminating the supervisory lamp L893 at the first operator position 25. Upon operating, the test busy relay R560 interrupts, at the contacts 565, a further point in the previously traced circuit for illuminating the permanent lamp L460; and interrupts, at the contacts 561 and 563, the connection between the line conductors C311 and C312 of the trunk 310, and the windings 651 and 653 of the repeater 650. Further the test busy relay R560 completes, at the contacts 564, an alternative path for applying ground potential to the control conductor C313 of the trunk 310; and completes, at the contacts 562, an obvious path for applying ground potential to the line conductor C311 of the trunk 310. Upon operating, the cord relay R750 completes, at the contacts 751, the previously traced circuit for energizing the upper winding of the control relay R1135 in the supervisory circuit 42, thereby to cause operation of the control relay R1140 and the illumination of the pilot lamp L1106, in the manner previously explained.

The illumination of the supervisory lamp L893 at the first operator position 25 indicates to the operator thereat that the release of the established connection has been initiated at the calling subscriber substation T2 in the adjacent exchange 22 or the distant exchange 23 and identifies the indicator trunk circuit 26 and the associated plug P801. The operator at the first operator position 25 then withdraws the plug P801 from the associated jack J804, thereby to interrupt the previously traced circuit for energizing the winding of the sleeve relay R630 in order to cause the latter relay to restore. Upon restoring, the sleeve relay R630 interrupts, at the contacts 633, the previously traced circuit for energizing the winding of the test busy relay R560, thereby to cause the latter relay to restore. Upon restoring, the test busy relay R560 interrupts, at the contacts 564 and 562, the previously mentioned paths for applying ground potential, respectively, to the control conductor C313 and the line conductor C311 of the trunk 310. When ground potential is thus removed from the control conductor C313 of the trunk 310 and consequently from the control conductor C303 of the branch 300Y of the trunk line 300, the branch 300Y of the trunk line 300 is marked as idle to the automatic switching apparatus 71 in the adjacent exchange 22. When ground potential is removed from the line conductor C311 of the trunk 310 and consequently from the line conductor C301 of the branch 300X of the trunk line 300, an obvious alternative circuit for energizing the lower winding of the reverse battery relay R210 is interrupted, thereby to cause the latter relay to restore shortly thereafter, the reverse battery relay R210 being of the slow-to-release type. Upon restoring, the reverse battery relay R210 interrupts, at the contacts 218, the previously mentioned path for applying ground potential to the control conductor C263 of the trunk 260, thereby to mark the trunk 260 as idle to the automatic switching apparatus 81 in the distant exchange 23 having access thereto.

Also, when the subscriber at the calling subscriber substation T2 in the adjacent exchange 22 initiates the release of the established connection, in the manner explained above, the automatic switching apparatus 71 therein is fully released. Furthermore, when the operator at the first operator position 25 withdraws the plug P801 from the associated jack J804 the subscriber line circuit 49 operates in order to mark the called subscriber substation T1 as idle at this time.

In the foregoing explanation of the mode of operation of the indicator trunk circuit 26, it was assumed that, after the call had been extended from the calling subscriber substation T2 in the adjacent exchange 22 to the indicator trunk circuit 26, when the operator at the first operator position 25 at the switchboard 24 made the tip test utilizing the plug P801 and the jack J804 terminating the subscriber line circuit 49 associated with the subscriber line 804 extending to the called subscriber substation T1, the called subscriber substation T1 was found to be idle. However, it may occur that the called subscriber substation T1 is busy at this time, in which case a distinct click is produced in the receiver of the telephone instrument in the first operator position telephone circuit 41 when the tip test is made, in the manner previously explained. In this case the operator at the first operator position 25 momentarily operates the common busy key K1104, thereby to complete an obvious path for applying ground potential to the common busy conductor C101. The application of ground potential to the common busy conductor C101 completes an obvious circuit, including the contacts 402 and 632', for energizing the lower winding of the tone relay R410 in the indicator trunk circuit 26. When the tone relay R410 is thus energized it operates to complete, at the contacts 414, an obvious holding circuit, including the grounded hold conductor C527, for energizing the lower winding thereof. Also, the tone relay R410 interrupts, at the contacts 416, the previously traced ground circuit for illuminating the permanent lamp L460; and completes, at the contacts 415, the previously traced alternative circuit, including the slow interrupted ground conductor C115, for flashing the permanent lamp L460. Further the tone relay R410 completes, at the contacts 412, the previously traced circuit for energizing the winding of the release relay R600, thereby to cause the latter relay to operate. Further the tone relay R410 completes, at the contacts 417, the previously traced circuit, including the busy tone conductor C419, for energizing the winding 654 of the repeater 650 in series with the lower winding of the battery supply relay R610. Upon operating, the release relay R600 completes, at the contacts 609, the previously traced holding circuit for energizing the winding thereof; and interrupts, at the contacts 601 and 603, the previously mentioned paths for short-circuiting the windings 651 and 653 of the repeater 650. Further the release relay R600 completes, at the contacts 602, the previously traced series circuit, including the windings 651 and 653 of the repeater 650 and the condenser 655; whereby the busy tone current traversing the winding 654 of the repeater 650 induces a corresponding busy tone voltage in the winding 653 of the repeater 650, whereby busy tone current is returned over the previously traced loop circuit extending to the calling subscriber substation T2 in the adjacent exchange 22.

The subscriber at the calling subscriber substation T2 in the adjacent exchange 22, upon receiving busy tone, releases the equipment by replacing the receiver of the telephone instrument thereat upon its associated switchhook, in the manner previously explained.

*Extension of a call from a subscriber substation in the adjacent exchange 22 to a party subscriber substation in the central office 21*

Considering now the extension of a call from a calling subscriber substation, such, for example, as the subscriber substation T2 in the adjacent exchange 22, to a called party subscriber substation, such, for example, as the party subscriber substation TP1 in the central office 21, the subscriber at the calling subscriber substation T2 first initiates the call in the manner previously explained. Again assume that the automatic switching apparatus 71 in the adjacent exchange 22 seizes the branch 300Y of the trunk line 300, that the trunk line 300 is connected to the indicator trunk circuit 26 by the traffic transfer circuit 61, and that the register selector 27 individually associated with the indicator trunk circuit 26 selects the first register 28, all in the manner previously explained. The subscriber at the calling subscriber substation T2 in the adjacent exchange 22 then proceeds to dial first the code portion of the directory number of the called party subscriber substation TP1 in the central office 21, then the four digits of the numerical portion of the directory number thereof, and finally the ring digit of the directory number thereof. The code portion of the directory number of the called party subscriber substation TP1 is utilized entirely in the automatic switching apparatus 71 or the last digit thereof is absorbed by the digit absorbing relay R530 in the indicator trunk circuit 26, in the manner previously explained. The thousand digit of the numerical portion of the directory number of the called party subscriber substation TP1 is registered in the first and ring digit switch 770 in the indicator trunk circuit 26 and is then repeated by the send relay R640 therein and registered in the M switch 1220 in the first register 28; whereupon the first and ring digit switch 770 is released, all in the manner previously explained. The hundred digit, the ten digit and the unit digit of the numerical portion of the directory number of the called party subscriber substation TP1 are then registered successively in the C switch 1310, the D switch 1320 and the U switch 1410 in the first register 28, in the manner previously explained. Finally, at the conclusion of the unit digit of the numerical portion of the directory number of the called party subscriber substation TPI, the wipers noted of the sequence switch 1450 in the first register 28 are driven an additional step in the clockwise direction to engage the third contacts in the associated contact banks, as previously explained.

The line relay R540 in the indicator trunk circuit 26 then follows the impulses of the ring digit of the directory number of the called party subscriber substation TPI, repeating the impulses mentioned at the contacts 541 over the impulse conductor C114, in the manner previously explained. The impulses repeated over the impulse conductor C114 cause the impulse relay R1430 in the first register 28 to follow. The circuit for energizing the winding of the impulse relay R1430 extends, when completed, from the grounded impulse conductor C114 by way of the wiper 1212 of the register selector 27 and the engaged contact in the associated contact bank, the contacts 1361, the wiper 1451 of the sequence switch 1450 and the engaged third contact in the associated contact bank, and the winding of R1430 to battery. Each time the impulse relay R1430 operates it completes, at the contacts 1431, an obvious circuit, including the conductor C131, for energizing the rotary magnet M1423 of the ring switch 1420; whereby the ring digit is registered in the ring switch 1420, in the manner previously explained. Also, each time the impulse relay R1430 operates it completes, at the contacts 1433, a path, including the wiper 1213 of the register selector 27 and the engaged contact in the associated contact bank, for applying ground potential to the lamp and impulse conductor C119. Each time ground potential is applied to the lamp and impulse conductor C119 a circuit is completed for energizing the rotary magnet M773 of the first and ring digit register switch 770, this circuit extending, when completed, from the grounded lamp and impulse conductor C119 by way of the contacts 645, 425 and 508, the contacts 533 or the "X" strap, the contacts 643 and the rotary magnet M773 to battery. Accordingly, the ring digit repeated by the impulse relay R1430 in the first register 28 over the lamp and impulse conductor C119 causes the first and ring digit register switch 770 in the indicator trunk circuit 26 to be set, whereby the ring digit is registered in the first and ring digit register switch 770. Also the impulses of the ring digit transmitted over the lamp and impulse conductor C119 complete a circuit, including the contacts 645, 425 and 508, for energizing the winding of the dial relay R450, thereby to cause the latter relay to operate and remain operated during the impulsing of the ring digit. Upon operating, the dial relay R450 completes, at the contacts 452, the previously mentioned circuit for energizing the winding of the dial slave relay R440, thereby to cause the latter relay to operate. Further the dial relay R450 completes, at the contacts 454, an alternative circuit for energizing the winding of the control relay R500, this circuit extending from the grounded hold conductor C527 by way of the contacts 603', 421 and 454, and the winding of R500 to battery. When thus energized the control relay R500 operates to complete, at the contacts 505, a holding circuit substantially identical to that traced above for energizing the winding thereof.

At the conclusion of the ring digit of the directory number of the called party subscriber substation TPI the line relay R540 reoperates, thereby to interrupt, at the contacts 541, the previously traced circuit for energizing the winding of the impulse relay R1430 in the first register 28, thereby to cause the latter relay to restore. Upon restoring, the impulse relay R1430 interrupts, at the contacts 1433, the previously traced path for applying ground potential to the lamp and impulse conductor C119, thereby to interrupt the previously traced circuit for energizing the winding of the dial relay R450 in the indicator trunk circuit 26; whereby the latter relay restores shortly thereafter, the dial relay R450 being of the slow-to-release type. Upon restoring, the dial relay R450 interrupts, at the contacts 452, the previously mentioned circuit for energizing the winding of the dial slave relay R440, thereby to cause the latter relay to restore shortly thereafter, the dial slave relay R440 being of the slow-to-release type. During the registration of the ring digit in the ring switch 1420 in the first register 28 the rotary magnet M1423 thereof operates intermittently, as previously explained. Each time the rotary magnet M1423 operates it completes, at the contacts 1423, an obvious alternative circuit, including the conductor C133, for energizing the winding of the dial relay R1370, thereby to cause the latter relay to operate and remain operated during impulsing. Upon operating, the dial relay R1370 completes, at the contacts 1372, the previously traced circuit for energizing the winding of the cutoff relay R1380, thereby to cause the latter relay to operate, as previously explained. At the conclusion of the ring digit the rotary magnet M1423 of the ring switch 1420 restores, thereby to interrupt, at the contacts 1423, the previously traced alternative circuit for energizing the winding of the dial relay R1370; whereby the latter relay restores shortly thereafter, the dial relay R1370 being of the slow-to-release type. Upon restoring, the dial relay R1370 effects restoration of the cutoff relay R1380 shortly thereafter, the cutoff relay R1380 being of the slow-to-release type. Upon restoring, the cutoff relay R1380 completes, at the contacts 1381, an alternative circuit for energizing the winding of the call registered relay R1360, this circuit extending from ground by way of the contacts 1244, 1235, 1344, 1371 and 1381, the wiper 1452 of the sequence switch 1450 and the engaged fourth contact in the associated contact bank, and the winding of R1360 to battery. Shortly after the call registered relay R1360 is thus energized it operates, the latter relay being of the slow-to-operate type, as previously noted. Upon operating, the call registered relay R1360 prepares at the contacts 1365, the previously traced circuit for energizing the lower winding of the display relay R1390, which circuit is subsequently completed under the control of the lockout relay R1530 in the register allotter 29, in the manner previously explained. Upon operating, the display relay R1390 effects operation of the display slave relay R1350, thereby to prepare the previously traced circuit for energizing the winding of the lockout relay R1440. Subsequently, the lockout relay R1440 operates under the control of the chain circuit previously described in order to effect operation of the lockout slave relay R1300, in the manner previously explained. Upon operating, the lockout slave relay R1300 completes, at the contacts 1305, etc., the previously traced circuits for illuminating the selected lamps in the various digit panels in the first display board 31, in the manner previously explained. In the present example, it is pointed out that the lockout slave relay R1300 completes, at the contacts 1309, a circuit, including the common display conductor C124, the contacts 1335, the conductor C139, and the wiper 1421 of the ring switch 1420 and the engaged contact in the associated contact bank for illuminating the selected one of the lamps in the ring digit panel of the first display board 31.

The operator at the first operator position 25 observing the illuminated call lamp L802 thereat identifying the plug P801 in the associated indicator trunk circuit 26 and the illuminated display board 31 indicating the directory number of the called party subscriber substation TP1 seizes the plug P801 and makes a tip test in connection with the jack J805 terminating the subscriber line circuit 50 associated with the party subscriber line 805 extending to the called party subscriber substation TP1, in the manner previously explained.

Assuming that the called party subscriber substation TP1 is idle at this time, the operator inserts the plug P801 into the jack J805, thereby to complete the previously traced circuit for energizing the winding of the sleeve relay R630 in the indicator trunk circuit 26, in order to cause the latter relay to operate. Upon operating, the sleeve relay R630 completes, at the contacts 639, the previously traced circuit for energizing the winding of the release relay R600, thereby to cause the latter relay to operate shortly thereafter, the release relay R600 being of the slow-to-operate type. Upon operating, the release relay R600 effects the release of the lamp fault relay R400, the cut-in relay R430, the cut-off relay R420, the control relay R500, the digit absorbing relay R530 (in the event the latter relay is utilized), and the ring select relay R720, thereby to cause the latter relays to restore. More particularly, the release relay R600 interrupts, at the contacts 603', the previously traced holding circuit for energizing the lower winding of the ring select relay R720. Further the release relay R600 completes, at the contacts 605, the previously traced circuit for projecting ringing current over the plug P801, the associated jack J805, the subscriber line circuit 50 and the party subscriber line 805 to the called party subscriber substation TP1.

At this point it is noted that the character of the ringing current projected over the party subscriber line 805 depends upon the particular ring digit which is registered in the first and ring digit register switch 770. More particularly, the sleeve relay R630 completes, at the contacts 634', an obvious path for applying ground potential to the wiper 772 of the first and ring digit register switch 770. Accordingly, in the event the digit 3 (the equivalent letter F) is registered in the switch 770, an obvious circuit is completed for energizing the lower winding of the ring select relay R720, thereby to cause the latter relay to reoperate; in the event the digit 8 (the equivalent letter T) is registered in the switch 770, an obvious series circuit is completed for energizing the lower winding of the ring divide relay R730 and the upper winding of the ring select relay R720, thereby to cause the relays mentioned to operate; finally, in the event the digit 7 (the equivalent letter R) or the digit 9 (the equivalent letter Y) is registered in the switch 770, an obvious circuit is completed for energizing the upper winding of the ring divide relay R730, thereby to cause the latter relay to operate. The ring select relay R720 controls, at the contacts 721 and 722, the connection of the ringing circuit to the one ring conductor C112 or to the two ring conductor C113; while the ring divide relay R730 controls, at the contacts 731, 733 and 732, 734, the one of the line conductors of the party subscriber line 805 over which the one ring conductor C112 or the two ring conductor C113 projects the ringing current.

The control of the ring select relay R720 and the ring divide relay R730, by the first and ring digit register switch 770, selectively to govern the projection of ringing current over the tip and ring of the plug P801 in accordance with the various digit and letter registrations in the first ring and digit register switch 770, as well as the display in the ring digit panel of the display board, will be readily understood from the ring and display table appearing below:

| Registration in switch 770 | | Display by ring digit panel | Relays operated | | Grounded | Generator on | |
|---|---|---|---|---|---|---|---|
| Digit | Letter | | R730 | R720 | | 1 ring | 2 ring |
| X1 | -------- | * | No | No | Tip | Ring | |
| X2 | -------- | * | No | No | Tip | Ring | |
| 3 | F | F | No | Yes | Tip | -------- | Ring |
| X4 | -------- | * | No | No | Tip | Ring | |
| 5 | L | L | No | No | Tip | Ring | |
| 6 | M | M | No | No | Tip | Ring | |
| 7 | R | R | Yes | No | Ring | Tip | |
| 8 | T | T | Yes | Yes | Ring | -------- | Tip |
| 9 | Y | Y | Yes | No | Ring | Tip | |
| XX0 | Z | Test | No | No | Tip | Ring | |

X = mutilated call.
XX = test number.

In connection with the above ring and display table it is pointed out that the digits 1, 2 and 4, or the corresponding letters, are not assigned and are registered only in the first and ring digit register switch 770 through error constituting a mutilated call; while the digit 0 or the corresponding letter Z is assigned as part of a test number. Considering now the first and ring digit register switch 770 in the indicator trunk circuit 26 in conjunction with the ring switch 1420 in the first register 28, it is again pointed out that any digit or corresponding letter is registered simultaneously in these two switches following the unit digit of the numerical portion of a directory number dialed thereinto. Further it is pointed out that the first, second and fourth contacts in the contact banks associated with the wipers 1421 and 1422 of the ring switch 1420 are wired to the * lamps in the ring digit panels of the respective display boards 31 and 32; accordingly, the * lamp in the ring digit panel of the selected display board is illuminated when a mutilated ring digit is dialed. Similarly, the tenth contacts in the contact banks associated with the wipers 1421 and 1422 of the ring switch 1420 are wired to the test lamps in the ring digit panels of the respective display boards 31 and 32; accordingly, the test lamp in the ring digit panel of the selected display board is illuminated when the ring digit 0 or the corresponding letter Z is dialed.

The subsequent operation of the indicator trunk circuit 26 incident to the answering of the call at the called party subscriber substation TP1, as well as the subsequent release of the equipment utilized in the established connection, are the same as those previously described.

*Extension of a call from a subscriber substation in the distant exchange 23 to a subscriber substation in the central office 21*

Considering now the extension of a call from a calling subscriber substation, such, for example, as the subscriber substation T3 in the distant exchange 23, to a called subscriber substation in the central office 21, the subscriber at the calling subscriber substation T3 first initiates the call, in the usual manner, whereby the automatic switching apparatus 81 is operatively associated with the subscriber line 82 extending to the subscriber substation T3. The subscriber at the calling subscriber substation T3 then dials one or more digits over the subscriber line 82 into the automatic switching apparatus 81, thereby to cause the automatic switching apparatus 81 to operate and seize an idle one of the trunks accessible thereto, such, for example, as the trunk 260 extending to the trunk circuit 91, the trunk 260 being marked as idle by the absence of ground potential upon the control conductor C263 thereof. When the automatic switching apparatus 81 thus seizes the trunk 260 a loop circuit is completed for energizing in series the upper and lower windings of the line relay R220 in the trunk circuit 91, this loop circuit extending from ground by way of the lower winding of R220 and the contacts 214 to the line conductor C262 of the trunk 260; and from battery by way of the upper winding of R220 and the contacts 212 to the line conductor C261 of the trunk 260, an operative connection being completed between the line conductors C261 and C262 of the trunk 260 and the calling subscriber substation T3 by way of the automatic switching apparatus 81 and the subscriber line 82. When thus energized the line relay R220 operates to complete, at the contacts 222, an obvious circuit, including the contacts 215, for energizing the winding of the hold relay R240.

When thus energized the hold relay R240 operates to complete, at the contacts 245, an obvious holding circuit substantially identical to that traced above for energizing the winding thereof. Also the hold relay R240 completes, at the contacts 243, an obvious circuit for energizing the lower winding of the answer relay R250; and completes, at the contacts 242, a loop circuit for energizing the upper winding of the answer relay R250 in the trunk circuit 91 in series with the upper and lower windings of the line relay R540 in the indicator trunk circuit 26, assuming that the traffic transfer circuit 61 occupies its normal position connecting the trunk line 300 to the trunk 310. The above-mentioned loop circuit extends from ground by way of the upper winding of R540, the contacts 554, 603 and 563, the line conductor C312 of the trunk 310, the contacts 343, the line conductor C302 of the branch 300X of the trunk line 300, the contacts 221, the resistor 202, the lower winding of the impedance 225, the contacts 217, the upper winding of the answer relay R250, the resistor 205, the contacts 242, the line conductor C301 of the branch 300X of the trunk line 300, the contacts 341, the line conductor C311 of the trunk 310, the contacts 561, 601 and 552 and the lower winding of R540 to battery. When this loop circuit is completed the line relay R540 in the indicator trunk circuit 26 operates. However, the answer relay R250 in the trunk circuit 91 does not operate as the latter relay is of the differential type, the upper and lower windings thereof being energized in opposition at this time. Further the hold relay R240 completes, at the contacts 246, an obvious path for applying ground potential to the control conductor C263 of the trunk 260, thereby to mark the trunk 260 as busy to the remainder of the switching apparatus in the distant exchange 23. The line relay R540 in the indicator trunk circuit 26 effects operation of the hold relay R520, whereby ground potential is applied to the control conductor C313 of the trunk 310 and consequently to the control conductor C303 of the branch 300Y of the trunk line 300, thereby to mark the branch 300Y of the trunk line 300 as busy to the automatic switching apparatus 71 in the adjacent exchange 22.

The subscriber at the calling subscriber substation T3 in the distant exchange 23 proceeds to dial the preliminary digit or the thousand digit of the directory number of the called subscriber substation into the trunk circuit 91, whereby the line relay R220 follows the impulses of the digit mentioned. The first time the line relay R220 restores it completes, at the contacts 223, a circuit, including the contacts 244, for energizing the winding of the dial relay R230, thereby to cause the latter relay to operate; and interrupts, at the contacts 222, the previously traced holding circuit for energizing the winding of the hold relay R240. Each time the line relay R220 operates it interrupts, at the contacts 223, the previously traced circuit for energizing the winding of the dial relay R230; and recompletes, at the contacts 222, the previously traced holding circuit for energizing the winding of the hold relay R240. The dial relay R230 and the hold relay R240 are of the slow-to-release type; accordingly, neither of these relays restores during impulsing. Also, upon operating, the dial relay R230 interrupts, at the contacts 231, the previously traced original loop circuit extending to the line relay R540 in the indicator trunk circuit 26; and prepares, at the contacts 232, a dialing bridge in the previously traced loop circuit, this dialing bridge extending, when completed, from the line conductor C301 of the branch 300X of the trunk line 300 by way of the contacts 242 and 232, the resistor 202 and the contacts 221 to the line conductor C302 of the branch 300X of the trunk line 300. Accordingly, each time the line relay R220 restores it interrupts, at the contacts 221, the above-traced dialing bridge and inserts the high series resistance 201 therein, whereby the previously traced loop circuit for energizing the winding of the line relay R540 in the indicator trunk circuit 26 is effectively interrupted. Accordingly, the line relay R220 in the trunk circuit 91 repeats the impulses of the digit received over the trunk 260 by way of the previously traced loop circuit to the line relay R540 in the indicator trunk circuit 26, whereby the indicator trunk circuit 26 operates, in the manner previously explained, in response to the digit transmitted thereto. Also, upon operating, the dial relay R230 completes, at the contacts 233, an obvious shunt, including the high resistance 208 across the line conductors C261 and C262 of the trunk 260, in order to improve the response of the line relay R220.

At the conclusion of the digit, the line relay R220 reoperates, thereby to interrupt, at the contacts 223, the previously traced circuit for energizing the winding of the dial relay R230 in order to cause the latter relay to restore shortly thereafter, the dial relay R230 being of the slow-to-release type. Upon restoring, the dial relay R230 interrupts, at the contacts 232, the previously traced dialing bridge included in the loop circuit extending between the trunk circuit 91 and the indicator trunk circuit 26; and recompletes, at the contacts 231, the previously traced original loop circuit. Further the dial relay R230 interrupts, at the contacts 233, the previously traced shunt across the line conductors C261 and C262 of the trunk 260. At this time the loop circuit extending between the trunk circuit 91 and the indicator trunk circuit 26 is operatively connected by way of the condensers 206 and 207 to the line conductors C261 and C262 of the trunk 260, and therefrom by way of the automatic switching apparatus 81 and the subscriber line 82 to the calling subscriber substation T3.

The subscriber at the calling subscriber substation T3 proceeds to dial the remainder of the digits of the directory number of the called subscriber substation in the central office 21, whereby the line relay R220 in the trunk circuit 91 repeats the digits mentioned to the line relay R540 in the indicator trunk circuit 26; whereby the indicator trunk circuit 26 and the selected register in the group accessible to the register selector 27 are completely operated, in the manner previously explained, the selected register in the group mentioned being effective to cause display of the directory number of the called subscriber substation in the central office 21 by the selected display board 31 or 32 at the first operator position 25 at the switchboard 24.

The operator at the first operator position 25 extends the call by inserting the plug P801 into the appropriate jack, in the manner previously explained. Subsequently, when the subscriber at the called subscriber substation in the central office 21 answers the call the reverse battery relay R550 in the indicator trunk circuit 26 operates in order to cause battery potential to be reversed over the previously traced loop circuit extending between the trunk circuit 91 and the indicator trunk circuit 26. When battery potential is thus reversed over the loop circuit extending between the trunk circuit 91 and the indicator trunk circuit 26 the current traversing the upper winding of the answer relay R250 is reversed, whereby the latter relay operates, the answer relay R250 being of the differential type, as previously noted. Upon operating, the answer relay R250 completes, at the contacts 252, an obvious shunt around the resistor 205 included in the previously traced loop circuit extending between the trunk circuit 91 and the indicator trunk circuit 26; and completes, at the contacts 251, an obvious circuit for energizing the upper winding of the reverse battery relay R210. When thus energized the reverse battery relay R210 operates to complete, at the contacts 216, a path for including the upper and lower windings of the impedance 225 in series in the previously mentioned loop circuit; and to interrupt, at the contacts 217, the previously traced path for including the lower winding of the impedance 225 in the previously traced loop circuit. At this time the loop circuit extending between the trunk circuit 91 and the indicator trunk circuit 26 includes the line conductor C301 of the branch 300X of the trunk line 300, the contacts 242 and 252, the upper winding of R250, the contacts 216, the upper and lower windings of the impedance 225, the contacts 253 and the line conductor C302 of the branch 300X of the trunk line 300.

Further the reverse battery relay R210 completes, at the contacts 211 and 213, an obvious connection for reversing battery by way of the windings of the line relay R220 over the trunk 260; and interrupts, at the contacts 212 and 214, the previously traced original connection for supplying battery from the windings of the line relay R220 over the trunk 260. This reversal of battery over the trunk 260 may be utilized in the automatic switching apparatus 81 for control purposes, in a well-known manner. Further the reverse battery relay R210 completes, at the contacts 218, an obvious multiple path for applying ground potential to the control conductor C263 of the trunk 260, thereby to retain the trunk 260 marked as busy to the remainder of the switching apparatus in the distant exchange 23.

The subsequent release of the established connection between the calling subscribed substation T3 in the distant exchange 23 and the called subscriber substation in the central office 21 is initiated at the calling subscriber substation T3 when the subscriber thereat replaces the receiver of the telephone instrument upon its associated switchhook. When the release of the established connection is thus initiated at the calling subscriber substation T3 the automatic switching apparatus 81 in the distant exchange 23 is released, thereby to effect the restoration of the line relay R220. Upon restoring, the line relay R220 interrupts, at the contacts 221, the previously traced loop circuit extending between the trunk circuit 91 and the indicator trunk circuit 26; whereby the indicator trunk circuit 26 operates to give the operator at the first operator position 25 disconnect supervision, in the manner previously explained. Also, upon restoring, the line relay R220 interrupts, at the contacts 222, the previously traced holding circuit for energizing the winding of the hold relay R240, thereby to cause the latter relay to restore shortly thereafter, the hold relay R240 being of the slow-to-release type. Upon restoring, the hold relay R240 interrupts, at the contacts 242 and 243, the previously traced circuits for energizing the upper and lower windings of the answer relay R250, thereby to cause the latter relay to restore. Upon restoring, the answer relay R250 interrupts, at the contacts 251, the previously mentioned circuit for energizing the upper winding of the reverse battery relay R210, thereby to cause the latter relay to restore shortly thereafter, the reverse battery relay R210 being of the slow-to-release type. Upon restoring, the reverse battery relay R210 interrupts, at the contacts 218, the previously traced path for applying ground potential to the control conductor C263 of the trunk 260, thereby to mark the trunk 260 as idle to the automatic switching apparatus 81 in the distant exchange 23 having access thereto.

Miscellaneous operations of the registers in conjunction with the busy circuit Reconsidering now the operation of the first register 28, it is again pointed out that when one of the register selectors, such, for example, as the register selector 27, seizes the first register 28 a timing operation of the timer switch 1460 is initiated. More particularly, the previously traced circuit, including the fast interrupted ground conductor C121, the contacts 1331, 1341, 1363 and 1383, is completed for energizing the rotary magnet M1413 of the timer switch 1460; whereby the wipers noted of the timer switch 1460 are driven step by step in the clockwise direction. When the hundred digit of the numerical portion of the directory number of the called subscriber substation is dialed the dial relay R1370 and the cutoff relay R1380 operate, in the manner previously explained. Upon operating, the cutoff relay R1380 interrupts, at the contacts 1383, the previously traced circuit for energizing the rotary magnet M1463 of the timer switch 1460; and completes, at the contacts 1384, the previously traced circuit for energizing the release magnet M1465 of the timer switch 1460; whereby the wipers noted thereof are released and returned to their normal positions. Accordingly, the timer switch 1460 is operated intermittently in accordance with the speed established by the rate of application of ground potential to the fast interrupted ground conductor C121 during the time interval between the seizure of the first register 28 by the register selector 27 and the dialing thereinto of the hundred digit of the directory number of the called subscriber substation. Also, at the conclusion of the hundred digit of the directory number of the called subscriber substation, the dial relay R1370 and the cutoff relay R1380 restore; whereby another timing operation of the timer switch 1460 is initiated, in the manner previously explained, this timing operation of the timer switch 1460 being arrested at the beginning of the dialing of the ten digit of the directory number of the called subscriber substation. Accordingly, the timer switch 1460 also times the time interval between the dialing of the hundred digit and the ten digit of the directory number of the called subscriber substation; times the time interval between the ten digit and the unit digit thereof; and times the time interval between the unit digit and the ring digit thereof, in a similar manner.

In the event the timer switch 1460 operates a first time interval at the conclusion of the unit digit of the directory number of the called subscriber substation, the wiper 1461 thereof engages the contact in the associated contact bank terminating the conductor terminated by the third contact in the contact bank associated with the wiper 1452 of the sequence switch 1450, thereby to complete the previously traced circuit for energizing the winding of the call registered relay R1360. In the event the timer switch 1460 operates a second and longer time interval, the wiper 1461 thereof engages the contact in the associated contact bank extending to the contacts 1393 of the display relay R1390; whereby the excess hold meter M1356 is operated in the event the display relay R1390 occupies its operated position, thereby to indicate the excessive holding of a call ready for display by the operator at the first operator position 25 at the switchboard 24 prior to extension thereof. Finally, in the event the timer switch 1460 operates a third and a still longer time interval, the wiper 1461 thereof engages the last contact in the associated contact bank; whereby an obvious alternative circuit is completed for energizing the winding of the call registered relay R1360 and for operating the calls completed meter M1470.

Thus, it will be understood that the call registered relay R1360 is operated at the conclusion of the dialing of the ring digit of the directory number of the called subscriber substation by way of the previously traced circuit, including the wiper 1452 of the sequence switch 1450 and the engaged fourth contact in the associated contact bank, the contacts 1381, 1371, 1344, 1235 and 1244, or by way of one of the previously traced circuits, including the wiper 1461 of the timer switch 1460. Hence, it will be understood that the call registered relay R1360 is operated immediately at the conclusion of the dialing of the ring digit of the directory number of the called subscriber substation under the control of the sequence switch 1450; or at the conclusion of the first time interval mentioned following the dialing of the unit digit of the directory number of the called subscriber substation under the joint control of the timer switch 1460 and the sequence switch 1450; or at the conclusion of the third time interval mentioned under the control of the timer switch 1460.

Upon operating, the call registered relay R1360 interrupts, at the contacts 1361, further registration of digits in the first register 28; and prepares, at the contacts 1365, the previously traced circuit for energizing the lower winding of the display relay R1390. Subsequently, the display relay R1390 is operated under the control of the register allotter 29 in order to effect operation of the display slave relay R1350, in the manner previously explained. The display slave relay R1350 prepares the previously traced circuit for energizing the winding of the lockout relay R1440, whereby the latter relay is ultimately operated under the control of the associated chain circuit in order to effect operation of the lockout slave relay R1300, in the manner previously explained. Upon operating, the lockout slave relay R1300 prepares, at the contacts 1305, etc., circuits for illuminating the selected lamps in the various digit panels in the first display board 31. At this time, the selected lamps in the various display panels in the selected display board 31 or 32 are illuminated in order to indicate to the operator at the first operator position 25 the directory number of the called subscriber substation.

In the event a full complement of lamps in the selected display board 31 or 32 is not illuminated, it indicates to the operator at the first operator position 25 that the call is mutilated and that it will be impossible for her to extend the connection to the desired called subscriber substation. Similarly, in the event the * lamp in the ring digit panel of the selected display board 31 or 32 is illuminated, it indicates to the operator at the first operator position 25 that an improper ring digit has been dialed, that the call is mutilated and that it will be impossible for her to extend the connection to the desired called subscriber substation. In the event the selected display board 31 or 32 indicates a mutilated call to the operator at the first operator position 25, she seizes the plug indicated by the illuminated call lamp and inserts it into one of the jacks, such, for example, as the jack J830, terminating the trunk circuit 46 associated with the trunk 833 extending to the interceptor operator position 45; whereby the call is handled by the operator at the interceptor operator position 45, in a manner more fully explained hereinafter.

Considering now more particularly the operation of the registers in the group associated with the busy circuit 30, it is noted that the last register in the associated group is normally rendered inaccessible to the various register selectors 27, etc., due to the operated positions of the last register select relay R1550 and the registers busy relay R1560 in the busy circuit 30. More particularly, a path is normally completed for applying ground potential to the test conductor of the last register in the group mentioned, this path normally extending from ground by way of the contacts 1563 and 1551, the conductor C122, the "Z" strap and the contacts (corresponding to the contacts 1231 in the first register 28) to the test conductor of the last register; the test conductor of the last register being terminated in the contact bank associated with the wiper 1211 of the register selector 27 and multipled to the corresponding contact banks of the other register selector.

When all of the registers in the associated group, with the exception of the last register therein, have been rendered busy, ground potential is removed from the busy conductor C126, ground potential being removed from the busy conductor C126 in the first register 28 incident to operation of the seizure relay R1340, the busy relay R1230 or the release relay R1240, in an obvious manner. When ground potential is removed from the busy conductor C126 the previously traced circuit for energizing the winding of the last register select relay R1550 is interrupted, thereby to cause the latter relay to restore. Upon restoring, the last register select relay R1550 interrupts, at the contacts 1551, the previously traced path for applying ground potential to the test conductor of the last register; and completes, at the contacts 1552, a test path for the last register rendering the last register accessible to the various register selectors 27, etc. The above-mentioned test path extends from the test conductor of the last register by way of the contacts (corresponding to the contacts 1231 in the first register 28), the Z strap, C122, the contacts 1552, C123, the Z strap and the contacts (corresponding to the contacts 1241 in the first register 28) and the winding of the seizure relay in the last register (corresponding to the seizure relay R1340 in the first register 28) to battery. Accordingly, when all of the registers in the group associated with the busy circuit 30, except the last register therein, have been rendered busy, the busy circuit 30 operates in order to render the last register in the group mentioned accessible to the various register selectors 27, etc. When the last register in the group mentioned is rendered busy, ground potential is removed from the busy conductor C147 due to the operation of the seizure relay in the last register; whereby the previously traced circuit for energizing the winding of the registers busy relay R1560 in the busy circuit 30 is interrupted in order to cause the latter relay to restore. Upon restoring, the registers busy relay R1560 completes, at the contacts 1561, an obvious circuit for operating the all-registers-busy meter M1571; and completes, at the contacts 1566, an obvious path for applying ground potential by way of the contacts 1581 of the subgroup busy key K1580 to the subgroup conductor C105, thereby to complete an obvious circuit for energizing the winding of the subgroup relay R760 in the first subgroup busy equipment in order to cause the latter relay to operate. Further, the registers busy relay R1560 completes, at the contacts 1564, 1565, etc., similar paths for applying ground potential to the other subgroup busy conductors C145, C146, etc., in order to effect operation of the other subgroup relays in the other subgroup busy equipment, not shown.

Upon operating, the subgroup busy relay R760 completes, at the contacts 761, an obvious circuit, including the contacts 522 and 634, for energizing the winding of the test busy relay R560 in the indicator trunk circuit 26, thereby to cause the latter relay to operate. Upon operating, the test busy relay R560 completes, at the contacts 562 and 564, the previously mentioned paths for applying ground potential respectively to the control conductor C313 and to the line conductor C311 of the trunk 310, whereby the branches 300X and 300Y of the trunk line 300 respectively terminating in the distant exchange 23 and in the adjacent exchange 22 are marked as busy to the switching apparatus in the respective exchanges having access thereto. Thus, the operation of the test busy relay R560 renders the indicator trunk circuit 26 busy. Also, the subgroup busy relay R760 completes, at the contacts 762, etc., similar circuits for busying the other indicator trunk circuits in the subgroup, including the indicator trunk circuit 26. Finally, the other subgroup busy relays busy the other subgroups of indicator trunk circuits, whereby all of the indicator trunk circuits in the group associated with the first operator position 25 at the switchboard 24 are rendered busy.

Further, it will be understood that any individual indicator trunk circuit 26 may be rendered busy by operating its associated busy key. For example, the indicator trunk circuit 26 may be rendered busy by operating the busy key K573, thereby to complete an obvious circuit for energizing the winding of the test relay R560, whereby the latter relay operates in order to busy the indicator trunk circuit 26, in the manner explained above. Furthermore, any one of the subgroups of indicator trunk circuits may be rendered busy by operating the associated subgroup busy key. For example, the subgroup of indicator trunk circuits, including the indicator trunk circuit 26, may be rendered busy by operating the subgroup busy key K1580, thereby to complete, at the contacts 1582 thereof, an obvious alternative circuit for energizing the winding of the subgroup busy relay R760 in order to cause the latter relay to operate, whereby the associated subgroup of indicator trunk circuits is rendered busy in the manner previously explained.

Further, it is pointed out that as each indicator trunk circuit in the first group becomes busy ground potential therein is removed from the trunks busy conductor C106, ground potential in the indicator trunk circuit 26 being removed from the trunks busy conductor C106 incident to operation of the release relay R600 or the switch relay R620, as previously explained. Accordingly, when all of the indicator trunk circuits in the first group are busy, ground potential is removed from the trunks busy conductor C106, thereby to interrupt the previously traced circuit for energizing the winding of the trunks busy relay R1540; whereupon the latter relay restores to complete, at the contacts 1541, an obvious circuit for operating the all-trunks-busy meter M1570.

Operation of the traffic transfer circuit

Considering now the operation of the traffic transfer circuit 61, it is pointed out that either one of the trunk lines 300 or 330 may be selectively connected to the trunk 310 extending to the indicator trunk circuit 26 or to the trunk 320 extending to the indicator trunk circuit 36, the indicator trunk circuits 26 and 36 being included in two groups respectively associated with the first and second operator positions 25 and 35, respectively, at the switchboard 24. Moreover, the various trunk lines 300, 330, etc., are arranged in different subgroups which may be selectively connected by the associated transfer relays to corresponding subgroups of trunks including the trunks 310, 320, etc., mentioned. For example, the trunk line 300 is included in a subgroup which is normally connected by way of the back contacts of the transfer relay R340 to a subgroup of trunks, including the trunk 310; while the trunk line 330 is included in a subgroup which is normally connected by way of the back contacts of the transfer relay R360 to a subgroup of trunks, including the trunk 320. The subgroup of trunk lines, including the trunk line 300, may be connected by way of the front contacts of the transfer relay R340 to the subgroup of trunks, including the trunk 320; while the subgroup of trunk lines, including the trunk line 330, may be connected by way of the front contacts of the transfer relay R360 to the subgroup of trunks, including the trunk 310. Finally, the operations of the transfer relays R340 and R360 are respectively controlled by the individually associated transfer keys K350 and K370. Thus it will be understood that any one of the subgroups of trunk lines or all of the subgroups of trunk lines normally connected to indicator trunk circuits associated with one of the operator positions may be disconnected therefrom, and connected to the indicator trunk circuits associated with the other of the operator positions, by appropriately operating the corresponding transfer keys K350, K370, etc. The traffic transfer circuit 61 comprises a convenient arrangement for distributing traffic between the operator positions 25 and 35 at the switchboard 24 and renders it possible to render night service at either one of the operator positions at the switchboard.

For example, when night service is to be instituted at the first operator position 25 at the switchboard 24, the various transfer keys K370, etc., are operated, whereby all of the incoming subgroups of trunk lines are connected to the various subgroups of trunks extending to the corresponding subgroups of indicator trunk circuits associated with the first operator position 25; then, one or more of the subgroup busy keys K1580, etc., may be operated in order to busy corresponding ones of the subgroups of indicator trunk circuits, whereby the operator at the first operator position 25 may complete all connections by way of the indicator trunk circuits included in a relatively small number of subgroups thereof, in a convenient manner.

Operation of the various apparatus associated with the first operator position at the switchboard Considering now the operation of the various pieces of apparatus associated with the first operator position 25 at the switchboard 24, it is again pointed out that the operator thereat may selectively utilize the first display board 31 or the second display board 32 associated therewith by selectively controlling the display transfer key K1101. Further the operator at the first operator position 25 may selectively utilize the first ringing circuit 51 or the second ringing circuit 52 by selectively controlling the ring transfer key K900, in an obvious manner. Finally the operator at the first operator position 25 may selectively utilize the first timer 47 or the second timer, not shown, by selectively operating the timer transfer key K930, in an obvious manner.

Considering now in greater detail the operation of the supervisory circuit 42, it is again pointed out that, when a subscriber at a called subscriber substation in the central office 21 initiates the release of an established connection prior to a subscriber at a calling subscriber substation either in the adjacent exchange 22 or in the distant exchange 23, the indicator trunk circuit which is utilized operates to cause ground potential to be applied to the delay disconnect conductor C110, thereby to complete an obvious circuit for energizing the winding of the delay disconnect relay R1120 in the supervisory circuit 42, thereby to cause the latter relay to operate. Subsequently, when the subscriber at the calling subscriber substation in the adjacent exchange 22 or in the distant exchange 23 initiates the complete release of the established connection, the indicator trunk circuit which is utilized operates to remove the application of ground potential to the delay disconnect conductor C110, thereby to interrupt the previously mentioned circuit for energizing the winding of the delay disconnect relay R1120 in the supervisory circuit 42 in order to cause the latter relay to restore. During this time interval mentioned the delay disconnect relay R1120 occupies its operated position in order to cause a timed operation of the supervisory circuit 42. More particularly, upon operating, the delay disconnect relay R1120 completes, at the contacts 1123, the previously mentioned path for applying ground potential to the timer start conductor C109, thereby to insure operation of the selected timer. Also, the delay disconnect relay R1120 prepares, at the contacts 1122, a circuit for energizing the lower winding of the timer relay R1125; the last-mentioned circuit is completed when the timer operates to apply ground potential to the slow interrupted ground conductor C115 and extends therefrom by way of the contacts 1122 and 1128 and the lower winding of R1125 to battery. When thus energized the timer relay R1125 operates partially to complete, at the contacts 1126, a path, including the contacts 1121, 1128 and 1122 and the grounded slow interrupted ground conductor C115, for short-circuiting the upper winding thereof. When ground potential is removed from the slow interrupted ground conductor C115 an obvious circuit including the contacts 1121 and 1126 is completed for energizing in series the upper and lower windings of the timer relay R1125; whereupon the latter relay operates fully to prepare, at the contacts 1127, a circuit for energizing the winding of the timer relay R1130 and to interrupt, at the contacts 1128, the previously traced path for short-circuiting the upper winding thereof. The next time ground potential is applied to the slow interrupted ground conductor C115 a circuit, including the contacts 1122, 1127 and 1133, is completed for energizing the winding of the timer relay R1130, thereby to cause the latter relay to operate shortly thereafter, the timer relay R1130 being of the slow-to-operate type. Upon operating, the timer relay R1130 completes, at the contacts 1132, an obvious holding circuit, including the contacts 1121, for energizing the winding thereof. Further the timer relay R1130 completes, at the contacts 1131, an obvious multiple circuit for energizing the lower winding of the control relay R1135 and for illuminating the delay disconnect lamp L1107. When thus energized the control relay R1135 operates to complete, at the contacts 1136, an obvious circuit for energizing the winding of the control relay R1140, thereby to cause the latter relay to operate. Upon operating, the control relay R1140 completes, at the contacts 1141, an obvious circuit for illuminating the pilot lamp L1106 in the event the night alarm key K1111 occupies its normal position, and for illuminating the pilot lamp L1106 and for energizing the winding of the control relay R1145 in series circuit relation in the event the night alarm key K1111 occupies its operated position. In the event the control relay R1145 is thus energized it operates to complete, at the contacts 1146, an obvious circuit for operating the night alarm A1105.

The illumination of the delay disconnect lamp L1107 indicates to the operator at the first operator position 25 that the subscriber at the calling subscriber substation in the adjacent exchange 22 or in the distant exchange 23 has not disconnected; she then flashes the delay disconnect key K1108, thereby to flash the call lamp associated with the indicator trunk circuit which is utilized in the last-mentioned connection. The operator at the first operator position 25 then withdraws the plug of the indicator trunk circuit which is utilized from the associated jack, rendering the final release of the last-mentioned indicator trunk circuit under the control of the subscriber at the calling subscriber substation in the adjacent exchange 22 or in the distant exchange 23, in the manner previously explained.

When the plug of the indicator trunk circuit mentioned is withdrawn from the associated jack, ground potential therein is removed from the delay disconnect conductor C110, thereby to interrupt the previously traced circuit for energizing the winding of the delay disconnect relay R1120 in order to cause the latter relay to restore. Upon restoring, the delay disconnect relay R1120 interrupts, at the contacts 1121, the previously traced holding circuit for energizing in series the upper and lower windings of the timer relay R1125 and the previously traced holding circuit for energizing the winding of the timer relay R1130, thereby to cause the latter relays to restore. Upon restoring, the timer relay R1130 interrupts, at the contacts 1131, the previously mentioned circuit for illuminating the delay disconnect lamp L1107 and the previously mentioned circuit for energizing the lower winding of the control relay R1135, whereby the latter relay restores in the event the upper winding thereof is not energized at this time. Upon restoring, the control relay R1135 effects the restoration of the control relay R1140, in an obvious manner; and, upon restoring, the control relay R1140 effects the restoration of the control relay R1145, in the event the latter relay occupies its operated position, and extinguishes the pilot lamp L1106. Upon restoring, the control relay R1145 arrests operation of the night alarm A1105.

When the cord relay in any one of the indicator trunk circuits operates incident to the extension of a call to the first operator position 25 or incident to the release of an established connection, ground potential is applied to the night alarm conductor C111, in the manner previously explained. The application of ground potential to the night alarm conductor C111 completes an obvious circuit for energizing the upper winding of the control relay R1135, thereby to cause the latter relay to operate. Upon operating, the control relay R1135 effects operation of the control relay R1140 and the consequent illumination of the pilot lamp L1106, in the manner previously explained. Also, the control relay R1140 may effect operation of the control relay R1145 and the consequent operation of the night alarm A1105 in the event the night alarm key K1111 occupies its operated position, in the manner previously explained.

Subsequently, when the plug of the indicator trunk circuit utilized in the established connection is withdrawn from the associated jack, the application of ground potential to the night alarm conductor C111 is interrupted, in the manner previously explained, whereby the control relay R1135 restores in order to effect the restoration of the control relay R1140. Upon restoring, the control relay R1140 extinguishes the pilot lamp L1106 and effects the restoration of the control relay R1145 in the event the night alarm key K1111 occupies its operated position. Upon restoring, the control relay R1145 arrests operation of the night alarm A1105, in the manner previously explained.

When the release of any one of the registers in the group associated with the first operator position 25 is initiated, ground potential is applied to the release alarm conductor C120. Subsequently, when the register mentioned is completely released, ground potential is removed from the release alarm conductor C120. The application of ground potential to the release alarm conductor C120 completes an obvious circuit for energizing the winding of the release alarm relay R1150, thereby to cause the latter relay to operate. Upon operating, the release alarm relay R1150 completes, at the contacts 1153, an obvious path for applying ground potential to the timer start conductor C109, thereby to insure operation of the selected timer. Also the release alarm relay R1150 prepares, at the contacts 1152, a circuit for energizing the lower winding of the timer relay R1155. When ground potential is next applied to the slow interrupted ground conductor C115 the previously mentioned circuit for energizing the lower winding of the timer relay R1155 is completed, thereby to cause the latter relay to operate partially in order to complete an obvious path for short-circuiting the upper winding thereof. Subsequently, when ground potential is removed from the slow interrupted ground conductor C115 an obvious circuit, including the contacts 1151 and 1156, is completed for energizing the upper and lower windings of the timer relay R1155 in series; whereby the latter relay operates fully in order to prepare, at the contacts 1157, a circuit for energizing the winding of the timer relay R1160. The next time ground potential is applied to the slow interrupted ground conductor C115 the previously mentioned circuit for energizing the winding of the timer relay R1160 is completed, thereby to cause the latter relay to operate shortly thereafter, the timer relay R1160 being of the slow-to-operate type. Upon operating, the timer relay R1160 completes, at the contacts 1161, an obvious holding circuit for energizing the winding thereof; and completes, at the contacts 1163, an obvious circuit for operating the release alarm A1109 and for illuminating the release alarm lamp L1116.

Subsequently, when the release alarm relay R1150 restores it interrupts, at the contacts 1151, the previously mentioned holding circuit for energizing in series the upper and lower windings of the timer relay R1155 and the previously mentioned holding circuit for energizing the winding of the timer relay R1160, thereby to cause the latter relays to restore. Upon restoring, the timer relay R1160 interrupts, at the contacts 1163, the previously mentioned circuit for operating the release alarm A1109 and for illuminating the release alarm lamp L1110.

As previously explained, each time the release relay in any one of the indicator trunk circuits operates while the sleeve relay therein occupies its restored position, ground potential is applied to the timer start conductor C109; and each time the seizure relay in any one of the registers in the associated group operates, ground potential is applied to the timer start conductor C109. The application of ground potential to the timer start conductor C109 completes an obvious circuit, including the contacts 933 of the timer transfer key K930, for energizing the winding of the start relay R1090 in the first timer 47 in the event the timer transfer key K930 occupies its normal position. On the other hand, the application of ground potential to the timer start conductor C109 completes a circuit, including the contacts 934 of the timer transfer key K930 and the conductor C913, for energizing the winding of the start relay in the second timer circuit, not shown, in the event the timer transfer key K930 occupies its operated position.

Considering now more particularly the mode of operation of the first timer 47, when the start relay R1090 operates it completes, at the contacts 1091, an obvious circuit, including the resistor 1093, for energizing the winding of the cycle relay R1060; thereby to cause the latter relay to operate shortly thereafter, the cycle relay R1060 being of the slow-to-operate type. Upon operating, the cycle relay R1060 interrupts, at the contacts 1061, an obvious normally completed path for short-circuiting the winding of the cycle relay R1070, thereby to cause the latter relay to operate shortly thereafter, the cycle relay R1070 being of the slow-to-operate type. Upon operating, the cycle relay R1070 completes, at the contacts 1071, an obvious circuit for energizing the winding of the cycle relay R1080, thereby to cause the latter relay to operate. Upon operating, the cycle relay R1080 completes, at the contacts 1081, an obvious circuit for energizing the winding of the cycle relay R1085, thereby to cause the latter relay to operate. Upon operating, the cycle relay R1085 completes, at the contacts 1086, an obvious path for short-circuiting the winding of the cycle relay R1060, thereby to cause the latter relay to restore. Upon restoring, the cycle relay R1060 completes, at the contacts 1061, the previously mentioned path for short-circuiting the winding of the cycle relay R1070, thereby to cause the latter relay to restore. Upon restoring, the cycle relay R1070 interrupts, at the contacts 1071, the previously mentioned circuit for energizing the winding of the cycle relay R1080, thereby to cause the latter relay to restore shortly thereafter, the cycle relay R1080 being of the slow-to-release type. Upon restoring, the cycle relay R1080 interrupts, at the contacts 1081, the previously mentioned circuit for energizing the winding of the cycle relay R1085, thereby to cause the latter relay to restore shortly thereafter, the cycle relay R1085 being of the slow-to-release type. Upon restoring, the cycle relay R1085 interrupts, at the contacts 1086, the previously mentioned path for short-circuiting the winding of the cycle relay R1060, thereby to cause the latter relay to operate shortly thereafter, the cycle relay R1060 being of the slow-to-operate type, as previously noted. Accordingly, the cycle relays R1060, R1070, R1080 and R1085 operate and restore sequentially, as explained above, as long as the start relay R1090 remains in its operated position.

Each time the cycle relay R1070 operates it completes, at the contacts 1072, an obvious path for applying ground potential to the counting conductor C1074; and completes, at the contacts 1073, an obvious path for applying ground potential to the fast interrupted ground conductor C121. The first time ground potential is applied to the counting conductor C1074 an obvious circuit is completed for energizing in multiple the upper and lower windings of the counting relay R1010; however, the latter relay does not operate at this time as it is of the differential type. When ground potential is subsequently removed from the counting conductor C1074 an inductive kick developed in the upper and lower windings of the counting relay R1010 causes the latter relay to operate and complete, at the contacts 1012, an obvious series holding circuit for energizing the upper and lower windings thereof. Also the counting relay R1010 interrupts, at the contacts 1016, a point in the previously mentioned original circuit for energizing the upper and lower windings thereof in multiple; and prepares, at the contacts 1015, a circuit for energizing in multiple the upper and lower windings of the counting relay R1020. The second time ground potential is applied to the counting conductor C1074 the previously mentioned circuit for energizing in multiple the upper and lower windings of the counting relay R1020 is completed; however, the latter relay does not operate at this time as it is of the differential type. Subsequently, when ground potential is removed from the counting conductor C1074, an inductive kick developed in the upper and lower windings of the counting relay R1020 causes the latter relay to operate and complete, at the contacts 1022, an obvious series holding circuit for energizing the upper and lower windings thereof. Also the counting relay R1020 interrupts, at the contacts 1026, a point in the previously mentioned original circuit for energizing the upper and lower windings thereof in multiple; and prepares, at the contacts 1025, a circuit for energizing in multiple the upper and lower windings of the counting relay R1030. Further the counting relay R1020 interrupts, at the contacts 1024, the previously mentioned holding circuit for energizing in series the upper and lower windings of the counting relay R1010, thereby to cause the latter relay to restore. Accordingly, it will be understood that, as the cycle relays R1060, R1070, R1080 and R1085 are operated through successive cycles, the counting relays R1010, R1020, etc., are operated sequentially. Accordingly, the cycle relays R1060, R1070, R1080 and R1085 are operated through five complete cycles to cause operation of the counting relays R1010 to R1050, inclusive, through one cycle of operation. Each time the cycle relay R1010 operates it completes, at the contacts 1017, an obvious path for applying ground potential to the slow interrupted ground conductor C115. Hence, it will be understood that the first timer 41 is operative to apply ground potential to the fast interrupted ground conductor C121 upon each unit time interval, and to apply ground potential to the slow interrupted ground conductor C115 upon each fifth unit time interval.

*Extension of calls from the operator positions at the switchboard to the operator positions associated therewith*

As previously explained, when the operator at any one of the operator positions at the switchboard 24 receives a mutilated call she extends the call to the interceptor operator position 45 associated with the switchboard 24. For example, when the operator at the first operator position 25 at the switchboard 24 receives a mutilated call on the indicator trunk circuit 26, as indicated by one of the display boards 31 or 32, she seizes the plug P801 and inserts it into one of the jacks terminating a trunk circuit associated with a trunk extending to the interceptor operator position 45, such as the jack J830, terminating the trunk circuit 46 associated with the trunk 833 extending to the interceptor operator position 45. When the plug P801 is thus inserted into the jack J830 an obvious series circuit is completed for energizing the winding of the sleeve relay R840 in the trunk circuit 46 and the sleeve relay R630 in the indicator trunk circuit 26, thereby to cause the relays mentioned to operate. Upon operating, the sleeve relay R840 in the trunk circuit 46 completes, at the contacts 841, an obvious path for applying ground potential by way of the upper winding of the answer relay R850 to one of the line conductors of the trunk 833 extending to the interceptor operator position 45; whereby a signal is operated in order to indicate to the operator at the interceptor operator position 45 that the trunk 833 has been seized at one of the operator positions at the switchboard 24. Also, the sleeve relay R840 completes, at the contacts 842, an obvious path, including the ring-back tone conductor C843 and the contacts 853, for returning ring-back tone current over the jack J830 and the plug P801 to the winding 654 of the repeater 650 in the indicator trunk circuit 26. Also, the impedance 845 is bridged across the tip and ring of the jack J830, thereby to complete the previously traced circuit for energizing the lower winding of the answer relay R710 in the indicator trunk circuit 26, thereby to cause the latter relay to operate. Upon operating, the answer relay R710 effects the restoration of the switch relay R620, whereby the plug P801 is operatively connected to the windings 652 and 654 of the repeater 650, in the manner previously explained. However, the mid tap of the windings of the impedance 845 in the trunk circuit 46 has ground potential connected thereto; whereby the upper winding of the battery supply relay R610 in the indicator trunk circuit 26 is thus short-circuited, thereby to prevent operation of the latter relay and the consequent operation of the reverse battery relay R550. Accordingly, when the call is extended from the indicator trunk circuit 26 to the trunk circuit 46, and subsequently answered at the interceptor operator position 45, the reverse battery relay R550 in the indicator trunk circuit 26 is not operated, whereby battery potential is not reversed over the trunk 310 incoming to the indicator trunk circuit 26. The ring-back tone current traversing the winding 654 of the repeater 650 induces corresponding ring-back tone current in the winding 653 thereof which is returned over the incoming trunk 310 to the indicator trunk circuit 26.

Subsequently, when the operator at the interceptor operator position 45 answers the call an obvious circuit, including the trunk 833, is completed for energizing in series the upper and lower windings of the answer relay R850 in the trunk circuit 46, thereby to cause the latter relay to operate. Upon operating, the answer relay R850 interrupts, at the contacts 853, the previously traced path for returning ring-back tone current from the trunk circuit 46 to the repeater 650 in the indicator trunk circuit 26; and completes, at the contacts 851 and 852, an obvious connection, including the condensers 831 and 832, between the trunk 833 extending to the interceptor operator position 45 and the repeater 650 in the indicator trunk circuit 26. Accordingly, at this time, a communication connection is completed from the calling subscriber substation by way of the indicator trunk circuit 26, the trunk circuit 46 and the trunk 833 to the interceptor operator position 45. The operator at the interceptor operator position 45 then advises the subscriber at the calling subscriber substation that the complete directory number of the called subscriber substation in the central office 21 has not been dialed, and then requires the subscriber at the calling subscriber substation to release the established connection and redial the directory number of the called subscriber substation in the central office 21. When the subscriber at the calling subscriber substation releases the established connection the apparatus in the indicator trunk circuit 26 operates in order to give the operator at the first operator position 25 at the switchboard 24 release supervision; whereby the operator thereat withdraws the plug P801 from the associated jack J830, whereby the apparatus in the indicator trunk circuit 26 is released, in the manner previously explained. Also, when the plug P801 is withdrawn from the associated jack J830 the previously traced circuit for energizing the winding of the sleeve relay R840 is interrupted, thereby to cause the latter relay to restore and interrupt, at the contacts 841, the previously traced circuit for energizing the winding of the answer relay R850 in order to cause the latter relay to restore. At this time the trunk circuit 46 is completely released, assuming that the operator at the interceptor operator position 45 has disconnected from the trunk 833.

As previously explained, when the operator at any one of the operator positions at the switchboard 24 receives a mutilated call she may extend the call to the manual operator position 43 associated with the switchboard 24. For example, when the operator at the first operator position 25 at the switchboard 24 receives a mutilated call on the indicator trunk circuit 26, as indicated by one of the display boards 31 or 32, she may seize the plug P801 and insert it into one of the jacks terminating a trunk circuit associated with a trunk extending to the manual operator position 43, such as the jack J807, terminating the trunk circuit 44 associated with the trunk 808 extending to the manual operator position 43. When the plug P801 is thus inserted into the jack J807 an obvious series circuit is completed for energizing the winding of the sleeve relay R810 in the trunk circuit 44 and the sleeve relay R630 in the indicator trunk circuit 26, thereby to cause the relays mentioned to operate. Upon operating, the sleeve relay R810 in the trunk circuit 44 completes, at the contacts 811 and 812, a circuit, including the contacts 826 and 829 and the ringing conductor C813, for projecting ringing current over the trunk 808 to the manual operator position 43. Also the sleeve relay R810 completes, at the contacts 811, an obvious circuit for energizing the winding of the switch relay R825, thereby to cause the latter relay to operate shortly thereafter, the switch relay R825 being of the slow-to-operate type. Upon operating, the switch relay R825 interrupts, at the contacts 826 and 829, the previously traced circuit for projecting ringing current over the trunk 808 extending to the manual operator position 43; and prepares, at the contacts 827 and 828, a circuit traced hereinafter for energizing in series the upper and lower windings of the battery supply relay R820.

Subsequently, when the operator at the manual operator position 43 answers the call the previously mentioned circuit for energizing in series the upper and lower windings of the battery supply relay R820 is completed, this circuit extending from ground by way of the contacts 811, the upper winding of R820 and the contacts 827 to one of the line conductors of the trunk 808; and from battery by way of the lower winding of R820 and the contacts 828 to the other line conductor of the trunk 808, a bridge connection being completed at the manual operator position 43 between the line conductors of the trunk 808. When thus energized the battery supply relay R820 operates to complete, at the contacts 821 and 822, an obvious circuit for connecting the upper and lower windings of the ring cutoff relay R815 across the tip and the ring of the jack J807; whereby the previously traced circuit for energizing the lower winding of the answer relay R710 in the indicator trunk circuit 26 is completed in order to cause the latter relay to operate and effect the restoration of the switch relay R620 in the indicator trunk circuit 26, whereby the repeater 650 is operatively connected to the plug P801. Further, the ring cutoff relay R815 completes, at the contacts 816 and 817, an obvious operative connection, including the condensers 823 and 824, between the trunk 808 extending to the manual operator position 43 and the jack J807, and consequently between the manual operator position 43 and the repeater 650 in the indicator trunk circuit 26. It is noted that the mid tap of the windings of the ring cutoff relay R815 in the trunk circuit 44 has ground potential connected thereto, whereby the upper winding of the battery supply relay R610 in the indicator trunk circuit 26 is thus short-circuited in series with the upper winding of the ring cutoff relay R815 in the trunk circuit 44, thereby to prevent operation of the battery supply relay R610 and the consequent operation of the reverse battery relay R550. Accordingly, when the call is extended from the indicator trunk circuit 26 to the trunk circuit 44, and subsequently answered at the manual operator position 43, the reverse battery relay R550 in the indicator trunk circuit 26 is not operated; whereby battery potential is not reversed over the trunk 310 incoming to the indicator trunk circuit 26.

Accordingly, at this time, a communication connection is completed from the calling subscriber substation by way of the indicator trunk circuit 26, the trunk circuit 44, and the trunk 808 to the manual operator position 43. The operator at the manual operator position 43 then advises the subscriber at the calling subscriber substation that the complete directory number of the called subscriber substation in the central office 21 has not been dialed, and then requires the subscriber at the calling subscriber substation to release the established connection and redial the directory number of the called subscriber substation in the central office 21. When the subscriber at the calling subscriber substation releases the established connection the apparatus in the indicator trunk circuit 26 operates in order to give the operator at the first operator position 25 at the switchboard 24 release supervision, whereby the operator thereat withdraws the plug P801 from the associated jack J807; whereupon the apparatus in the indicator trunk circuit 26 is released, in the manner previously explained. Also, when the plug P801 is withdrawn from the associated jack J807 the previously traced circuit for energizing the winding of the sleeve relay R810 is interrupted, thereby to cause the latter relay to restore and interrupt, at the contacts 811, the previously traced circuit for energizing the winding of the switch relay R825 and the previously traced circuit for energizing in series the upper and lower windings of the battery supply relay R820, thereby to cause the latter relays to restore. Also, when the plug P801 is withdrawn from the jack J807 the previously traced circuit for energizing the lower winding of the ring cutoff relay R815 is interrupted, thereby to cause the latter relay to restore. At this time the trunk circuit 44 is completely released, assuming that the operator at the manual operator position 43 has disconnected from the trunk 808.

*Testing the registers and the timer associated with an operator position at the switchboard*

The registers in the group associated with any operator position at the switchboard may be successively tested by utilizing a test set in conjunction with any one of the indicator trunk circuits in the associated group. For example, in order to test the various registers in the group associated with the first operator position 25 at the switchboard 24, the test man selects one of the indicator trunk circuits in the associated group, such as the indicator trunk circuit 26, and initiates the testing of the registers in the associated group. More particularly, the test man inserts the plug of the test set into the jacks J571 and J572 of the indicator trunk circuit 26, thereby to complete obvious circuits substantially identical to those previously traced for energizing in series the upper and lower windings of the line relay R540 and for energizing the winding of the test busy relay R560 in order to cause the latter relays to operate. Upon operating, the test busy relay R560 completes, at the contacts 562 and 564, the previously mentioned paths for applying ground potential respectively to the line conductor C311 and to the control conductor C313 of the trunk 310; thereby to mark both of the branches 300X and 300Y of the trunk line 300 as busy, assuming that the traffic transfer circuit 61 occupies its normal position connecting the trunk line 300 to the trunk 310, all in the manner previously explained. Upon operating, the line relay R540 conditions the indicator trunk circuit 26 to receive the digits of the test number and causes the register selector 27 associated with the indicator trunk circuit 26 to select an idle one of the registers in the associated group. The test man then proceeds to dial the first test number 11110, whereby the indicator trunk circuit 26 and the selected register operate, in the manner previously explained, in order to cause the first lamp in each numerical digit panel in the selected display board 31 or 32 to be illuminated in conjunction with the TEST lamp in the ring digit panel thereof. The operator at the first operator position 25 seizes the plug P801 and inserts it into the jack J910 terminating the timer test circuit 48. When the plug P801 is inserted into the jack J910 the selected timer is then tested in conjunction with the indicator trunk circuit 26. More particularly, when the plug P801 is inserted into the jack J910 an obvious circuit is completed for energizing the winding of the slave relay R915, thereby to cause the latter relay to operate and complete, at the contacts 916, an obvious path for applying ground potential to the timer start conductor C941; whereby operation of the first timer 47 is initiated, in the manner previously explained. Also the sleeve relay R620 in the indicator trunk circuit 26 is operated, whereby ringing current is projected over the plug P801 in order to complete an obvious circuit for energizing the winding of the ring-up relay R920 in the timer test circuit 48. When thus energized the ring-up relay R920 operates to complete, at the contacts 921, an obvious circuit for energizing the upper winding of the control relay R925; thereby to cause the latter relay to operate partially in order to complete, at the contacts 928, an obvious path for short-circuiting the lower winding thereof. Subsequently, when the first splash of ringing current subsides the ring-up relay R920 restores to interrupt, at the contacts 921, the previously mentioned path for short-circuiting the lower winding of the control relay R925; whereupon an obvious circuit is completed for energizing in series the upper and lower windings of the latter relay, whereby the control relay R925 operates fully. When the control relay R925 operates fully it interrupts, at the contacts 927, a further point in the previously mentioned path for short-circuiting the lower winding thereof; and completes, at the contacts 926, a test circuit between the jack J910 and the first timer 47. In the first timer 47, the first time the cycle relay R1060 operates it completes, at the contacts 1062, an obvious bridge, including the winding of the ring-up relay R920, across the ring and the tip of the jack J910; thereby to complete the previously traced circuit for energizing the lower winding of the answer relay R710 in the indicator trunk circuit 26 in order to effect restoration of the switch relay R620, whereupon the plug P801 is operatively connected to the repeater 650, in the manner previously explained. Subsequently, when the cycle relay R1060 restores it completes, at the contacts 1063, a circuit, including the busy tone conductor C117 and the condenser 1005, for energizing the winding 654 of the repeater 650 in series with the lower winding of the battery supply relay R610; whereby the busy tone current traversing the winding 654 of the repeater 650 induces a corresponding busy tone in the winding 653 thereof which is transmitted to the test set connected thereto. The next time the cycle relay R1060 operates it interrupts, at the contacts 1063, the above-traced circuit for returning busy tone current over the indicator trunk circuit 26 to the connected test set. Accordingly, the test man may count the number of interruptions in the return of busy tone current to the test set during a given time interval, thereby to determine the rate of operation of the cycle relays in the first timer 47. Of course, it will be understood that the operator at the first operator position 25 at the switchboard 24 may cause the second timer, not shown, to be tested in a similar manner by operating the timer transfer key K930. Also the test man observes at the test set connected to the indicator trunk circuit 26 the transmission quality of the busy tone transmitted by the repeater 650 in the indicator trunk circuit 26.

The test man then withdraws the plug of the test set from the associated test jacks J571 and J572, thereby to cause the apparatus in the indicator trunk circuit 26 to give the operator at the first operator position 25 release supervision; whereupon the operator thereat withdraws the plug P801 from the associated jack J910 in order completely to release the indicator trunk circuit 26, in the manner previously explained. Also when the plug P801 is withdrawn from the jack J910 the previously traced circuit for energizing the winding of the sleeve relay R915 in the timer test circuit 48 is interrupted, thereby to cause the latter relay to restore. Upon restoring, the sleeve relay R915 interrupts, at the contacts 917, the previously traced circuit for energizing in series the upper and lower windings of the control relay R925, thereby to cause the latter relay to restore. Further, the sleeve relay R915 interrupts, at the contacts 916, the previously mentioned path for applying ground potential to the timer start conductor C941, thereby to arrest operation of the first timer 47.

The test man again inserts the plug of the test set into the test jacks J571 and J572 in the indicator trunk circuit 26 in order again to seize this indicator trunk circuit and to cause the associated register selector 27 to select the next idle register in the associated group. The test man then dials the test number 22220, whereby the indicator trunk circuit 26 and the selected register in the associated group operate in order to cause the selected display board 31 or 32 to display the test number dialed; the second lamp in each of the numerical digit panels of the selected display board being illuminated in conjunction with the Test lamp in the ring digit panel thereof, in the manner previously explained. At this time the test man may withdraw the plug from the test jacks J571 and J572 in the indicator trunk circuit 26 as the first timer 47 and the indicator trunk circuit 26 have been previously tested.

The test man continues the routine of the various registers in the group associated with the register selector 27, as well as the selected display board 31 or 32 by making successive tests utilizing the successive test numbers 11110 to 00000 successively. By making these ten tests the operation of each of the registers in the group associated with the register selector 27 may be tested, as well as the numerical panels of the selected display board 31 or 32. In order to test the ring digit panel of the selected display board 31 or 32, the test man may then make additional tests utilizing different test numbers, such as 11111 to 11110, inclusive, in an obvious manner.

Conclusions

From the foregoing it is apparent that a telephone system is provided which comprises a central office, including a switchboard which is provided with improved call announcer equipment for controlling the extension and supervision of connections from automatic subscriber substations to manual subscriber substations, in an improved and simplified manner.

While one embodiment of the invention has been disclosed, it will be understood that various modifications may be made therein which are within the true spirit and scope of the invention.

What is claimed is:

1. In a telephone system, a plurality of register sets accessible to calling automatic stations for registering calls, an announcer for announcing the call registered in any one of said register sets allotted thereto, an allotter operative through a given cycle to allot successively the ones of said register sets which were prepared during a prior cycle of operation thereof to said announcer as it becomes idle intermittently, means for preparing the other of said register sets in which calls are registered during said given cycle of operation of said allotter to be allotted during a subsequent cycle of operation thereof to said announcer, and means controlled by the presence of a prepared register set to be allotted to said announcer for operating said allotter.

2. In a telephone system, a plurality of register sets accessible to calling automatic stations for registering calls, an announcer for announcing the call registered in any one of said register sets allotted thereto, an allotter operative through a given cycle to allot successively the ones of said register sets which were prepared during a prior cycle of operation thereof to said announcer as it becomes idle intermittently, means for preparing the other of said register sets in which calls are registered during said given cycle of operation of said allotter to be allotted during a subsequent cycle of operation thereof to said announcer, means controlled by the presence of a prepared register set to be allotted to said announcer for initiating operation of said allotter, and means controlled when each prepared register set has been allotted to said announcer for arresting operation of said allotter.

3. In a telephone system, a plurality of register sets accessible to calling automatic stations for registering calls, an announcer for announcing the call registered in any one of said register sets allotted thereto, an allotter operative through a given cycle to allot successively the ones of said register sets accumulated into a batch during a prior cycle of operation thereof to said announcer as it becomes idle intermittently, means for accumulating into a batch the other of said register sets in which calls are registered during said given cycle of operation of said allotter to be allotted during a subsequent cycle of operation thereof to said announcer, and means controlled by the presence of an accumulated batch of said register sets to be allotted to said announcer for operating said allotter.

4. In a telephone system, a plurality of register sets accessible to calling automatic stations for registering calls, an announcer for announcing the call registered in any one of said register sets allotted thereto, an allotter operative through a given cycle to allot successively in a predetermined order the ones of said register sets which where previously prepared to said announcer as it becomes idle intermittently and to prevent further preparation of other of said register sets, means controlled upon the conclusion of said given cycle of operation of said allotter for preparing each conditioned one of said register sets, means controlled by the presence of a prepared register set to be allotted to said announcer for initiating a cycle of operation of said allotter, and means controlled in response to the registration of a call in any one of said register sets for conditioning said one register set.

5. In a telephone system, a plurality of register sets accessible to calling automatic stations for registering calls, an announcer for announcing the call registered in any one of said register sets allotted thereto, a control conductor having a potential normally impressed thereon, an allotter operative through a given cycle to allot successively in a predetermined order the ones of said register sets which were previously prepared to said announcer as it becomes idle intermittently and to remove said potential from said control conductor, means controlled upon the conclusion of said given cycle of operation of said allotter for replacing said potential upon said control conductor, means controlled by the presence of a prepared register set to be allotted to said announcer for initiating a cycle of operation of said allotter, and means controlled jointly in response to the presence of said potential upon said control conductor and to the registration of a call in any one of said register sets for preparing said one register set.

6. In a telephone system, a plurality of register sets accessible to calling automatic stations for registering calls, each of said register sets including a lockout relay, an announcer for announcing the call registered in any one of said register sets allotted thereto, an allotter operative through a given cycle to operate successively in a predetermined order the ones of said lockout relays which were previously prepared as said announcer becomes idle intermittently and to prevent further preparation of other of said lockout relays, means responsive to the operation of the lockout relay in any one of said register sets for preventing operation of the lockout relays in the other of said register sets and for allotting said one register set to said announcer, means controlled upon the conclusion of said given cycle of operation of said allotter for preparing each conditioned one of said lockout relays, means controlled by the presence of a prepared lockout relay for initiating a cycle of operation of said allotter, and means controlled in response to the registration of a call in any one of said register sets for conditioning the lockout relay therein.

7. In a telephone system, a plurality of register sets accessible to calling automatic stations for registering calls, each of said register sets including a lockout relay, an announcer for announcing the call registered in any one of said register sets allotted thereto, a control conductor having a potential normally impressed thereon, an allotter operative through a given cycle to operate successively in a predetermined order the ones of said lockout relays which were previously prepared as said announcer becomes idle intermittently and to remove said potential from said control conductor, means responsive to the operation of the lockout relay in any one of said register sets for preventing operation of the lockout relays in the other of said register sets and for allotting said one register set to said announcer, means controlled upon the conclusion of said given cycle of operation of said allotter for replacing said potential upon said control conductor, means controlled by the presence of a prepared lockout relay for initiating a cycle of operation of said allotter, and means controlled jointly in response to the presence of said potential upon said control conductor and to the registration of a call in any one of said register sets for preparing the lockout relay therein.

8. In a telephone system, a plurality of register sets accessible to calling automatic stations for registering calls, each of said register sets including a call relay and an announcer relay and a lockout relay, an announcer for announcing the call registered in any one of said register sets allotted thereto, an allotter operative through a given cycle to operate successively in a predetermined order the lockout relays in the ones of said register sets including operated announcer relays as said announcer becomes idle intermittently and to prevent further operation of the announcer relays in said register sets, means responsive to the operation of the lockout relay in any one of said register sets for preventing operation of the lockout relays in the other of said register sets and for allotting said one register set to said announcer, means controlled upon the conclusion of said given cycle of operation of said allotter for operating the announcer relays in the ones of said register sets including operated call relays, means controlled by the presence of an operated announcer relay for initiating a cycle of operation of said allotter, and means controlled in response to the registration of a call in any one of said register sets for operating the call relay therein.

9. In a telephone system, a plurality of register sets accessible to calling automatic stations for registering called telephone numbers, an announcer for announcing the number registered in any one of said register sets allotted thereto, an allotter operative through a given cycle to allot successively the ones of said register sets which were prepared during a prior cycle of operation thereof to said announcer as it becomes idle intermittently, means for preparing the other of said register sets in which numbers are registered during said given cycle of operation of said allotter to be allotted during a subsequent cycle of operation thereof to said announcer, and means controlled by the presence of a prepared register set to be allotted to said announcer for operating said allotter.

10. In a telephone system, a plurality of register sets accessible to calling automatic stations for registering called telephone numbers, an announcer for announcing the number registered in any one of said register sets allotted thereto, an allotter operative through a given cycle to allot successively the ones of said register sets which were prepared during a prior cycle of operation thereof to said announcer as it becomes idle intermittently, means for preparing the other of said register sets in which numbers are completely registered during said given cycle of operation of said allotter to be allotted during a subsequent cycle of operation thereof to said announcer, additional means for preparing any one of said register sets in which the number is not fully registered within a fixed time interval during said given cycle of operation of said allotter to be allotted during a subsequent cycle of operation thereof to said announcer, and means controlled by the presence of a prepared register set to be allotted to said announcer for operating said allotter.

11. In a telephone system, a register set accessible to calling automatic stations and operative to register a called telephone number, an announcer operative to announce the number registered in said register set when said register set is associated therewith, means responsive to the registration of a complete number in said register set for associating said register set with said announcer, and means governed in the event no number is registered in said register set within a predetermined time interval after seizure thereof for operating said announcer to announce a fixed arbitrary character.

12. In a telephone system, a register set accessible to calling automatic stations and operative to register a called telephone number, an announcer operative to announce the number registered in said register set when said register set is associated therewith, a timer, means responsive to the seizure of said register set for initiating a timing operation of said timer, means responsive to the registration of the first digit of a number in said register set for arresting the timing operation of said timer, means responsive to the registration of a complete number in said register set for associating said register set with said announcer, and means responsive to completion of a given timing operation of said timer for operating said announcer to announce a fixed arbitrary character.

13. In a telephone system, a register set accessible to calling automatic stations and operative to register a called telephone number, an announcer operative to announce the number registered in said register set when said register set is associated therewith, means responsive to the registration of a complete number in said register set for associating said register set with said announcer, additional means responsive to the registration of an incomplete number in said register set within a given time interval after seizure thereof for associating said register set with said announcer, and means governed in the event no number is registered in said register set within a predetermined time interval after seizure thereof for operating said announcer to announce a fixed arbitrary character.

14. In a telephone system, a register set accessible to calling automatic stations and operative to register a called telephone number, an announcer operative to announce the number registered in said register set when said register set is associated therewith, means responsive to the registration of a complete number in said register set for associating said register set with said announcer, timing means operative to measure the time interval between the successive digits of a number as they are registered in said register set, additional means governed by said timing means in the event an excessive time interval is measured thereby for associating said register set with said announcer, and means governed by said timing means in the event no digit is registered in said register set within a predetermined time interval after seizure thereof for operating said announcer to announce a fixed arbitrary character.

15. In a telephone system, a register set accessible to calling automatic stations and operative to register a called telephone number comprising as many as N+1 digits, an announcer operative to announce the number registered in said register set when said register set is associated therewith, means responsive to the registration of a number comprising N+1 digits in said register set for associating said register set with said announcer immediately, means responsive to the registration of a number comprising N digits in said register set for associating said register set with said announcer a first time interval thereafter, and means responsive to the registration of a number comprising less than N digits in said register set for associating said register set with said announcer a second time interval thereafter.

16. In a telephone system, a register set accessible to calling automatic stations and operative to register a called telephone number comprising N digits and a ring digit, an announcer operative to announce the number registered in said register set when said register set is associated therewith, means responsive to the registration of a called number comprising N digits and a ring digit in said register set for associating said register set with said announcer immediately, means responsive to the registration of a number comprising N digits in said register set for associating said register set with said announcer a first time interval thereafter, and means responsive to the registration of a number comprising less than N digits in said register set for associating said register set with said announcer a second time interval thereafter.

17. In a telephone system, a register set accessible to calling automatic stations and operative to register a called telephone number comprising as many as N+1 digits, an announcer operative to announce the number registered in said register set when said register set is associated therewith, a timer, means for operating said timer to measure the time interval between the successive digits of a number as they are registered in said register set, means responsive to the registration of a number comprising N+1 digits in said register set for immediately associating said register set with said announcer, means governed jointly in response to the registration of a number comprising N digits in said register set and to the measurement of a relatively short time interval by said timer for associating said register set with said announcer, and means governed jointly in response to the registration of a number comprising less than N digits in said register set and to the measurement of a relatively long time interval by said timer for associating said register set with said announcer.

18. In a telephone system, a register set accessible to calling automatic stations and operative to register a called telephone number comprising as many as N+1 digits, an announcer operative to announce the number registered in said register set when said register set is associated therewith, a timer, means responsive to the seizure of said register set for initiating operation of said timer, means responsive to the receipt of each digit by said register set for releasing said timer and then for initiating reoperation thereof, means responsive to the registration of a number comprising N+1 digits in said register set for immediately associating said register set with said announcer, means governed jointly in response to the registration of a number comprising N digits in said register set and to a relatively short timed operation of said timer for associating said register set with said announcer, means governed jointly in response to the registration of a number comprising less than N digits in said register set and to a relatively long timed operation of said timer for associating said register set with said announcer, and means governed in response to a fixed timed operation of said timer in the event no digit is registered in said register set for operating said announcer to announce a fixed arbitrary character.

19. In a telephone system, a register set accessible to calling automatic stations and operative to register a called telephone number, an announcer operative to announce the number registered in said register set when said register set is associated therewith, means responsive to the registration of an assigned called number in said register set for associating said register set with said announcer, and means responsive to the registration of an unassigned called number in said register set for operating said announcer to announce a fixed arbitrary character.

20. In a telephone system, a register set accessible to calling automatic stations and operative to register a called telephone number comprising N digits and a ring digit, an announcer operative to announce the number registered in said register set when said register set is associated therewith, means responsive to the registration of a called number comprising N digits and an assigned ring digit in said register set for associating said register set with said announcer, and means responsive to the registration of a called number comprising N digits and an unassigned ring digit in said register set for operating said announcer to announce a fixed arbitrary character.

21. In a telephone system, a register set accessible to calling automatic stations and adapted to register the line identity digits and the ring digit of a called telephone number, an announcer, means responsive to the registration of a called number comprising the line identity digits and an assigned ring digit in said register set for operating said announcer to announce the line identity digits and the ring digit of the called number as registered, and means responsive to the registration of a called number comprising the line identity digits and an unassigned ring digit in said register set for operating said announcer to announce the line identity digits of the called number as registered in combination wih a fixed arbitrary character instead of the ring digit of the called number as registered.

22. In a telephone system, a plurality of trunk circuits accessible to calling automatic stations, a plurality of register sets adapted to register called telephone numbers, means responsive to the seizure of one of said trunk circuits for taking into use an idle one of said register sets, an operator position, an announcer associated with said operator position and operative to announce the called number registered in any one of said register sets associated therewith, a plurality of signals associated with said operator position and individually corresponding to said trunk circuits, means for preparing the ones of said register sets in which called numbers are registered, means for associating prepared ones of said register sets with said announcer in a predetermined order, means controlled when any prepared one of said register sets is associated with said announcer for operating the one of said signals corresponding to the trunk circuit which has taken into use said one register set, means controllable from said operator position for extending the call on any one of said trunk circuits in accordance with the called number announced by said announcer, means responsive to the extension of a call on any one of said trunk circuits for releasing the one of said register sets taken into use thereby, whereby said one register set is disassociated from said announcer, and means governed in the event the call on any one of said trunk circuits is not extended within a predetermined time interval after the one of said register sets taken into use thereby is prepared for operating an excess holding time signal.

23. In a telephone system, a trunk circuit accessible to calling automatic stations, register equipment associated with said trunk circuit and adapted to register both the line identity digits and the ring digit of a called telephone number, a plurality of lines, an operator position comprising apparatus controllable to extend a connection from said trunk circuit to any called one of said lines, a plurality of ring signals, means selectively controlled by the line identity digits registered in said register equipment for indicating to the operator at said operator position the called one of said lines, and means selectively controlled by the ring digit registered in said register equipment for selecting one of said ring signals to be projected over said called line.

24. In a telephone system, a trunk circuit accessible to calling automatic stations, register equipment associated with said trunk circuit and adapted to register both the line identity digits and the ring digit of a called telephone number, a plurality of lines, an operator position comprising apparatus controllable to extend a connection from said trunk circuit to any called one of said lines, a plurality of ring signals, means selectively controlled by the line identity digits registered in said register equipment for indicating to the operator at said operator position the called one of said lines, means selectively controlled by the ring digit registered in said register equipment for selecting one of said ring signals to be projected over said called line, and automatic means responsive to the extension of a connection from said trunk circuit to said called line for projecting the selected ring signal over said called line.

25. In a telephone system, a trunk circuit accessible to calling automatic stations, register equipment associated with said trunk circuit and adapted to register both the line identity digits and the ring digit of a called telephone number, a plurality of lines arranged for divided ringing, an operator position comprising apparatus controllable to extend a connection from said trunk circuit to any called one of said lines, a ring signal, means selectively controlled by the line identity digits registered in said register equipment for indicating to the operator at said operator position the called one of said lines, and means selectively controlled by the ring digit registered in said register equipment for selecting one of the sides of said called line over which said ring signal is to be projected.

26. In a telephone system, a trunk circuit accessible to calling automatic stations, register equipment associated with said trunk circuit and adapted to register both the line identity digits and the ring digit of a called telephone number, a plurality of lines arranged for divided ringing, an operator position comprising apparatus controllable to extend a connection from said trunk circuit to any called one of said lines, a ring signal, means selectively controlled by the line identity digits registered in said register equipment for indicating to the operator at said operator position the called one of said lines, means selectively controlled by the ring digit registered in said register equipment for selecting one of the sides of said called line over which said ring signal is to be projected, and automatic means responsive to the extension of a connection from said trunk circuit to said called line for projecting said ring signal over the selected side of said called line.

27. In a telephone system, a trunk circuit accessible to calling automatic stations, register equipment associated with said trunk circuit and adapted to register both the line identity digits and the signal digit of a called telephone number, a plurality of lines of the party type, an operator position comprising apparatus controllable to extend a connection from said trunk circuit to any called one of said lines, means selectively controlled by the line identity digits registered in said register equipment for indicating to the operator at said operator position the called one of said lines, and means selectively controlled by the signal digit registered in said register equipment for selecting one of the stations on said called line to be signaled.

28. In a telephone system, a trunk circuit accessible to calling automatic stations, register equipment associated with said trunk circuit and adapted to register both the line identity digits and the signal digit of a called telephone number, a plurality of lines of the party type, an operator position comprising apparatus controllable to extend a connection from said trunk circuit to any called one of said lines, means selectively controlled by the line identity digits registered in said register equipment for indicating to the operator at said operator position the called one of said lines, means selectively controlled by the signal digit registered in said register equipment for selecting one of the stations on said called line to be signaled, and automatic means responsive to the extension of a connection from said trunk circuit to said called line for signaling the selected station on said called line.

29. In a telephone system, a trunk circuit accessible to calling automatic stations, register equipment associated with said trunk circuit and adapted to register both the line identity digits and the signal digit of a called telephone number, a plurality of lines of the party type, an operator position comprising apparatus controllable to extend a connection from said trunk circuit to any called one of said lines, means selectively controlled by the line identity digits and the signal digit registered in said register equipment for indicating to the operator at said operator position both the called one of said lines and the one of the stations thereon which is to be signaled, and additional means selectively controlled by the signal digit registered in said register equipment for selecting said one station on said called line to be signaled.

30. In a telephone system, a trunk circuit accessible to calling automatic stations, register equipment associated with said trunk circuit and adapted to register both the line identity digits and the ring digit of a called telephone number, a plurality of lines arranged for divided ringing, an operator position comprising apparatus controllable to extend a connection from said trunk circuit to any called one of said lines, a plurality of ring conductors, means selectively controlled by the line identity digits registered in said register equipment for indicating to the operator at said operator position the called one of said lines, and means selectively controlled by the ring digit registered in said register equipment for selecting both one of said ring conductors and one of the sides of said called line to which said selected ring conductor is to be connected.

31. In a telephone system, a trunk circuit accessible to calling automatic stations, register equipment associated with said trunk circuit and adapted to register both the line identity digits and the ring digit of a called telephone number, a plurality of lines arranged for divided ringing, an operator position comprising apparatus controllable to extend a connection from said trunk circuit to any called one of said lines, a plurality of ring conductors, means selectively controlled by the line identity digits registered in said register equipment for indicating to the operator at said operator position the called one of said lines, means selectively controlled by the ring digit registered in said register equipment for selecting both one of said ring conductors and one of the sides of said called line to which said selected ring conductor is to be connected, and automatic means responsive to the extension of a connection from said trunk circuit to said called line for connecting the selected ring conductor to the selected side of said called line.

32. In a telephone system, a trunk circuit accessible to calling automatic stations, a register set, means responsive to the seizure of said trunk circuit for connecting said register set thereto, said register set being adapted to register the line identity digits of a called telephone number, said trunk circuit comprising register means adapted to register the signal digit of a called telephone number, a plurality of lines, an operator position comprising apparatus controllable to extend a connection from said trunk circuit to any called one of said lines, an announcer associated with said operator position, means controlled by the line identity digits registered in said register set for selectively operating said announcer to announce the called one of said lines, signal circuits having a plurality of different settings for selectively signaling over a called line to which a connection is extended from said trunk circuit, and means controlled by the signal digit registered in said trunk circuit for selectively setting said signal circuits.

33. In a telephone system, a trunk circuit accessible to calling automatic stations, a register set, means responsive to the seizure of said trunk circuit for connecting said register set thereto, said register set being adapted to register both the line identity digits and the signal digit of a called telephone number, said trunk circuit comprising register means adapted to register the signal digit of a called telephone number, a plurality of lines, an operator position comprising apparatus controllable to extend a connection from said trunk circuit to any called one of said lines, an announcer associated with said operator position, means controlled by the line identity digits and the signal digit registered in said register set for selectively operating said announcer to announce both the called one of said lines and the signaling to be performed thereover, signal circuits having a plurality of different settings for selectively signaling over a called line to which a connection is extended from said trunk circuit, and means controlled by the signal digit registered in said trunk circuit for selectively setting said signal circuits.

34. In a telephone system, a trunk circuit accessible to calling automatic stations, a register set, means responsive to the seizure of said trunk circuit for connecting said register set thereto, said register set being adapted to register the line identity digits of a called telephone number, said trunk circuit comprising register means adapted to register the signal digit of a called telephone number, an operator position, a plurality of lines terminating in jacks at said operator position, said trunk circuit terminating in a plug at said operator position having access to said jacks, an announcer associated with said operator position, means controlled by the line identity digits registered in said register set for selectively operating said announcer to announce the called one of said lines, signal circuits having a plurality of different settings adapted selectively to signal over a called line terminated by a jack into which said plug is inserted, means controlled by the signal digit registered in said trunk circuit for selectively setting said signal circuits, and means responsive to the insertion of said plug into the jack terminating said called line for causing said signal circuits to signal over said called line in accordance with the selected setting thereof.

35. In a telephone system, a trunk circuit accessible to calling automatic stations, a register set, means responsive to the seizure of said trunk circuit for connecting said register set thereto, said register set being adapted to register both the line identity digits and the signal digit of a called telephone number, said trunk circuit comprising register means adapted to register the signal digit of a called telephone number, means included in said trunk circuit for repeating the line identity digits and the signal digit of a called number received thereby to said register set to be registered therein, means included in said register set for repeating the signal digit of a called number received thereby back to said trunk circuit to be registered therein, a plurality of lines, an operator position comprising apparatus controllable to extend a connection from said trunk circuit to any called one of said lines, an announcer associated with said operator position, means controlled by the line identity digits and the signal digit registered in said register set for selectively operating said announcer to announce both the called one of said lines and the signaling to be performed thereover, signal circuits having a plurality of different settings for selectively signaling over a called line to which a connection is extended from said trunk circuit, and means controlled by the signal digit registered in said trunk circuit for selectively setting said signal circuits.

36. In a telephone system, a calling automatic station, automatic switching apparatus associated with said station, an operator position, a cord circuit associated with said operator position, said cord circuit being accessible to said switching apparatus and adapted to receive a called telephone number transmitted from said station over said switching apparatus, means included in said cord circuit for absorbing at least one of the digits of the called number received thereby, a register set, additional means included in said cord circuit for repeating the remainder of the digits of the called number received thereby to said register set to be registered therein, a plurality of lines, said operator position comprising apparatus controllable to extend a connection from said cord circuit to any called one of said lines, an announcer associated with said operator position, and means controlled by the digits of the called number registered in said register set for selectively operating said announcer to announce the called one of said lines.

37. In a telephone system, a calling automatic station, automatic switching apparatus associated with said station, an operator position, a cord circuit associated with said operator position, said cord circuit being accessible to said switching apparatus and adapted to receive a called telephone number transmitted from said station over said switching apparatus, a register set, means included in said cord circuit for absorbing the first digit of the called number received thereby and for repeating the remainder of the digits of the called number received thereby to said register set to be registered therein, a plurality of lines, said operator position comprising apparatus controllable to extend a connection from said cord circuit to any called one of said lines, an announcer associated with said operator position, and means controlled by the digits of the called number registered in said register set for selectively operating said announcer to announce the called one of said lines.

38. In a telephone system, a calling automatic station, automatic switching apparatus associated with said station, an operator position, a cord circuit associated with said operator position, a trunk extending to said cord circuit and comprising two line conductors and a control conductor, said trunk being selectable by said switching apparatus, means controlled when said cord circuit is busy for marking said trunk against selection both by way of one of the line conductors and the control conductor thereof, whereby the selection of said cord circuit may be controlled over either a two-wire circuit excluding the control conductor of said trunk or a three-wire circuit including the control conductor of said trunk, a register set, said cord circuit being adapted to receive a called telephone number transmitted from said station over said switching apparatus and said trunk and to repeat the called number received thereby to said register set to be registered therein, a plurality of lines, said operator position comprising apparatus controllable to extend a connection from said circuit to any called one of said lines, an announcer associated with said operator position, and means controlled by the called number registered in said register set for selectively operating said announcer to announce the called one of said lines.

39. In a telephone system, first and second exchanges, a central office, a trunk line having first and second and third branches respectively terminating at said first exchange and said second exchange and said central office, first automatic switching apparatus in said first exchange having access to said first branch, second automatic switching apparatus in said second exchange having access to said second branch, a cord circuit in said central office connected to said third branch, means responsive to the seizure of said first branch for marking busy said second branch and for conditioning said cord circuit to receive a called telephone number transmitted over said first switching apparatus and said first and third branches, means responsive to the seizure of said second branch for marking busy said first branch and for conditioning said cord circuit to receive a called telephone number transmited over said second switching apparatus and said second and third branches, a plurality of lines terminating at said central office, an operator position in said central office comprising apparatus selectively controllable to extend a connection from said cord circuit to any called one of said lines, and means controlled by the called number received by said cord circuit for indicating to the operator at said operator position the called one of said lines.

40. In a telephone system, first and second exchanges, a central office, a trunk line having first and second and third branches respectively terminating at said first exchange and said second exchange and said central office, said first and second and third branches including two common line conductors, said second and third branches including a common control conductor, first automatic switching apparatus in said first exchange having access to said first branch, second automatic switching apparatus in said second exchange having access to said second branch, a cord circuit in said central office connected to said third branch, means responsive to the seizure of said first branch for marking busy said second branch by way of said control conductor and for conditioning said cord circuit to receive a called telephone number transmitted over said first switching apparatus and said first and third branches, means responsive to the seizure of said second branch for marking busy said first branch by way of one of said line conductors and for conditioning said cord circuit to receive a called telephone number transmitted over said second switching apparatus and said second and third branches, a plurality of lines terminating at said central office, an operator position in said central office comprising apparatus selectively controllable to extend a connection from said cord circuit to any called one of said lines, and means controlled by the called number received by said cord circuit for indicating to the operator at said operator position the called one of said lines.

41. In a telephone system, an automatic exchange, a central office, two groups of trunk lines extending between said exchange and said office and accessible to automatic switching apparatus in said exchange, a switchboard in said office including two operator positions, two groups of cord circuits respectively associated with said operator positions, transfer means in said office normally connecting said two groups of trunk lines respectively to said two groups of cord circuits and selectively operative to cross-connect different subgroups of each of said groups of trunk lines to corresponding subgroups of each of said groups of cord circuits, whereby any given subgroup of any given group of said trunk lines is normally connected to a given subgroup of a given group of said cord circuits and may be transferred and connected to a corresponding subgroup of the other group of said cord circuits, a plurality of lines terminating in said office, two announcers in said office and respectively associated with said operator positions, and means for selectively operating each of said announcers to announce a called one of said lines in accordance with a called telephone number received by a cord circuit in the associated group and transmitted from said exchange over said switching apparatus and the connected one of said trunk lines.

42. In a telephone system, an operator position, a group of cord circuits associated with said operator position, automatic switching apparatus controllable from calling automatic stations and having access to said cord circuits, a plurality of register sets, means responsive to the seizure of any one of said circuits for connecting an idle one of said register sets thereto, each of said register sets being adapted to register a called telephone number received over the connected cord circuit and said switching apparatus from a calling automatic station, a plurality of lines, said operator position comprising apparatus controllable to extend a connection from any calling one of said cord circuits to any called one of said lines, an announcer associated with said operator position, means for associating prepared ones of said register sets with said announcer in a predetermined order, means for preparing each of said register sets when a called number is registered therein, means controlled when any one of said register sets is associated with said announcer for indicating the connected one of said cord circuits and for operating said announcer to announce the called one of said lines, means governed when all of said register sets are busy for rendering busy all of the cord circuits in said group, and manually operable means for selectively rendering busy the various subgroups of said group of cord circuits.

43. In a telephone system, a trunk circuit accessible to calling automatic stations and adapted to receive a called telephone number transmitted thereto, a plurality of register sets associated with said trunk circuit, means responsive to the seizure of said trunk circuit for connecting an idle one of said register sets thereto, register means included in said trunk circuit for registering the first digit of the called number received thereby, transmitter means included in said trunk circuit for transmitting the digit registered in said register means to said one register set to be registered therein, repeater means included in said trunk circuit for repeating the remainder of the digits of the called number received thereby concurrently to said one register set to be registered therein, a plurality of lines, an operator position comprising apparatus controllable to extend a connection from said trunk circuit to any called one of said lines, and means selectively controlled in accordance with the called number registered in said one register set for indicating to the operator at said operator position the called one of said lines.

44. In a telephone system, a trunk circuit accessible to calling automatic stations and adapted to receive a called telephone number transmitted thereto, a plurality of register sets associated with said trunk circuit, means responsive to the seizure of said trunk circuit for connecting an idle one of said register sets thereto, register means included in said trunk circuit and adapted to register the first digit of the called number received thereby, transmitter means included in said trunk circuit and operative to transmit the digit registered in said register means to said one register set to be registered therein, means controlled upon the conclusion of the first digit received by said trunk circuit for operating said transmitter means, repeater means included in said trunk circuit for repeating the remainder of the digits of the called number received thereby concurrently to said one register set to be registered therein, a plurality of lines, an operator position comprising apparatus controllable to extend a connection from said trunk circuit to any called one of said lines, and means selectively controlled in accordance with the called number registered in said one register set for indicating to the operator at said operator position the called one of said lines.

45. In a telephone system, a trunk circuit accessible to calling automatic stations and adapted to receive a called telephone number transmitted thereto, a plurality of register sets associated with said trunk circuit, means responsive to the seizure of said trunk circuit for connecting an idle one of said register sets thereto, register means included in said trunk circuit for registering the first digit of the called number received thereby, transmitter means included in said trunk circuit for transmitting the digit registered in said register means over a first path to said one register set to be registered therein, repeater means included in said trunk circuit for repeating the remainder of the digits of the called number received thereby concurrently over a second path to said one register set to be registered therein, a plurality of lines, an operator position comprising apparatus controllable to extend a connection from said trunk circuit to any called one of said lines, and means selectively controlled in accordance with the called number registered in said one register set for indicating to the operator at said operator position the called one of said lines.

46. In a telephone system, a trunk circuit accessible to calling automatic stations and adapted to receive a called telephone number transmitted thereto, a plurality of register sets associated with said trunk circuit, means responsive to the seizure of said trunk circuit for connecting an idle one of said register sets thereto, said trunk circuit comprising means for transmitting the first digit of the called number subsequent to the receipt thereof and for repeating the remainder of the digits of the called number concurrently with the receipt thereof, means for registering the digit transmitted and the digits repeated from said trunk circuit in said one register set, a plurality of lines, an operator position comprising apparatus controllable to extend a connection from said trunk circuit to any called one of said lines, and means selectively controlled in accordance with the called number registered in said one register set for indicating to the operator at said operator position the called one of said lines.

47. In a telephone system, a trunk circuit accessible to calling automatic stations and adapted to receive a called telephone number transmitted thereto, a plurality of register sets, a finder switch associated with said trunk circuit and having access to said register sets, means responsive to the seizure of said trunk circuit for operating said finder switch to seize an idle one of said register sets, said trunk circuit comprising means for transmitting the first digit of the called number subsequent to the receipt thereof and for repeating the remainder of the digits of the called number concurrently with the receipt thereof, means for registering the digit transmitted and the digits repeated from said trunk circuit in said one register set, a plurality of lines, an operator position comprising apparatus controllable to extend a connection from said trunk circuit to any called one of said lines, and means selectively controlled in accordance with the called number registered in said one register set for indicating to the operator at said operator position the called one of said lines.

48. In a telephone system, a trunk circuit accessible to calling automatic stations and adapted to receive both the line identity digits and the signal digit of a called telephone number transmitted therefrom, said trunk circuit including a register device, a plurality of register sets associated with said trunk circuit, means responsive to the seizure of said trunk circuit for connecting an idle one of said register sets thereto, means for registering the first line identity digit of the called number received by said trunk circuit in said register device, means for transmitting the line identity digit registered in said register device to said one register set to be registered therein, means for repeating the remander of the line identity digits of the called number received by said trunk circuit concurrently to said one register set to be registered therein, means for registering the signal digit of the called number received by said trunk circuit in said register device, a plurality of lines, an operator position comprising apparatus controllable to extend a connection from said trunk circuit to any called one of said lines, means selectively controlled in accordance with the line identity digits of the called number registered in said one register set for indicating to the operator at said operator position the called one of said lines, signal circuits having a plurality of different settings for selectively signaling over a called line to which a connection is extended from said trunk circuit, and means selectively controlled in accordance with the signal digit of the called number registered in said register device for setting said signal circuits.

49. In a telephone system, a trunk circuit accessible to calling automatic stations and adapted to receive both the line identity digits and the signal digit of a called telephone number transmitted therefrom, said trunk circuit including a register switch, a plurality of register sets associated with said trunk circuit, means responsive to the seizure of said trunk circuit for connecting an idle one of said register sets thereto, means for operating said register switch to register the first line identity digit of the called number received by said trunk circuit, means for transmitting the line identity digit registered in said register switch to said one register set to be registered therein and then for releasing said register switch, means for repeating the remainder of the line identity digits of the called number received by said trunk circuit concurrently to said one register set to be registered therein, means for reoperating said register switch to register the signal digit of the called number received by said trunk circuit, a plurality of lines, an operator position comprising apparatus controllable to extend a connection from said trunk circuit to any called one of said lines, means selectively controlled in accordance with the line identity digits of the called number registered in said one register set for indicating to the operator at said operator position the called one of said lines, signal circuits having a plurality of different settings for selectively signaling over a called line to which a connection is extended from said trunk circuit, and means selectively controlled in accordance with the signal digit of the called number registered in said register switch for setting said signal circuits.

50. In a signaling system in which the sum of the complementary variable digits X and Y is the fixed digit N, a numerical switch having access to N lines and being responsive to the digit Y to select the complementary or X line accessible thereto, a register device, selectively controllable means for registering the digit X in said register device, and means controlled by the registration of the digit X in said register device for transmitting the complementary digit Y to said numerical switch.

51. In a signaling system in which the sum of the complementary variable digits X and Y is the fixed digit N, a line selecting switch having N positions respectively terminating N lines, said switch normally occupying its N position and being operable Y positions therefrom to its X position, a register device, selectively controllable means for registering the digit X in said register device, and means controlled by the registration of the digit X in said register device for operating said switch Y positions from its N position.

52. In a signaling system in which the sum of the complementary variable digits X and Y is the fixed digit N, a numerical switch having access to N lines and being responsive to the digit Y to select the complementary or X line accessible thereto, a register switch having N positions, selectively controllable means for operating said register switch to its X position, and automatic means for operating said register switch Y positions from its X position to its N position and for concurrently transmitting the digit Y to said numerical switch.

53. In a signaling system in which the sum of the complementary variable digits X and Y is the fixed digit N, a register device accessible to automatic switching apparatus, a plurality of numerical switches associated with said register device, each of said numerical switches having access to N lines and being responsive to the digit Y to select the complementary or X line accessible thereto, means responsive to the seizure of said register device for connecting an idle one of said numerical switches thereto, selectively controllable means for transmitting the digit X over said switching apparatus to said register device to be registered therein, and means controlled by the registration of the digit X in said register device for transmitting the complementary digit Y to said one numerical switch.

54. In a signaling system in which the sum of the complementary variable digits X and Y is the fixed digit N, register mechanism normally registering the digit N and responsive to the digit Y partially to clear the same, whereby the digit X then remains registered therein, a register device, selectively controllable means for registering the digit X in said register device, means controlled by the registration of the digit X in said register device for transmitting the complementary digit Y to said register mechanism, and N circuits selectively controlled in accordance with the digit registered in said register mechanism.

55. In a signaling system in which the sum of the complementary variable digits X and Y is the fixed digit N, a trunk accessible to automatic switching apparatus and adapted to receive a called telephone number transmitted thereto, a register set associated with said trunk circuit, said trunk circuit comprising means responsive to a given digit X of the called number for transmitting the complementary digit Y as the given digit of the called number and responsive to the remainder of the digits X of the called number for repeating the digits X as the remainder of the digits of the called number, means for registering the various digits of the called number transmitted and repeated from said trunk circuit in the respective registers in said register set, and means controlled by the registration of the digit Y in the given register in said register set for indicating the complementary digit X as the given digit of the called number and controlled by the registrations of the digits X in the remainder of the registers in said register set for indicating the digits X as the remainder of the digits of the called number.

56. In a telephone system, a trunk circuit accessible to calling automatic stations and adapted to receive a called telephone number transmitted thereto, a plurality of register sets associated with said trunk circuit, means responsive to the seizure of said trunk circuit for connecting an idle one of said register sets thereto, said connection including a control conductor, means included in said trunk circuit for transmitting the called number received thereby over said connection to said one register to be registered therein, at least one of the digits of the called number being transmitted over said control conductor, a plurality of lines, an operator position comprising apparatus controllable to extend a connection from said trunk circuit to any called one of said lines, a signal associated with said operator position and individual to said trunk circuit, an operating circuit for said signal including said control conductor, and means selectively controlled in accordance with the called number registered in said one register set for indicating to the operator at said operator position the called one of said lines and for completing said operating circuit.

57. In a telephone system, a trunk circuit accessible to calling automatic stations and adapted to receive a called telephone number transmitted thereto, a plurality of register sets associated with said trunk circuit, means responsive to the seizure of said trunk circuit for connecting an idle one of said register sets thereto, said connection including first and second control conductors, means included in said trunk circuit for transmitting the called number received thereby over said connection to said one register to be registered therein, at least one of the digits of the called number being transmitted over said first control conductor and at least other of the digits of the called number being transmitted over said second control conductor, a plurality of lines, an operator position comprising apparatus controllable to extend a connection from said trunk circuit to any called one of said lines, a signal associated with said operator position and individual to said trunk circuit, an operating circuit for said signal including said first control conductor, and means selectively controlled in accordance with the called number registered in said one register set for indicating to the operator at said operator position the called one of said lines and for completing said operating circuit.

FRANK KESSLER.

CERTIFICATE OF CORRECTION.

Patent No. 2,314,990.                                    March 30, 1943.

FRANK KESSLER.

It is hereby certified that error appears in the printed specification of the above numbered patent requiring correction as follows: Page 37, first column, line 44, claim 38, before the word "circuit" insert --cord--; page 39, first column, line 6, claim 48, for "remander" read --remainder--; page 40, first column, line 15, claim 56, strike out the word "number"; and that the said Letters Patent should be read with this correction therein that the same may conform to the record of the case in the Patent Office.

Signed and sealed this 18th day of May, A. D. 1943.

(Seal)

Henry Van Arsdale,
Acting Commissioner of Patents.